US00RE44552E

(19) United States
(12) Reissued Patent
Nonaka

(10) Patent Number: US RE44,552 E
(45) Date of Reissued Patent: Oct. 22, 2013

(54) PRINTING SYSTEM, JOB PROCESSING METHOD, PRINTING DEVICE, AND STORAGE MEDIUM

(75) Inventor: Takashi Nonaka, Kunitachi (JP)

(73) Assignee: Canon Kabushiki Kaisha (JP)

(21) Appl. No.: 13/110,388

(22) Filed: May 18, 2011

Related U.S. Patent Documents

Reissue of:
(64) Patent No.: 7,855,792
Issued: Dec. 21, 2010
Appl. No.: 11/688,025
Filed: Mar. 19, 2007

(30) Foreign Application Priority Data

Mar. 22, 2006 (JP) ..... 2006-079590
Feb. 22, 2007 (JP) ..... 2007-042680

(51) Int. Cl.
*G06F 15/00* (2006.01)

(52) U.S. Cl.
USPC ..... 358/1.13; 399/81

(58) Field of Classification Search
USPC ..... 358/1.13, 1.15
See application file for complete search history.

(56) References Cited

U.S. PATENT DOCUMENTS 5,269,503 A 12/1993 Hiroi et al.
2005/0082734 A1 4/2005 Goto et al.
2005/0084308 A1* 4/2005 Nakamura et al. ..... 399/407
2006/0204310 A1* 9/2006 Inokuchi et al. ..... 400/680

FOREIGN PATENT DOCUMENTS

JP 2005-119137 A 5/2005
JP 2005-165722 A 6/2005

OTHER PUBLICATIONS

Japanese Office Action for corresponding JP 2012-021317, mail date Oct. 26, 2012.

* cited by examiner

*Primary Examiner* — Saeid Ebrahimi Dehkordy
(74) *Attorney, Agent, or Firm* — Rossi, Kimms & McDowell LLP

(57) ABSTRACT

A printing system adapted to be able to perform a processing concerning a job to be processed by a post-processing device, the post-processing device having a movable component openable by an operator, the system comprising: a controller that enables the printing device to execute the print process of a job to be processed even while the movable component remains open in a case that the job does not require the post-process by the post-processing device having the open movable component, the controller inhibiting the printing device from executing the print process of a job to be processed without notifying an operator via a user interface unit of information on the open movable component in a case that the job requires the post-process by the post-processing device having the open movable component.

13 Claims, 70 Drawing Sheets

FIG. 18A

SYSTEM MANAGEMENT SETTING

[REGISTRATION SETTING OF INLINE SHEET PROCESSING DEVICE]
PLEASE REGISTER TYPES OF SHEET PROCESSING DEVICES TO BE CONNECTED TO PRINTING DEVICE AND THEIR CONNECTION ORDER.
YOU CAN CONNECT MAXIMUM OF FIVE SHEET PROCESSING DEVICES.
PLEASE CONNECT SADDLE STITCHING DEVICE LAST.

| | | |
|---|---|---|
| 1 | | ADVANCED SETTINGS |
| 2 | | ADVANCED SETTINGS |
| 3 | | ADVANCED SETTINGS |
| 4 | | ADVANCED SETTINGS |

REGISTER CLOSE

FIG. 18B

SYSTEM MANAGEMENT SETTING

[REGISTRATION SETTING OF INLINE SHEET PROCESSING DEVICE]
PLEASE REGISTER TYPES OF SHEET PROCESSING DEVICES TO BE CONNECTED TO PRINTING DEVICE AND THEIR CONNECTION ORDER. YOU CAN CONNECT MAXIMUM OF FIVE SHEET PROCESSING DEVICES. PLEASE CONNECT SADDLE STITCHING DEVICE LAST.

| | | | |
|---|---|---|---|
| 1 | LARGE-VOLUME STACKER | ▶ | ADVANCED SETTINGS |
| 2 | GLUE BINDING DEVICE | ▶ | ADVANCED SETTINGS |
| 3 | SADDLE STITCHING DEVICE | ▶ | ADVANCED SETTINGS |
| 4 | | ▶ | ADVANCED SETTINGS |

REGISTER CLOSE

FIG. 18C

SYSTEM MANAGEMENT SETTING

[REGISTRATION SETTING OF INLINE SHEET PROCESSING DEVICE]
PLEASE REGISTER TYPES OF SHEET PROCESSING DEVICES TO BE CONNECTED TO PRINTING DEVICE AND THEIR CONNECTION ORDER. YOU CAN CONNECT MAXIMUM OF FIVE SHEET PROCESSING DEVICES. PLEASE CONNECT SADDLE STITCHING DEVICE LAST.

| | | |
|---|---|---|
| 1 | GLUE BINDING DEVICE | ADVANCED SETTINGS |
| 2 | LARGE-VOLUME STACKER | ADVANCED SETTINGS |
| 3 | SADDLE STITCHING DEVICE | ADVANCED SETTINGS |
| 4 | | ADVANCED SETTINGS |

REGISTER CLOSE

FIG. 18D

SYSTEM MANAGEMENT SETTING

[REGISTRATION SETTING OF INLINE SHEET PROCESSING DEVICE]
PLEASE REGISTER TYPES OF SHEET PROCESSING DEVICES TO BE CONNECTED TO PRINTING DEVICE AND THEIR CONNECTION ORDER. YOU CAN CONNECT MAXIMUM OF FIVE SHEET PROCESSING DEVICES. PLEASE CONNECT SADDLE STITCHING DEVICE LAST.

| | | |
|---|---|---|
| 1 | LARGE-VOLUME STACKER | ADVANCED SETTINGS |
| 2 | SADDLE STITCHING DEVICE | ADVANCED SETTINGS |
| 3 | | ADVANCED SETTINGS |
| 4 | | ADVANCED SETTINGS |

REGISTER CLOSE

※EXECUTION OF JOB IS IMPOSSIBLE.

※JOB IS EXECUTABLE BECAUSE OF DELIVERY TO FINISHER.

※JOB IS EXECUTABLE BECAUSE OF DELIVERY TO FINISHER.

※ JOB IS EXECUTABLE BECAUSE OF DELIVERY TO STACKER.

※JOB IS EXECUTABLE EVEN IF COVER OF FINISHER IS OPEN BECAUSE OF DELIVERY TO CASE BINDING UNIT.

DEVICE STATUS DISPLAY CONTROL

PRINTING SYSTEM, JOB PROCESSING METHOD, PRINTING DEVICE, AND STORAGE MEDIUM

Matter enclosed in heavy brackets [ ] appears in the original patent but forms no part of this reissue specification; matter printed in italics indicates the additions made by reissue.

*CROSS-REFERENCE TO RELATED APPLICATION(S)*

*Notice: More than one reissue application has been filed for the reissue of U.S. Pat. No. 7,855,792, which issued on Dec. 21, 2010 and was filed as U.S. patent application Ser. No. 11/688,025 on Mar. 19, 2007; the reissue applications are application Ser. No. 13/110,388, filed May 18, 2011 (the present application), and continuation reissue application Ser. No. 13/422,282, filed Mar. 16, 2012, both of which are reissue applications of U.S. Pat. No. 7,855,792. The contents of the applications cited in this paragraph are hereby incorporated herein by reference in their entireties.*

BACKGROUND OF THE INVENTION

1. Field of the Invention

The present invention relates to a printing system capable of accepting a plurality of jobs, a job processing method, a printing device, and a storage medium.

2. Description of the Related Art

Recently, office-equipment makers and the like are examining new entry into this new POD(print-on-demand) market (see Japanese Patent Laid-Open No. 2005-165722). While watching market trends, they are making a close study of a printing device and printing system available even in the POD environment assuming use cases and needs different from those in the office environment. In a printing environment such as the POD market, it will be important how to increase productivity in the printing system. The method of facilitating the use of the printing system by the operator of the printing system while maintaining high productivity will be important.

As described above, in order to enter the POD market, office-equipment makers and the like desirably assume the circumstance of the POD market and cope with any situation which hardly occurs in the office environment. In other words, it is necessary to fully study digital printing systems suited to the POD environment toward practical use of products, as described in the reference. To make the printing system practicable even in the POD environment, many matters and problems remain unexamined by configurations disclosed in the reference.

For example, when the cover unit (e.g., front cover) of a device that is operable by an operator is open in a printing system configured in consideration of the office environment, a print operation in the device is inhibited and cannot be executed. This configuration is useful for preventing any trouble in the office environment where even a user unfamiliar with the operation exists. This configuration is naturally accepted in a printing environment such as the office environment. However, the POD environment assumes a case in which an operator skilled to a certain degree makes best use of the printing system. In the POD environment, it will be more important to minimize the down time of the printing system.

To meet this trend, the present invention pays attention to a configuration capable of executing a print operation as much as possible in the printing system even if the movable unit, e.g., cover unit of a sheet processing device such as a post-processing device is open. In the present invention, an operation associated with this configuration is called a continuous-run operation. However, various problems to be solved will arise from examination of practical use of products concerning the continuous-run operation receiving attention in the present invention.

For example, the movable unit of a given sheet processing device for use in the printing system is under maintenance, or is open due to, e.g., work to take out a printed material. Even in this case, the printing system allows execution of the print process of a job not influenced by this situation. The first problem is to provide a printing system capable of maintaining maximum productivity in consideration of future use cases and needs in the POD environment.

However, the market does not demand satisfaction of these needs, so a printing system capable of coping with the first problem has not been commercialized yet. It is important to provide a printing system capable of coping with the first problem.

To commercialize a printing system aiming at the future printing environment such as the POD environment, it is more important to provide a printing system capable of dealing with not only the first problem but also the following problem.

For example, it is difficult to satisfactorily create a printed material to be delivered to a customer even by a printing system configured to cope with the first problem because, for example, the operator does not notice that the movable unit of a sheet processing device is open. This inhibits the system from maintaining high productivity. Even the configuration capable of dealing with the first problem causes unexpected troubles as described above.

The present invention considers it important as a second problem that the configuration capable of coping with the first problem does not cause any.

As described above, there is much room for further study in commercializing a printing system capable of coping with the continuous-run operation.

SUMMARY OF THE INVENTION

The present invention has been made to solve the conventional problems, and has as its object to provide a convenient printing system adaptable not only to the office environment but also to the POD environment, a job processing method, a storage medium, a program, and a printing device.

In particular, it is another object of the present invention to provide a printing system capable of coping with both the first and second problems without any new trouble such as the second problem caused by a configuration capable of coping with the first problem, a job processing method, a storage medium, a program, and a printing device.

It is still another object of the present invention to provide a printing system capable of running as continuously as possible and maintaining both high productivity and high operability by using the continuous-run operation described above, a job processing method, a storage medium, a program, and a printing device.

It is still another object of the present invention to contribute to practical use of products aiming at the future printing environment such as the POD environment so as to cope with various needs from various users as flexibly as possible in consideration of various situations and use environments.

According to a first aspect of the present invention there is provided a system according to claim 1.

According to a second aspect of the present invention there is provided a method to claim 11.

The present invention can solve the problems assumed in Description of the Related Art. For example, the present invention can build a convenient printing environment applicable not only to the office environment but also to the POD environment. The present invention can provide a printing system capable of coping with both the first and second problems without any new trouble such as the second problem caused by a configuration capable of coping with the first problem, a job processing method, a storage medium, a program, and a printing device. The present invention can provide a printing system capable of running as continuously as possible and maintaining both high productivity and high operability by using the continuous-run operation described above, a job processing method, a storage medium, a program, and a printing device. The present invention can contribute to practical use of products aiming at the future printing environment such as the POD environment so as to cope with various needs from various users as flexibly as possible in consideration of various situations and use environments.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18A is a view for explaining an example of display control on the UI unit to be controlled in the embodiment;

FIG. 18B is a view for explaining an example of display control on the UI unit to be controlled in the embodiment;

FIG. 18C is a view for explaining an example of display control on the UI unit to be controlled in the embodiment;

FIG. 18D is a view for explaining an example of display control on the UI unit to be controlled in the embodiment;

FIGS. 20-1 to 20-3 are views for explaining a control example associated with a continuous-run operation to be controlled in the embodiment;

FIGS. 21A-1 to 21A-7 are views for explaining a control example associated with the continuous-run operation to be controlled in the embodiment;

FIGS. 21B-1 to 21B-8 are views for explaining a control example associated with the continuous-run operation to be controlled in the embodiment;

FIGS. 22-1 to 22-3 are views for explaining a control example associated with the continuous-run operation to be controlled in the embodiment;

FIGS. 23-1 to 23-7 are views for explaining a control example associated with the continuous-run operation to be controlled in the embodiment;

FIGS. 24-1 to 24-8 are views for explaining a control example associated with the continuous-run operation to be controlled in the embodiment;

FIGS. 25-1 to 25-6 are views for explaining a control example associated with the continuous-run operation to be controlled in the embodiment.

DESCRIPTION OF THE EMBODIMENT

Figure 1:
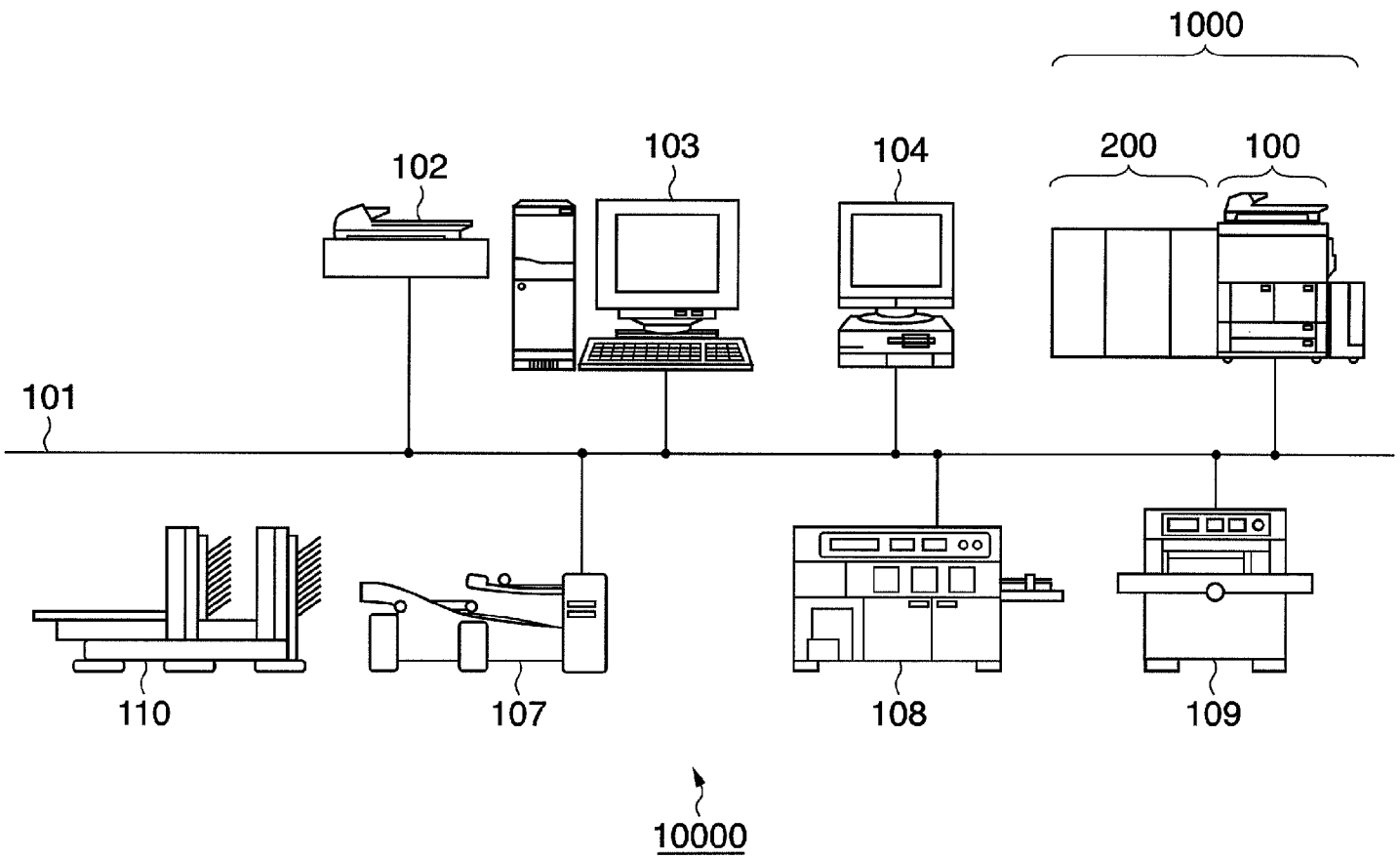
FIG. 1 is a view for explaining an example of the overall configuration of a printing environment 10000 including a printing system 1000 to be controlled in an embodiment.

A preferred embodiment of the present invention will be described in detail below with reference to the accompanying drawings.

[Description of System Configuration of Entire Printing Environment 10000 Including Printing System 1000]

The embodiment assumes a printing environment such as the POD environment different from the office environment in order to solve problems described in Description of the Related Art. The embodiment will explain the system environment of an entire POD environment site (printing environment 10000 in FIG. 1) including a printing system 1000. The printing environment itself is a feature of the embodiment.

In the embodiment, the printing environment 10000 where the printing system 1000 is applicable is also suited to the POD environment and is called the POD system 10000.

The POD system 10000 in FIG. 1 comprises, as building components, a printing system 1000 of the embodiment, and a server computer 103 and client computer 104 (to be referred to as PCs hereinafter). The POD system 10000 also comprises a paper folding device 107, trimming device 109, saddle stitching device 110, case binding device 108, scanner 102, and the like. In this manner, a plurality of devices are prepared in the POD system 10000.

The printing system 1000 comprises a printing device main body 100 and sheet processing device 200 as building components. As an example of the printing device 100, the embodiment will explain a multifunction peripheral having a plurality of functions such as the copy function and PC print function. However, the printing device 100 may be a single function type printing device having only the PC function or copy function. The multifunction peripheral will also be called an MFP hereinafter.

The paper folding device 107, trimming device 109, saddle stitching device 110, and case binding device 108 in FIG. 1 are defined as sheet processing devices, similar to the sheet processing device 200 of the printing system 1000. This is because these devices can execute sheet processes for sheets of a job printed by the printing device 100 of the printing system 1000. For example, the paper folding device 107 can fold sheets of a job printed by the printing device 100. The trimming device 109 can trim a bundle of sheets printed by the printing device 100. The saddle stitching device 110 can saddle-stitch sheets of a job printed by the printing device 100. The case binding device 108 can case-bind sheets of a job printed by the printing device 100. To execute various sheet processes by these sheet processing devices, an operator must take out a printed material of a job printed by the printing device 100 from the delivery unit of the printing device 100, and set the printed material in a target sheet processing device.

The use of a sheet processing device other than the sheet processing device 200 of the printing system 1000 requires intervention work by the operator after the printing device 100 executes a print process.

In other words, when the sheet processing device 200 of the printing system 1000 executes a sheet process required for a job printed by the printing device 100, no intervention work by the operator is necessary after the printing device 100 executes a print process. This is because the printing device 100 can directly supply sheets printed by it to the sheet processing device 200. More specifically, the sheet feeding path in the printing device 100 can couple to that in the sheet processing device 200. In this manner, the sheet processing device 200 and printing device 100 of the printing system 1000 physically connect to each other. In addition, the printing device 100 and sheet processing device 200 comprise CPUs so as to communicate data. That is, the printing device 100 and sheet processing device 200 electrically connect to each other.

In the embodiment, the control unit of the printing system comprehensively controls the printing device 100 and sheet processing device 200. For example, in the embodiment, a controller unit 205 in the printing device 100 in FIG. 2 performs comprehensive control. The embodiment will call these sheet processing devices as post-processing devices or post presses.

All these devices in the POD system 10000 of FIG. 1 except the saddle stitching device 110 connect to a network 101 so as to communicate data with each other.

For example, the printing device 100 prints the print data of a target job whose print execution request is transmitted via the network 101 from an information processing device serving as an example of external devices such as the PCs 103 and 104.

For example, the server PC 103 manages all jobs to be processed in the POD environment 10000 by transmitting/receiving data to/from another device by network communication. In other words, the server PC 103 functions as a computer which comprehensively manages a series of workflow steps including a plurality of process steps. The PC 103 determines post-process conditions capable of finishing in the environment 10000 on the basis of a job instruction accepted from an operator. In addition, the PC 103 designates a post-process (finishing process) step complying with a request from an end user (client who requests printing in this example). At this time, the server 103 uses information exchange tools such as JDF to exchange information with respective post-processing devices using commands and statuses in post presses.

The embodiment classifies the above sheet processing devices into three categories and defines them as follows.

[Definition 1] A sheet processing device which satisfies both (condition 1) and (condition 2) listed below is defined as an "inline finisher". The embodiment also refers to a device satisfying this definition as an inline type sheet processing device.

(Condition 1) The paper path (sheet feeding path) physically connects to the printing device 100 so as to directly receive sheets conveyed from the printing device 100 without any operator intervention.

(Condition 2) A sheet processing device electrically connects to another device so as to communicate data necessary for an operation instruction, status confirmation, or the like with another device. More specifically, a sheet processing device electrically connects to the printing device 100 so as to communicate data with it, or electrically connects to a device (e.g., the PC 103 or 104) other than the printing device 100 via the network 101 so as to communicate data with the device. A sheet processing device which satisfies either condition meets (condition 2).

More specifically, the sheet processing device 200 of the printing system 1000 corresponds to an "inline finisher". This is because the sheet processing device 200 physically and electrically connects to the printing device 100, as described above.

[Definition 2] A sheet processing device which satisfies not (condition 1) out of (condition 1) and (condition 2) listed above but (condition 2) is defined as a "near-line finisher". The embodiment also refers to a device satisfying this definition as a near-line type sheet processing device.

For example, the paper path does not connect to the printing device 100, and a sheet processing device requires intervention work by an operator such as carrying of a printed material. However, the sheet processing device can electrically exchange information such as an operation instruction or status confirmation via a communication means such as the network 101. A sheet processing device which meets these conditions will be defined as a "near-line finisher".

More specifically, the paper folding device 107, trimming device 109, and case binding device 108 in FIG. 1 correspond to "near-line finishers". This is because these sheet processing devices do not physically connect to the printing device 100, but electrically connect to another device such as the PC 103 or 104 via the network 101 so as to communicate data.

[Definition 3] A sheet processing device which satisfies neither (condition 1) nor (condition 2) listed above is defined as an "offline finisher". The embodiment also refers to a device satisfying this definition as an offline type sheet processing device.

For example, the paper path does not connect to the printing device 100, and a sheet processing device requires intervention work by an operator such as carrying of a printed material. Further, the sheet processing device does not comprise any communication unit necessary for an operation instruction and status confirmation, and cannot communicate data with another device. Thus, the operator carries an output material, sets it, manually inputs an operation, and manually gives a status report from the device. A sheet processing device which meets these conditions will be defined as an "offline finisher".

More specifically, the saddle stitching device 110 in FIG. 1 corresponds to an "offline finisher". This is because this sheet processing device does not physically connect to the printing device 100, cannot connect to the network 101, and does not electrically connect to another device to communicate data.

Various sheet processes are executable in the POD environment 10000 having various sheet processing devices classified into these three categories.

For example, printed media of a job printed by the printing device 100 can undergo various sheet processes such as a trimming process, saddle stitching process, case binding process, sheet folding process, punching process, sealing process, and collating process. A sheet process is possible in a bookbinding printing style desired by an end user (client).

Near-line finishers and offline finishers managed by the server PC 103 include various finishers such as a dedicated stapler, dedicated puncher, inserter, and collator. The server 103 grasps a device status and job status from near-line finishers via the network 101 by sequential polling or the like using a predetermined protocol. In addition, the server 103 manages the execution statuses (progresses) of many jobs processed in the environment 10000.

In the embodiment, different sheet processing devices may execute a plurality of print sheet processes, or one sheet processing device may execute types of print sheet processes. The system may comprise any of sheet processing devices.

The printing system 1000 in FIG. 1 comprises the printing device 100, and the sheet processing device 200 detachable from the printing device 100. The sheet processing device 200 can directly receive, via the sheet feeding path, sheets of a job printed by the printing device 100. The sheet processing device 200 executes a sheet process requested by a user together with a print execution request via a user interface unit for sheets of a job printed by a printer unit 203 of the printing device 100. This is apparent from the fact that the sheet processing device 200 is an inline type sheet processing device, as described above.

It should be noted that the sheet processing device 200 in the embodiment is also definable as a group of sheet processing devices 200. This is because in the embodiment, a plurality of sheet processing devices, which are independent housings and independently available, couple to the printing device 100 and are available as the sheet processing device 200. For example, the printing system 1000 shown in FIG. 1 comprises the printing device 100 and three sheet processing devices. In other words, in the printing system 1000 in FIG. 1, three sheet processing devices series-connect to the printing device 100. In this example, an arrangement in which a plurality of sheet processing devices connect to the printing device 100 is called a cascade connection. The embodiment handles, as inline finishers, all sheet processing devices contained in a group of sheet processing devices 200 cascade-connected to the printing device 100. The controller 205 in FIG. 2 serving as an example of the control unit of the system 1000 comprehensively controls the printing device main body 100 and a plurality of inline type sheet processing devices, and executes various control examples to be described below in the embodiment. The embodiment also has this feature. This arrangement will be described later with reference to FIG. 3 and the like.

[Internal Configuration (Mainly Software Configuration) of System 1000]

The internal configuration (mainly software configuration) of the printing system 1000 will be explained with reference to the system block diagram of FIG. 2. In this example, the printing device 100 incorporates all the units of the printing system 1000 shown in FIG. 2 except the sheet processing device 200 (strictly speaking, a group of sheet processing devices configurable by a plurality of inline type sheet processing devices). The sheet processing device 200 is detachable from the printing device 100, and is providable as an option of the printing device 100. This configuration aims to provide a necessary number of inline finishers in the POD environment. For this purpose, the embodiment adopts the following configuration.

The printing device 100 comprises a nonvolatile memory such as a hard disk 209 (to be also referred to as an HD hereinafter) capable of storing job data to be processed in the printing device 100. The printing device 100 has the copy function of printing, by the printer unit 203 via the HD, job data accepted from a scanner unit 201 of the printing device 100. The printing device 100 also has the print function of printing, by the printer unit 203 via the HD, job data accepted from an external device such as the PC 103 or 104 via an external I/F unit 202 serving as an example of a communication unit. The printing device 100 is an MFP type printing device (to be also referred to as an image forming device) having a plurality of functions.

The printing device according to the embodiment can take any configuration of a color or monochrome printing device as long as it can execute various control examples described in the embodiment.

The printing device 100 according to the embodiment comprises the scanner unit 201 which scans an original document image and processes scanned image data. The printing device 100 also comprises the external I/F unit 202 which transmits/receives image data to/from a facsimile device, network connection device, or external dedicated device. The printing device 100 comprises the hard disk 209 capable of storing image data of jobs to be printed that are accepted from either the scanner unit 201 or external I/F unit 202. The printing device 100 comprises the printer unit 203 which prints target job data stored in the hard disk 209 on a print medium. The printing device 100 further comprises an operation unit 204 which has a display unit and serves as an example of the user interface unit of the printing system 1000. Other examples of the user interface unit provided by the printing system 1000 are the display unit, keyboard, and mouse of an external device such as the PC 103 or 104.

The controller unit (to be also referred to as a control unit or CPU) 205 serving as an example of the control unit of the printing system 1000 comprehensively controls the processes, operations, and the like of various units of the printing system 1000. A ROM 207 stores various control programs necessary in the embodiment including programs for executing various processes of a flowchart (to be described later) and the like. The ROM 207 also stores a display control program for displaying various UI windows on the display unit of the operation unit 204 including user interface windows (to be referred to as UI windows hereinafter) shown in the accompanying drawings. The control unit 205 reads out and executes programs from the ROM 207 to cause the printing device to execute various operations described in the embodiment. The ROM 207 also stores, e.g., a program for executing an operation to analyze PDL (Page Description Language) code data received from an external device (e.g., the PC 103 or 104) via the external I/F unit 202, and expand the PDL code data into raster image data (bitmap image data). Software processes these programs.

The ROM 207 is a read-only memory, and stores programs (e.g., a boot sequence and font information) and various programs (e.g., the above-mentioned programs) in advance. A RAM 208 is a readable/writable memory, and stores image data, various programs, and setting information sent from the scanner unit 201 or external I/F unit 202 via a memory controller 206 (not shown).

The HDD (hard disk drive) 209 is a large-capacity storage device which stores image data compressed by a compression/decompression unit 210. The HDD 209 can hold a plurality of data such as print data of a job to be processed. The control unit 205 controls printing, by the printer unit 203 via the HDD 209, of target job data input via various input units such as the scanner unit 201 and external I/F unit 202. The control unit 205 also controls transmission of job data to an external device via the external I/F unit 202. In this fashion, the controller unit 205 controls execution of various output processes for target job data stored in the HDD 209. The compression/decompression unit 210 compresses/decompresses image data and the like stored in the RAM 208 and HDD 209 in accordance with various compression schemes such as JBIG and JPEG.

With the above configuration, the control unit 205 serving as an example of the control unit of the printing system controls even the operation of the inline type sheet processing device 200, as shown in FIG. 1. The mechanical structure of the printing system 1000 including a description of this operation will be explained with reference to FIG. 3 and the like.

[Device Configuration (Mainly Mechanical Structure) of System 1000]

The configuration (mainly mechanical structure) of the printing system 1000 will be explained with reference to the view of FIG. 3 for explaining the device configuration.

As described above, in the printing system 1000, a plurality of inline type sheet processing devices cascade-connect to the printing device 100. An arbitrary number of inline type sheet processing devices connectable to the printing device 100 can be installed in accordance with the use environment in order to enhance the effects of the embodiment under specific limitations.

Figure 2:
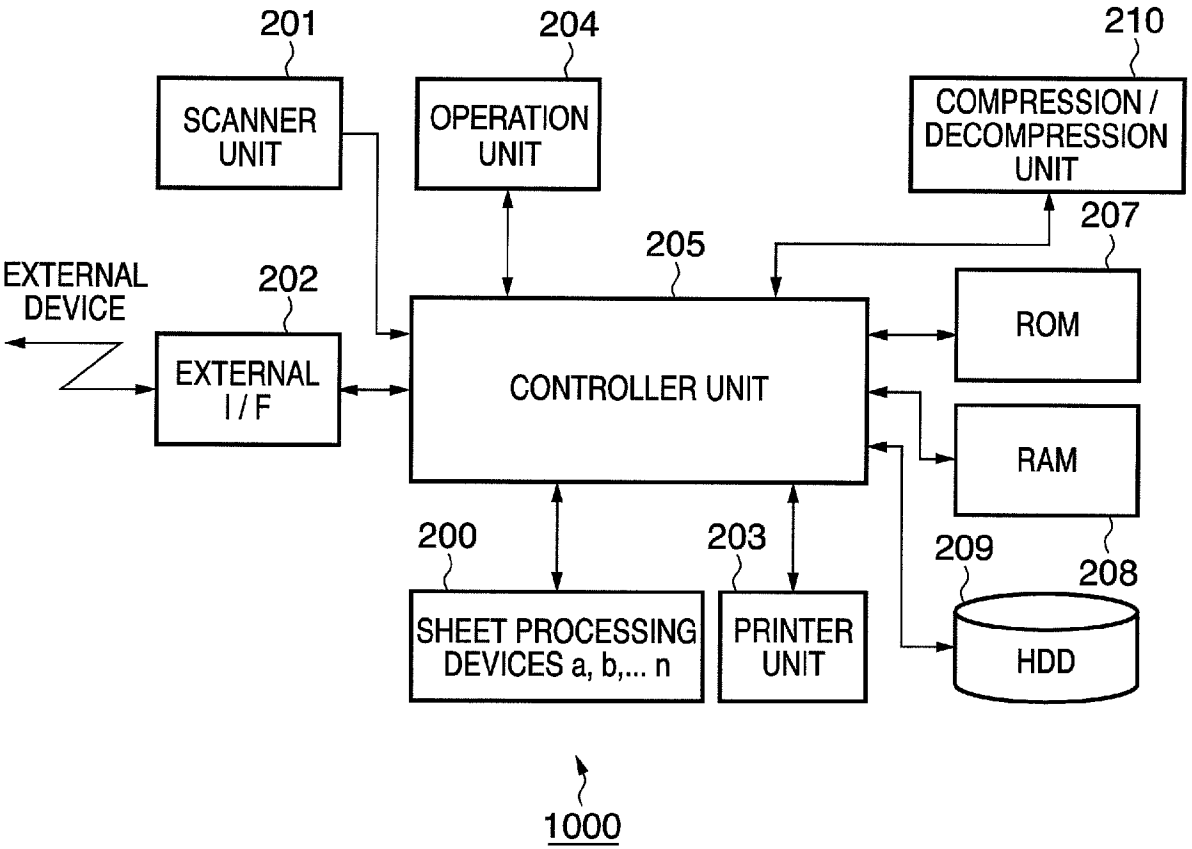
FIG. 2 is a block diagram for explaining an example of the configuration of the printing system 1000 to be controlled in the embodiment.
Figure 3:
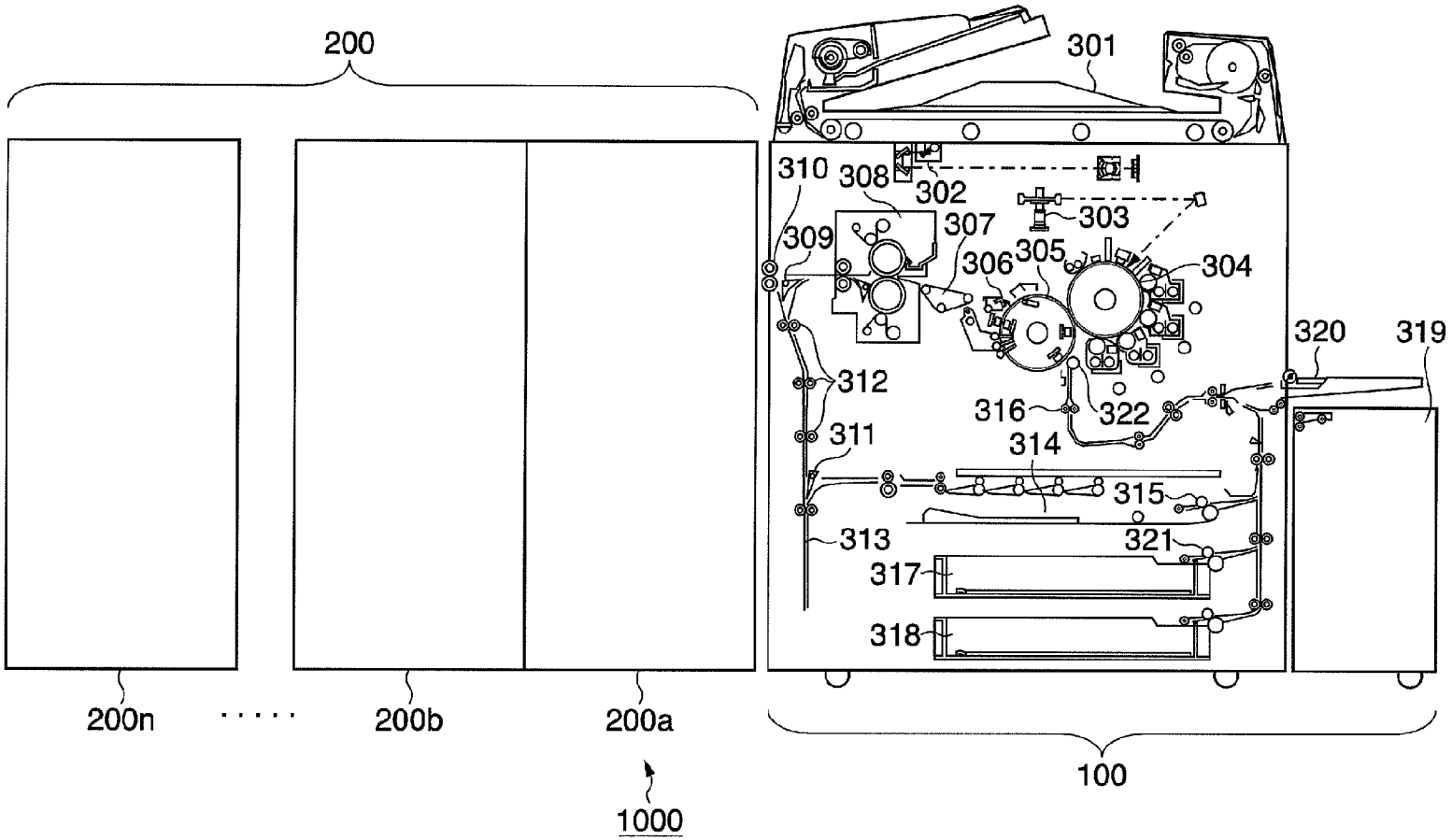
FIG. 3 is a view for explaining an example of the configuration of the printing system 1000 to be controlled in the embodiment.

To make the description clearer, N sheet processing devices 200 are connectable as a group of sheet processing devices in FIGS. 2 and 3. Sheet processing devices are defined as sheet processing devices 200a, 200b, . . . sequentially from the first sheet processing device, and the Nth sheet processing device is a sheet processing device 200n. For descriptive convenience, each sheet processing device 200 has a shape as shown in FIGS. 1 to 3, but has an original appearance to be described later.

Of reference numerals 301 to 322 shown in FIG. 3, reference numeral 301 corresponds to the mechanical structure of the scanner unit 201 in FIG. 2. Reference numerals 302 to 322 correspond to the mechanical structure of the printer unit 203 in FIG. 2. The embodiment will describe the structure of a 1D type color MFP. A 4D type color MFP and monochrome MFP are also examples of the printing device according to the embodiment, but a description thereof will be omitted.

The auto document feeder (ADF) 301 in FIG. 3 separates the first and subsequent original document sheets in the order of pages from an original document bundle set on the support surface of the document tray, and feeds each original document sheet to the document table glass in order to scan the original document sheet with the scanner 302. The scanner 302 scans the image of the original document sheet fed onto the document table glass, and converts the image into image data by a CCD. The rotary polygon mirror 303 receives a light ray (e.g., a laser beam) modulated in accordance with the image data, and irradiates the photosensitive drum 304 with the scan beam reflected via a reflecting mirror. A latent image formed by the laser beam on the photosensitive drum 304 is developed with toner, and the toner image is transferred onto a sheet material adhered onto the transfer drum 305. A series of image forming processes is executed sequentially with yellow (Y), magenta (N), cyan (C), and black (K) toners, forming a full-color image. After four image forming processes, the sheet material bearing the full-color image is separated by the separation gripper 306 from the transfer drum 305, and conveyed to the fixing unit 308 by the pre-fixing conveyor 307.

The fixing unit 308 comprises a combination of rollers and belts, and incorporates a heat source such as a halogen heater. The fixing unit 308 fuses and fixes, by heat and pressure, toner on a sheet material bearing a toner image. The delivery flapper 309 can be swung about the swing shaft, and regulates the sheet material conveyance direction. When the delivery flapper 309 swings clockwise in FIG. 3, a sheet material is conveyed straight, and discharged outside the device by the delivery rollers 310. To form images on the two surfaces of a sheet material, the delivery flapper 309 swings counterclockwise in FIG. 3, and the course of the sheet material changes downward to supply the sheet material to the double-sided conveyor. The double-sided conveyor comprises the reverse flapper 311, reverse rollers 312, reverse guide 313, and double-sided tray 314.

The reverse flapper 311 can be swung about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314.

The double-sided tray 314 temporarily supports the sheet material, and the re-feed roller 315 supplies the sheet material again to the registration rollers 316. At this time, the sheet material is sent with a surface opposite to the first surface in the transfer step facing the photosensitive drum. The second image is formed on the second surface of the sheet by the same process as that described above. After the images are formed on the two surfaces of the sheet material, the sheet undergoes the fixing step and is discharged from the printing device main body to the outside of the device via the delivery rollers 310. The control unit 205 executes this double-sided print sequence, and causes the printing device to execute double-sided printing of target job data on the first and second surfaces of a sheet.

The sheet feed/conveyance section comprises the sheet feed cassettes 317 and 318 (each capable of storing, e.g., 500 sheets) serving as sheet feed units storing sheets necessary for a print process, the paper deck 319 (capable of storing, e.g., 5,000 sheets), and the manual feed tray 320. Units for feeding sheets stored in these sheet feed units are the sheet feed rollers 321, registration rollers 316, and the like. The sheet feed cassettes 317 and 318 and the paper deck 319 can set sheets of various materials at various sheet sizes so as to discriminate these sheets in these sheet feed units.

The manual feed tray 320 can also set various print media including a special sheet such as an OHP sheet. The sheet feed cassettes 317 and 318, the paper deck 319, and the manual feed tray 320 respectively have the sheet feed rollers 321 so as to successively feed sheets one by one. For example, a pickup roller sequentially picks up stacked sheet materials, a separation roller facing the sheet feed roller 321 prevents overlapping feed, and sheet materials are supplied one by one to the conveyance guide. The separation roller receives, via a torque limiter (not shown), a driving force for driving the separation roller in a direction opposite to the conveyance direction. When only one sheet material enters a nip portion formed between the separation roller and the sheet feed roller, the separation roller rotates in the conveyance direction following the sheet material.

If overlapping feed occurs, the separation roller rotates in the direction opposite to the conveyance direction to set back the overlapping-fed sheet material and supply only one top sheet material. The supplied sheet material is guided between the conveyance guides, and conveyed to the registration rollers 316 by a plurality of conveyance rollers. At this time, the registration rollers 316 stop, and the leading end of the sheet material abuts against the nip portion formed between the pair of registration rollers 316. Then, the sheet material forms a loop to correct skew. The registration rollers 316 start rotating to convey the sheet material in synchronism with the timing of a toner image formed on the photosensitive drum 304 in the image forming section. The attraction roller 322 electrostatically attracts the sheet material sent by the registration rollers 316 onto the surface of the transfer drum 305. The sheet material discharged from the fixing unit 308 is introduced into the sheet feeding path in the sheet processing device 200 via the delivery rollers 310.

Through the above print process, the control unit 205 processes a job to be printed.

The control unit 205 causes the printer unit 203 by the above-described method to print job print data stored in the HD 209 from a data generation source on the basis of a print execution request accepted from a user via the UI unit.

For example, the data generation source of a job whose print execution request is accepted from the operation unit 204 means the scanner unit 201. The data generation source of a job whose print execution request is accepted from a host computer means the host computer.

The control unit 205 stores print data of a job to be processed sequentially from the start page in the HD 209, and reads out the print data sequentially from the start page from the HD 209 to form the image of the print data on a sheet. The control unit 205 performs this start page process. In addition, the control unit 205 supplies printed sheets sequentially from the start page to the sheet feeding path in the sheet processing device 200 with the image surfaces of the sheets facing down. For this purpose, immediately before the delivery rollers 310 introduce a sheet into the sheet processing device 200, the control unit 205 causes the units 309 and 312 and the like to execute a switchback operation to reverse the sheet traveling from the fixing unit 308. The control unit 205 also executes paper handling control for the start page process.

The arrangement of the inline type sheet processing device 200 of the printing system 1000 also having the printing device 100 will be explained.

As shown in FIG. 3, the system 1000 according to the embodiment comprises a total of n inline type sheet processing devices cascade-connectable to the printing device 100. The number of installed inline type sheet processing devices is set so that as many devices can be accepted as deemed necessary. However, the system 1000 must utilize at least one sheet processing device which can supply a sheet printed by the printer unit 203 to an internal sheet processing unit without any intervention work by an operator. In other words, the system 1000 must utilize a sheet processing device having a sheet feeding path (paper path) capable of conveying, within the device, a print medium discharged from the printer unit 203 via the delivery rollers 310 of the printing device 100. The system 1000 follows this restriction.

However, the configuration of the printing system 1000 can be flexibly modified within the limits of this restriction, as one mechanism of enhancing the effects of the embodiment.

For example, the number of connected inline type sheet processing devices can be any arbitrary number. The embodiment also assumes a POD environment where an administrator determines that no inline type sheet processing device is necessary, in order to increase the use efficiency of an offline type sheet processing device. For example, even when no inline type sheet processing device is used (i.e., the number of inline type sheet processing devices is 0), the printing device 100 of the embodiment is available.

When cascade-connecting a plurality of inline type sheet processing devices to the printing device 100, a specific user (e.g., administrator) can arbitrarily change and determine their connection order under the restriction.

The above mechanism aims to improve user friendliness, and is not an indispensable constituent feature. In other words, the present invention is not limited to this arrangement. For example, the present invention is applicable to a system configuration which uniformly defines the number of inline type sheet processing devices available in the printing system 1000 and their connection order. The present invention incorporates any system configuration and device configuration as long as at least one of various job control examples (to be described later) is executable.

How many and what kinds of inline type sheet processing devices are connectable to the printing device 100 in the printing system 1000, how to connect them, and what kinds of sheet processes they can execute will be described later.

[Arrangement of Operation Unit 204 as Example of UI Unit of System 1000]

The operation unit 204 serving as an example of the user interface unit (to be referred to as a UI unit hereinafter) of the printing device 100 in the system 1000 will be explained with reference to FIG. 4 and the like.

The operation unit 204 comprises a key input unit 402 capable of accepting a user operation with hard keys, and a touch panel unit 401 serving as an example of a display unit capable of accepting a user operation with soft keys (display keys).

Figure 5:
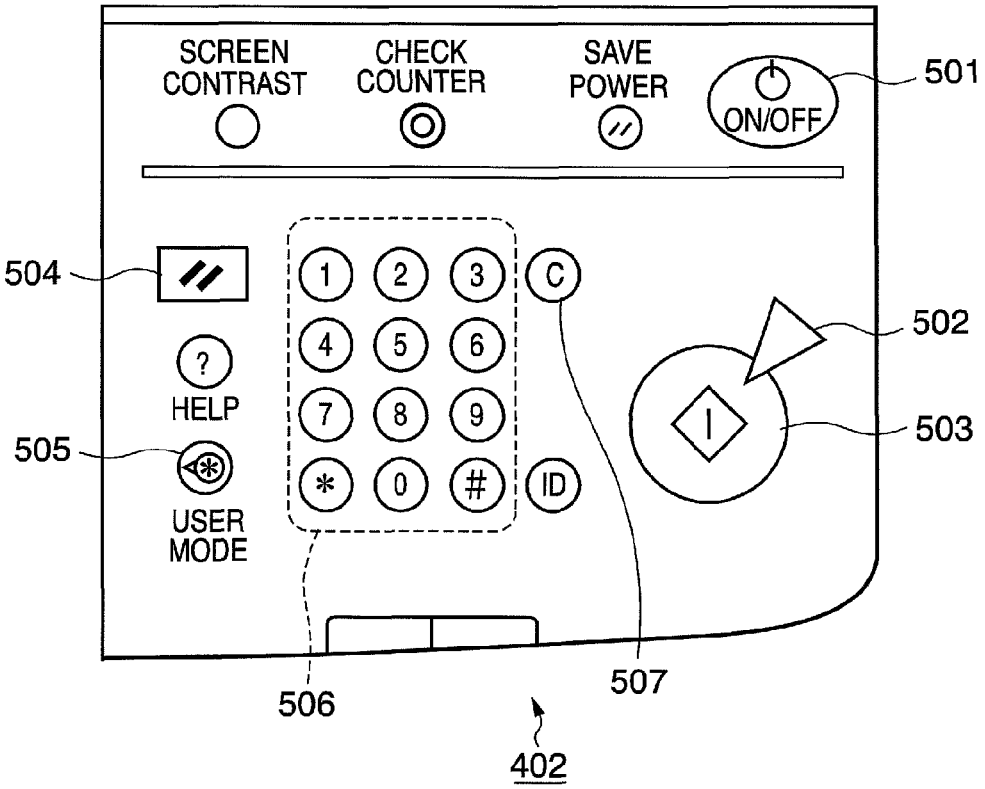
FIG. 5 is a view for explaining an example of the UI unit to be controlled in the embodiment.

As shown in FIG. 5, the key input unit 402 comprises an operation unit power switch 501. In response to a user operation to the switch 501, the control unit 205 controls to selectively switch between the standby mode (normal operation state) and the sleep mode (state in which the program stops in wait for an interrupt by network printing, facsimile transmission, or the like, suppressing power consumption). The control unit 205 controls to accept a user operation to the switch 501 while a main power switch (not shown) for supplying power to the whole system is ON.

A start key 503 enables accepting, from a user, an instruction to cause the printing device to start a type of job process designated by the user, such as copying or transmission of a job to be processed. A stop key 502 enables accepting, from the user, an instruction to cause the printing device to interrupt the process of an accepted job. A ten-key pad 506 allows the user to set the entries of various settings. A clear key 507 is used to cancel various parameters such as entries set by the user via the key 506. A reset key 504 is used to accept, from the user, an instruction to invalidate various settings of a job to be processed by the user and restore the setting values to defaults. A user mode key 505 is used to shift to a system setup window for each user.

Figure 6:
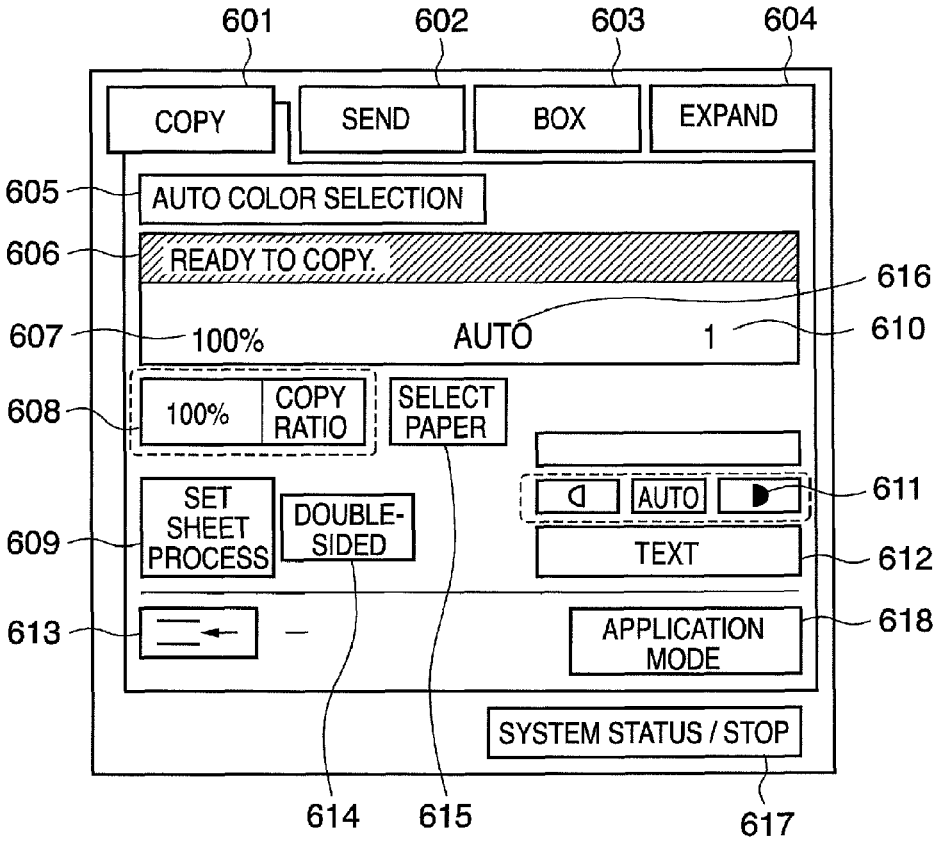
FIG. 6 is a view for explaining an example of display control on the UI unit to be controlled in the embodiment.

FIG. 6 is a view for explaining the touch panel unit (to be also referred to as a display unit) 401 serving as an example of a user interface unit provided by the printing system. The touch panel unit 401 has an LCD (Liquid Crystal Display), and a touch panel display formed from a transparent electrode adhered onto the LCD. The unit 401 has both a function of accepting various settings from an operator and a function of presenting information to the operator. For example, when it is detected that a user presses a portion corresponding to an effective display key on the LCD, the control unit 205 controls to display an operation window corresponding to the key operation on the display unit 401 in accordance with a display control program stored in advance in the ROM 207. FIG. 6 shows an example of an initial window displayed on the display unit 401 when the printing device is in the standby mode (state in which there is no job to be processed by the printing device).

When the user presses a copy tab 601 on the display unit 401 shown in FIG. 6, the control unit 205 causes the display unit 401 to display the operation window of the copy function provided by the printing device. When the user presses a send tab 602, the control unit 205 causes the display unit 401 to display the operation window of the data send function (e.g., FAX transmission or E-mail sending) provided by the printing device. When the user presses a box tab 603, the control unit 205 causes the display unit 401 to display the operation window of the box function provided by the printing device.

The box function uses a plurality of data storage boxes (to be referred to boxes hereinafter) which are virtually ensured in the HDD 209 in advance and are available discriminately for respective users. With the box function, the control unit 205 allows a user to select a desired one of boxes via the user interface unit, and accepts a desired operation from the user. For example, the control unit 205 responds to an instruction input from the user via the operation unit 204, and controls the HDD 209 to store document data of a job accepted from the scanner unit 201 of the printing device in a box selected by the user. The control unit 205 also makes it possible to store, e.g., text data of a job accepted from an external device (e.g., the PC 103 or 104) via the external I/F unit 202 in a box designated by the user in accordance with an instruction designated by the user of the external device via the user interface unit of the external device. The control unit 205 controls, e.g., the printer unit 203 to print job data stored in a box in the desired output form of a user in accordance with a user instruction from the operation unit 204, or controls the external I/F unit 202 to transmit the job data to an external device desired by the user.

To allow the user to execute various box operations, the control unit 205 controls the display unit 401 to display the box function operation window when the box tab 603 is pressed by the user. When the user presses an expand tab 604 on the display unit 401 of FIG. 6, the control unit 205 causes the display unit 401 to display a window for setting expansion functions such as scanner setting. When the user presses a system monitor key 617, the control unit 205 causes the display unit 401 to display a display window for notifying the user of the MFP state or status.

A color selection setting key 605 allows the user to select color copying, monochrome copying, or auto selection in advance. A copy ratio setting key 608 causes the display unit 401 to display a setup window which allows the user to set a copy ratio such as equal magnification, enlargement, or reduction.

When the user presses a double-sided key 614, the control unit 205 causes the display unit 401 to display a window which allows the user to set which of single-sided printing and double-sided printing is executed in the print process of a target job. When a sheet selection key 615 is pressed, the control unit 205 causes the display unit 401 to display a window which allows the user to set a sheet feed unit, sheet size, and sheet type (medium type) necessary for the print process of a target job. When a key 612 is pressed, the control unit 205 causes the display unit 401 to display a window which allows the user to select an image process mode (e.g., a text mode or photo mode) suited to an original document image. By operating a density setting key 611, the user can adjust the density of the output image of a job to be printed.

Referring to FIG. 6, the control unit 205 causes a status display field 606 of the display unit 401 to display the operation state (e.g., standby, warm-up, printing, jam, or error) of a current event in the printing device in order to have it confirmed by the user. The control unit 205 causes a display field 607 to display information for prompting the user to confirm the copy ratio of a job to be processed. The control unit 205 causes a display field 616 to display information for prompting the user to confirm the sheet size and sheet feed mode of a job to be processed. The control unit 205 causes a display field 610 to display information for prompting the user to confirm the number of copies of a job to be processed, and information for prompting the user to confirm the sheet number during printing. In this manner, the control unit 205 causes the display unit 401 to display various types of information to be announced to the user.

When a user presses an interrupt key 613, the control unit 205 stops printing a current job by the printing device, and executes printing of a job from the user. When the user presses an application mode key 618, the control unit 205 causes the display unit 401 to display a window for setting various image processes and layouts, such as two-page separation, cover sheet/slip sheet setting, reduction layout, and image movement.

Still another point of the embodiment will be described.

As a setting for a job to be processed, the control unit 205 causes the UI unit to execute a display for accepting a request from a user to execute a sheet process by the sheet processing unit of the inline type sheet processing device 200 of the printing system 1000. The control unit 205 also causes the UI unit to execute a display for accepting an instruction from the user to cause the UI unit to execute this display.

For example, the control unit 205 causes the display unit 401 to display a display key (the sheet process setting key 609) in FIG. 6. Assume that the user presses the sheet process setting key 609. Then, the control unit 205 causes the display unit 401 to execute a display for allowing the user to specify a desired sheet process among sheet process selection candidates executable using the inline type sheet processing device of the system 1000. The "sheet process setting key 609" illustrated in the display of FIG. 7 will also be referred to as a "finishing key" in FIG. 19 and subsequent drawings. That is, the "sheet process setting key 609" and "finishing key" mean the same function button. In the following description, a "sheet process" will also be referred to as "finishing". As for a "punching process", needs for various punching processes (processes to punch a printed sheet) are assumable in the POD environment.

Figure 19:
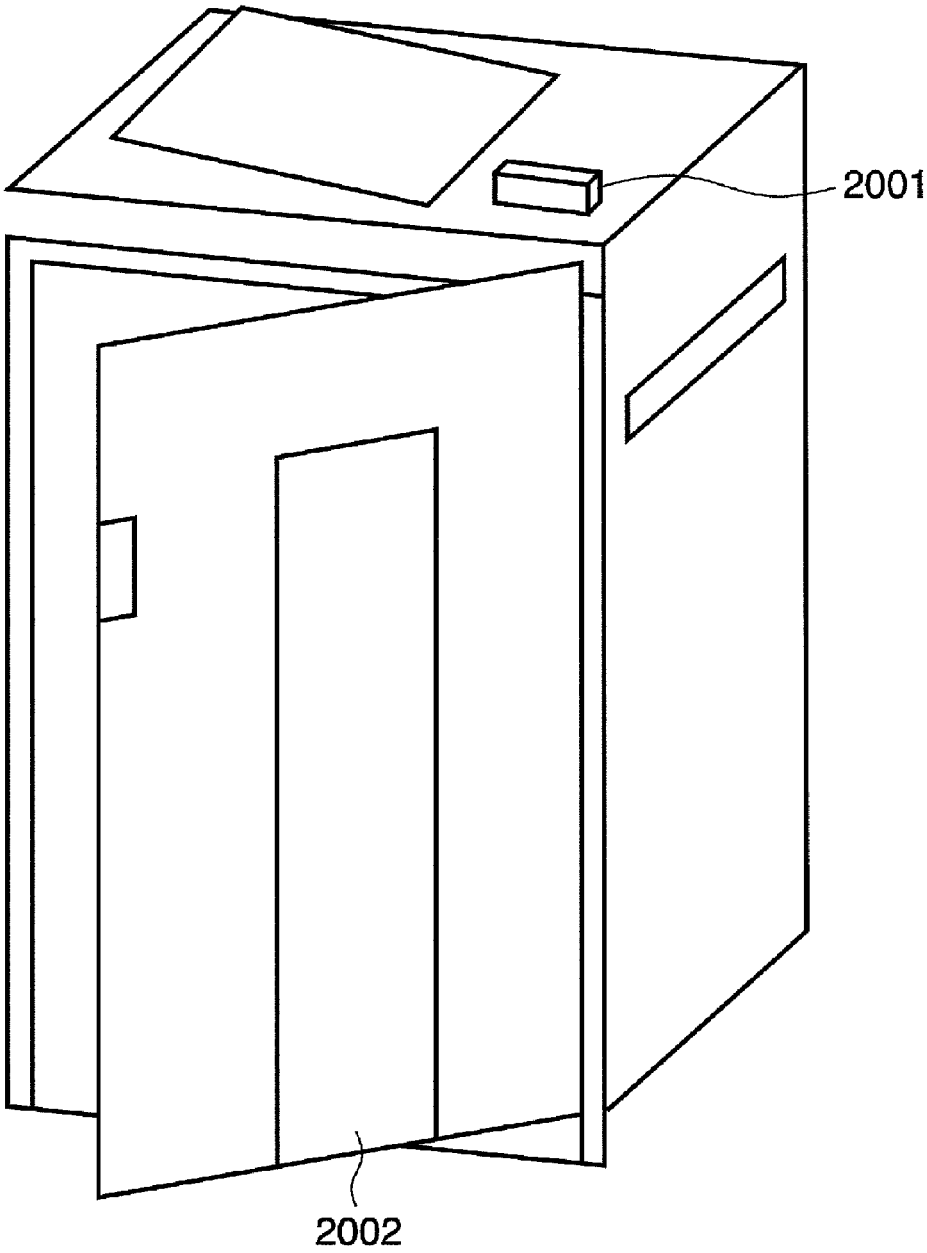
FIG. 19 is a view showing an example of the schematic appearance of a "large-volume stacker" described with reference to FIGS. 8A to 10B and 13.

Thus, FIG. 19 and subsequent drawings illustrate "two-hole punching (process to form two holes at a sheet end corresponding to a sheet binding edge)" and "multi-hole punching (process to form many holes such as 30 holes at a sheet end)" as a plurality of types of punching processes. These processes are executable by the punching unit of the saddle stitching device shown in FIGS. 8A to 10B in correspondence with the above configuration. Another device or unit may execute these punching processes. However, as described above, the use of a device which satisfies the definition of an inline finisher in the system 1000 is permitted, and the use of a different type of device in the system 1000 is inhibited.

Figure 7:
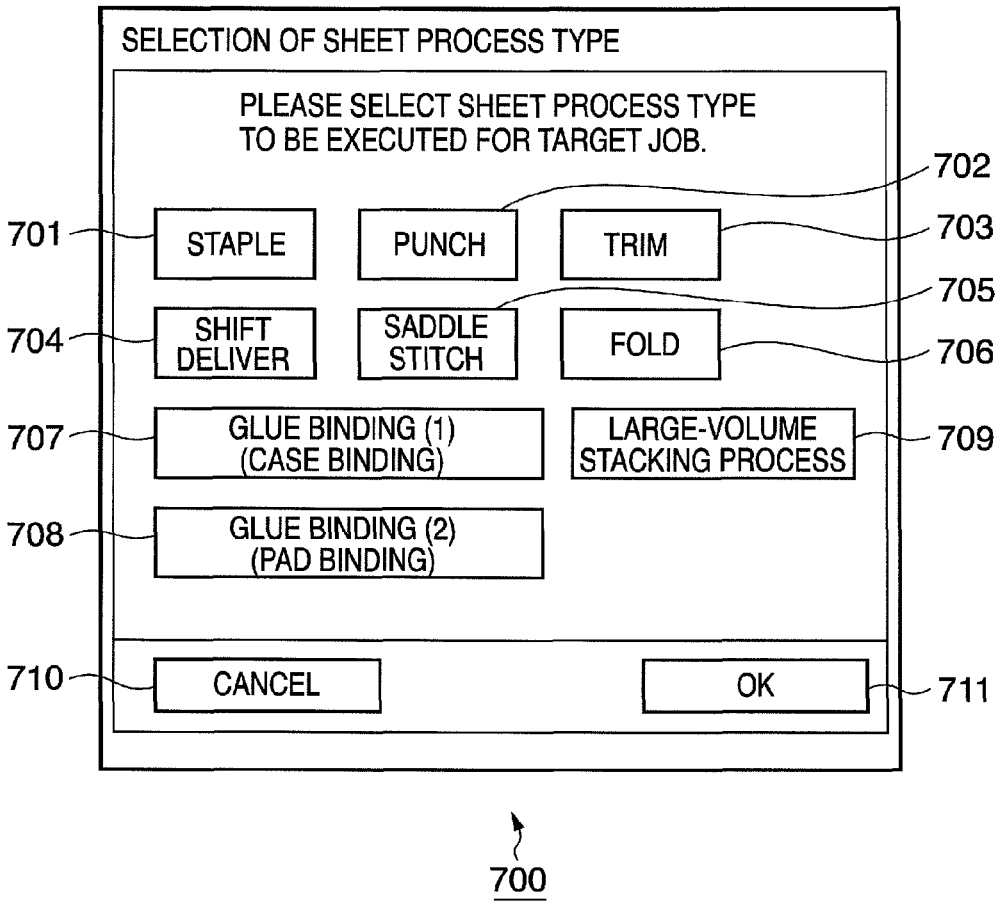
FIG. 7 is a view for explaining an example of display control on the UI unit to be controlled in the embodiment.

In this example, the control unit 205 causes the display unit 401 to execute a display in FIG. 7 in response to press of the key 609 by the user. The control unit 205 controls to accept, via the display of FIG. 7, a request to execute a sheet process by the inline sheet processing device 200 for a printed sheet of a job to be processed.

The control unit 205 determines sheet processing device candidates selectable via the display of FIG. 7 in accordance with the kind of sheet processing device attached to the system 1000 and the mounting status of the sheet processing device. For example, the display of FIG. 7 permits accepting a request from a user to execute any type of sheet process among the different types of sheet processes listed below for a sheet printed by the printer unit 203:

(1) a stapling process, (2) a punching process, (3) a folding process, (4) a shift delivery process, (5) a trimming process, (6) a saddle stitching process, (7) a case binding process as an example of a glue binding process, (8) a pad binding process as another example of a glue binding process, and (9) a large-volume stacking process.

In the UI control example of FIG. 7, the control unit 205 controls the operation unit 204 to set these nine sheet processes as selection candidates. This is because the inline type sheet processing devices of the printing system 1000 can be used to selectively execute these nine sheet processes.

In other words, the control unit 205 controls the UI unit to exclude a sheet process unexecutable by the system 1000 from selection candidates in the display of FIG. 7. For example, when the system 1000 does not comprise one sheet processing device capable of selectively executing a case binding process and pad binding process, or this sheet processing device is out of order, the control unit 205 controls to invalidate keys 707 and 708. For example, the control unit 205 grays out and hatches the keys 707 and 708. With this setting, the control unit 205 controls not to accept a request from a user to execute corresponding sheet processes. Further, when the system 1000 comprises a sheet processing device capable of executing a sheet process different from the above-mentioned nine candidates, the control unit 205 controls the display of FIG. 7 to validate a display key for accepting a request from a user to execute the different sheet process. With this display key, the control unit 205 permits accepting a request from a user to execute the sheet process. The embodiment can execute this display control together with job process control (to be described later), preventing any user operation error.

In executing this control, the control unit 205 acquires system configuration information for specifying what kind of sheet processing device the system 1000 comprises as the sheet processing device 200. In this control, the control unit 205 also uses, e.g., status information for specifying whether an error occurs in the sheet processing device 200. The control unit 205 acquires these pieces of information by having the user manually input them via the UI unit, or by an automated process on the basis of a signal output from the sheet processing device 200 via a signal line when the sheet processing device 200 connects to the printing device 100. On the premise of this configuration, the control unit 205 causes the display unit 401 to execute the display of FIG. 7 with display contents based on the acquired information.

The system 1000 can accept, from an external device such as the PC 103 or 104, a request to print a target job and a request to execute a sheet process necessary for the job. When inputting a job from the external device, the control unit 205 controls the display unit of the external device serving as a print data transmission source to display the same functions as those of the display in FIG. 7. In this example, the control unit 205 causes the display unit of a computer such as the PC 103 or 104 to display a printer driver setup window (to be described later). When the UI of the external device executes the display, the control unit of the external device executes the above control. For example, when the display unit of the PC 103 or 104 displays a printer driver UI window (to be described later), the control entity is the CPU of the PC.

[Concrete Example of Configuration of Printing System 1000 Controlled in Embodiment]

A system configuration representing how many and what kinds of inline type sheet processing devices are connectable to the printing device 100 in the printing system 1000, how to connect them, and what kinds of sheet processes they can execute will be explained with reference to FIGS. 8A and 83 and the like in association of a feature of the embodiment.

Figure 8A:
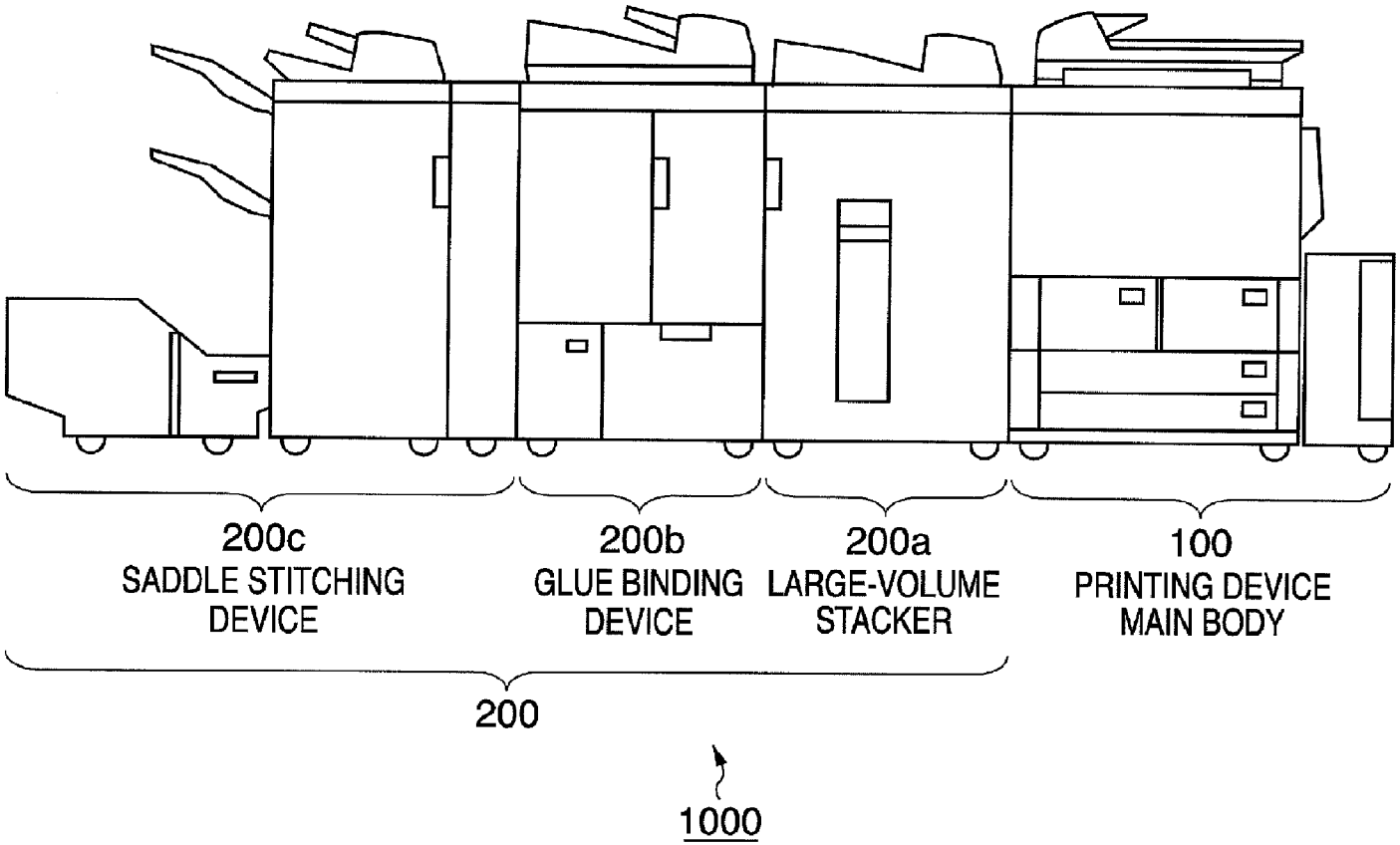
FIG. 8A is a view for explaining a control example of the printing system 1000 to be controlled in the embodiment.
Figure 8B:
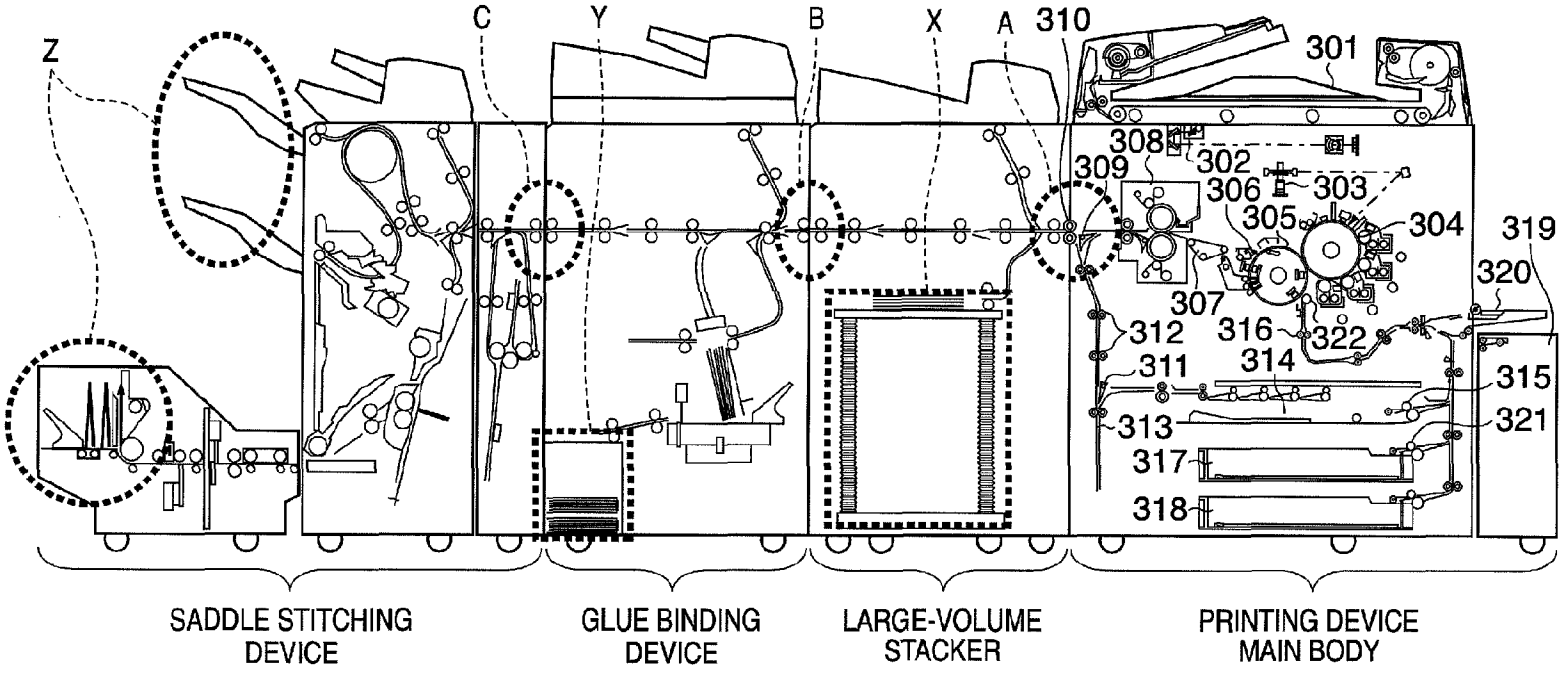
FIG. 8B is a view for explaining the control example of the printing system 1000 to be controlled in the embodiment.

The embodiment can implement, for example, a system configuration as shown in FIGS. 8A and 8B as the system 1000 shown in FIGS. 1 to 3.

In the system configuration example of FIG. 8A, the system 1000 comprises a total of three inline type sheet processing devices, i.e., a large-volume stacker, glue binding device, and saddle stitching device as a group of sheet processing devices 200. In the configuration example of FIG. 8A, the large-volume stacker, glue binding device, and saddle stitching device connect in the order named to the printing device 100 of the system 1000. The control unit 205 serving as an example of the control unit of the system 1000 comprehensively controls the printing system 1000 having the system configuration as shown in FIGS. 8A and 8B.

In this example, the large-volume stacker is a sheet processing device capable of stacking a large number (e.g., 5,000) of sheets from the printer unit 203.

The glue binding device in this example is a sheet processing device capable of executing a case binding process requiring a sheet gluing process when attaching a cover and binding a bundle of sheets printed by the printer unit 203. The glue binding device can also execute a pad binding process corresponding to a sheet process to glue and bind a bundle of sheets without attaching any cover. The glue binding device is also called a case binding device because it is a sheet processing device capable of executing at least a case binding process.

The saddle stitching device is a sheet processing device capable of selectively executing a stapling process, punching process, trimming process, shift delivery process, saddle stitching process, and folding process for sheets from the printer unit 203.

In the embodiment, the control unit 205 registers, in a specific memory, various types of system configuration information on these sheet processing devices as management information necessary for various control examples. For instance, when the system 1000 has the system configuration as shown in FIG. 8A, the control unit 205 registers the following pieces of information in the HDD 209.

(Information 1) Device presence/absence information which allows the control unit 205 to confirm that the system 1000 comprises an inline type sheet processing device. This information corresponds to information which allows the control unit to specify whether the system 1000 comprises an inline type sheet processing device.

(Information 2) Inline sheet processing device count information which allows the control unit 205 to confirm that the system 1000 comprises three inline type sheet processing devices 200. This information corresponds to information which allows the control unit to specify the number of inline type sheet processing devices of the system 1000.

(Information 3) Inline sheet processing device type information which allows the control unit 205 to specify that the system 1000 comprises the large-volume stacker, glue binding device, and saddle stitching device. This information corresponds to information which allows the control unit to confirm the types of inline type sheet processing devices of the system 1000.

(Information 4) Information which allows the control unit 205 to confirm that one of the three inline type sheet processing devices is a large-volume stacker capable of stacking sheets from the printer unit 203. Device performance information which allows the control unit 205 to confirm that another inline type sheet processing devices is a glue binding device capable of executing a glue binding process (case binding process and/or pad binding process) for sheets from the printer unit 203. Information which allows the control unit 205 to confirm that the remaining inline type sheet processing devices is a saddle stitching device capable of selectively executing stapling, punching, trimming, shift delivery, saddle stitching, and folding for sheets from the printer unit 203. In other words, information which allows the control unit 205 to specify that sheet processes executable by the system are a total of nine processes: stapling, punching, trimming, shift delivery, saddle stitching, folding, case binding, pad binding, and large-volume stacking. This information corresponds to information which allows the control unit to confirm performance information of sheet processes executable by the inline type sheet processing devices of the system 1000.

(Information 5) Information which allows the control unit 205 to confirm that the three sheet processing devices cascade-connect to the printing device 100 in the order of the large-volume stacker, glue binding device, and saddle stitching device. This information corresponds to connection order information of these sheet processing devices in the system when a plurality of inline finishers are connected.

The control unit 205 registers, in the HD 209, various types of information as represented by (information 1) to (information 5) as system configuration information necessary for various control examples. The control unit 205 utilizes the information as criterion information necessary for job control (to be described later).

On the premise of the above configuration, for example, the printing system 1000 has the system configuration as shown in FIG. 8A. Control executed by the control unit 205 in this system configuration will be exemplified.

For example, when the system 1000 has the system configuration in FIGS. 8A and 8B, it can execute all the nine sheet processes. The control unit 205 recognizes this on the basis of the criteria of (information 1) to (information 5). Based on the recognition result, the control unit 205 controls the UI unit so as to set all the nine sheet processes in the display of FIG. 7 as selection candidates. In addition, the control unit 205 executes the following control in response to a user operation.

For example, the control unit 205 accepts, from a user, a stapling process execution request for a target job via the UI unit in response to pressing of a key 701 by the user in the display of FIG. 7 executed by the UI unit under the control of the control unit 205. In response to this request, the control unit 205 causes the saddle stitching device serving as the sheet processing device 200c in FIG. 8A to staple printed sheets of the job.

For example, the control unit 205 accepts, from the user, a (sheet) punching process execution request for a target job via the UI unit when a key 702 is pressed in the display of FIG. 7 executed by the UI unit under the control of the control unit 205. In response to this request, the control unit 205 causes the saddle stitching device serving as the sheet processing device 200c in FIG. 8A to punch printed sheets of the job.

For example, the control unit 205 accepts, from the user, a trimming process execution request for a target job via the UI unit when a key 703 is pressed in the display of FIG. 7 executed by the UI unit under the control of the control unit 205. In response to this request, the control unit 205 causes the saddle stitching device serving as the sheet processing device 200c in FIG. 8A to trim printed sheets of the job.

For example, the control unit 205 accepts, from the user, a trimming process execution request for a target job via the UI unit when of a key 704 is pressed in the display of FIG. 7 executed by the UI unit under the control of the control unit 205. In response to this request, the control unit 205 causes the saddle stitching device serving as the sheet processing device 200c in FIG. 8A to trim printed sheets of the job.

For example, the control unit 205 accepts, from the user, a saddle stitching process execution request for a target job via the UI unit when a key 705 is pressed in the display of FIG. 7 executed by the UT unit under the control of the control unit 205. In response to this request, the control unit 205 causes the saddle stitching device serving as the sheet processing device 200c in FIG. 8A to saddle-stitch printed sheets of the job.

For example, the control unit 205 accepts, from the user, a folding process execution request for a target job via the UI unit when a key 706 is pressed in the display of FIG. 7 executed by the UI unit under the control of the control unit 205. In response to this request, the control unit 205 causes the saddle stitching device serving as the sheet processing device 200c in FIG. 8A to fold (e.g., Z-fold) printed sheets of the job.

For example, the control unit 205 accepts, from the user, a case binding process execution request for a target job via the UI unit when the key 707 is pressed in the display of FIG. 7 executed by the UI unit under the control of the control unit 205. In response to this request, the control unit 205 causes the glue binding device serving as the sheet processing device 200b in FIG. 8A to case-bind printed sheets of the job.

For example, the control unit 205 accepts, from the user, a pad binding process execution request for a target job via the UI unit when the key 708 is pressed in the display of FIG. 7 executed by the UI unit under the control of the control unit 205. In response to this request, the control unit 205 causes the glue binding device serving as the sheet processing device 200b in FIG. 8A to pad-bind printed sheets of the job.

For example, the control unit 205 accepts, from the user, a large-volume stacking process execution request for a target job via the UI unit when a key 709 is pressed in the display of FIG. 7 executed by the UI unit under the control of the control unit 205. In response to this request, the control unit 205 causes the large-volume stacker serving as the sheet processing device 200a in FIG. 8A to stack a large number of printed sheets of the job.

As described above, the control unit 205 controls to accept, via the UI unit together with a print execution request, a request to execute a sheet process desired by the user among selection candidates corresponding to sheet processes executable by the sheet processing devices of the system 1000. In response to accepting a request from the user via the UI unit provided by the embodiment to print a target job, the control unit 205 causes the printer unit 203 to execute a print process necessary for the job. Further, the control unit 205 causes a sheet processing device of the system 1000 to execute a sheet process necessary for printed sheets of the job.

As another feature of the embodiment, the control unit 205 executes the following control in the system 1000.

For example, the system 1000 has the system configuration as shown in FIG. 8A. That is, the printing system 1000 is built by connecting the printing device 100→the large-volume stacker→the glue binding device→the saddle stitching device in the order named. The internal system configuration in this case is as shown in FIG. 8B.

FIG. 8B is a sectional view of the devices of the whole printing system 1000 when the printing system 1000 has the system configuration shown in FIG. 8A. The device configuration in FIG. 8B corresponds to that in FIG. 8A.

FIG. 8B is a sectional view of the devices of the whole system 1000. The device configuration in FIG. 8B corresponds to that in FIG. 8A.

As is apparent from the internal device configuration in FIG. 8B, a sheet printed by the printer unit 203 of the printing device 100 is suppliable into the respective sheet processing devices. More specifically, as shown in FIG. 8B, the respective sheet processing devices comprise sheet feeding paths capable of feeding a sheet via points A, B, and C in the devices.

Each inline type sheet processing device such as the sheet processing device 200a or 200b in FIG. 8B has a function of receiving a sheet from a preceding device connected to the input side of the sheet processing device even if a target job does not require a sheet process executable by the sheet processing device. Each inline type sheet processing device has a function of transferring a sheet received from the preceding device to a succeeding device connected to the output side of the sheet processing device.

As described above, in the printing system 1000 of the embodiment, a sheet processing device, which executes a sheet process different from sheet processes necessary for a target job, has a function of conveying sheets of the target job from a preceding device to a succeeding device. This configuration is also a feature of the embodiment.

On the premise of the above system configuration, for example, when the printing system 1000 has the system configuration shown in FIGS. 8A and 8B, the control unit 205 executes the following control for the system 1000 for a job for which the user issues a print execution request via the UI unit according to the above-described method. A control example called (case 1) in FIG. 8B, a control example called (case 2) in FIG. 8B, and a control example called (case 3) in FIG. 8B will be sequentially explained as control examples executed by the control unit 205 for the system 1000 on condition that the system 1000 has the system configuration shown in FIGS. 8A and 8B.

The control example (case 1) in FIG. 8B will be explained which is control executed by the control unit 205 for the system 1000 on a condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 8A and 8B. In this case, the control unit 205 makes job sheets printed by the printing device 100 pass through point A in FIG. 8B, and causes the large-volume stacker to execute the sheet process. The control unit 205 holds the print result of the stacker job having undergone the sheet process (e.g., the stacking process) by the large-volume stacker, at a delivery destination X inside the large-volume stacker shown in FIG. 8B without conveying the print result to another device (e.g., an inline finisher positioned on the output side of the large-volume stacker in the system of FIG. 8B).

An operator can directly take out, from the delivery destination X, the printed material of the stacker job held at the delivery destination X in FIG. 8B. In other words, this configuration can omit a series of device operations and operator operations to convey sheets to a most downstream delivery destination Z in the sheet conveyance direction in FIG. 8B and take out the printed material of the stacker job from the delivery destination Z.

A series of control operations executed by the control unit 205 when the printing system 1000 has the system configuration in FIGS. 8A and 8B corresponds to the control example (case 1) in FIG. 8B.

The control example (case 2) in FIG. 8B will be explained which is control executed by the control unit 205 for the system 1000 on condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a case binding process or pad binding process) by the glue binding device after a print process. This job is called a "glue binding job".

A case will be explained in which the system 1000 processes the glue binding job when the system 1000 has the system configuration shown in FIGS. 8A and 8B. In this case, the control unit 205 makes job sheets printed by the printing device 100 pass through points A and B in FIG. 8B, and causes the glue binding device to execute the sheet process. The control unit 205 holds the print result of the glue binding job having undergone the sheet process (e.g., the case binding process or pad binding process) by the glue binding device, at a delivery destination Y inside the glue binding device shown in FIG. 8B without conveying the print result to another device (e.g., an inline finisher positioned on the output side of the glue binding device in the system of FIG. 8B).

The operator can directly take out, from the delivery destination Y, the printed material of the glue binding job held at the delivery destination Y in FIG. 8B. In other words, this configuration can omit a series of device operations and operator operations to convey sheets to the most downstream delivery destination Z in the sheet conveyance direction in FIG. 8B and take out the printed material of the glue binding job from the delivery destination Z.

A series of control operations executed by the control unit 205 when the printing system 1000 has the system configuration in FIGS. 8G and 8B corresponds to the control example (case 2) in FIG. 8B.

The control example (case 3) in FIG. 8B will be explained which is control executed by the control unit 205 for the system 1000 on condition that the system 1000 has the system configuration illustrated in FIGS. 8A and 8B. For example, when the system 1000 has the system configuration in FIGS. 8A and 8B, a target job whose print execution request is accepted from a user requires a sheet process (e.g., a saddle stitching process, punching process, trimming process, shift delivery process, or folding process) by the saddle stitching process after a print process. This job is called a "saddle stitching job".

A case will be explained in which the system 1000 processes the saddle stitching job when the system 1000 has the system configuration shown in FIGS. 8A and 8B. In this case, the control unit 205 makes job sheets printed by the printing device 100 pass through points A, B, and C in FIG. 8B, and causes the saddle stitching device to execute the sheet process. The control unit 205 holds the print result of the saddle stitching job having undergone the sheet process by the saddle stitching device, at the delivery destination Z of the saddle stitching device shown in FIG. 8B without conveying the print result to another device.

The delivery destination Z in FIG. 8B has a plurality of delivery destination candidates. This is because the saddle stitching device of the embodiment can execute a plurality of sheet processes and the delivery destination changes in each sheet process, which will be described with reference to FIG. 13.

A series of control operations executed by the control unit 205 when the printing system 1000 has the system configuration in FIGS. 8A and 8B corresponds to the control example (case 3) in FIG. 8B.

As described above, the control unit 205 serving as an example of the control unit of the embodiment also executes paper handling control based on system configuration information of the system 1000 that is stored in the HD 209.

Information corresponding to the system configuration information contains information representing whether the system comprises an inline finisher, and when the system comprises an inline finisher, information on the number of inline finishers and their performance information. When the system comprises a plurality of inline finishers, their connection order information is also contained in the system configuration information.

As shown in FIGS. 1 to 3, 8A, 8B, and the like, the printing system 1000 according to the embodiment enables connecting a plurality of inline type sheet processing devices to the printing device 100. As is apparent from a comparison between FIGS. 8A and 8B and FIGS. 9A, 9B, 10A, and 10B (to be described later), a plurality of inline type sheet processing devices can be independently connected or disconnected, or a free combination of them can be attached to the printing device 100. The connection order of inline type sheet processing devices is arbitrary as long as they are physically connectable. However, the embodiment imposes restrictions on the system configuration.

For example, a device permitted to be adopted as an inline type sheet processing device in the system 1000 must satisfy the following constituent components.

A sheet processing device can execute a sheet process for sheets of a job requiring a sheet process executable by the sheet processing device, and has a sheet conveyance function of receiving, from a preceding device, sheets of a job requiring no sheet process by the sheet processing device and transferring them to a succeeding device. In this example, this sheet processing device corresponds to the large-volume stacker and glue binding device shown in the system configuration of FIGS. 8A and 8B and that of FIGS. 9A and 9B (to be described later).

The embodiment also permits the use of a sheet processing device, which does not meet the above configuration, as an inline type sheet processing device in the system 1000. For example, this device satisfies the following components.

A sheet processing device can execute a sheet process for sheets of a job requiring a sheet process executable by the sheet processing device, but does not have the sheet conveyance function of receiving, from a preceding device, sheets of a job requiring no sheet process by the sheet processing device and transferring them to a succeeding device. In this example, this sheet processing device corresponds to the saddle stitching device shown in the system configuration of FIGS. 8A and 8B, that of FIGS. 9A and 9B, and that of FIGS. 10A and 10B (to be described later). The embodiment imposes restrictions on a device of this type.

For example, when the printing system 1000 employs an inline finisher (e.g., the saddle stitching device in FIGS. 8A and 8B) having no function of conveying sheets to a succeeding device, the number of devices of this type is limited to one. However, the embodiment permits simultaneous use of inline finishers of another type.

For example, the embodiment permits the use of the large-volume stacker and glue binding device together with the saddle stitching device, as represented by the system configuration of FIGS. 8A and 8B and that of FIGS. 9A and 9B (to be described later). When a plurality of sheet processing devices are cascade-connected and used, an inline type sheet processing device having no function of conveying sheets to a succeeding device is installed at the most downstream position in the sheet conveyance direction.

For example, the saddle stitching device is connected last in the system 1000, as represented by the system configuration of FIGS. 8A and 8B and that of FIGS. 9A and 9B (to be described later) That is, it is inhibited to configure the system by interposing the saddle stitching device between the large-volume stacker and the glue binding device, as a system configuration different from that of FIGS. 8A and 8B and that of FIGS. 9A and 9B (to be described later).

The control unit of the system comprehensively controls the system 1000 so as to operate under the above-described restrictions.

For example, if inline type sheet processing devices are connected in a connection order which violates the restrictions, the control unit 205 causes the UI unit to display a warning. For example, when a user inputs the connection order of sheet processing devices via the UI unit, as represented by the above-mentioned configuration, the control unit 205 controls to invalidate a user setting which violates the restrictions. For example, the control unit 205 executes gray-out display or hatching display to inhibit any improper connection setting.

By employing the above configuration, any user operation error, device malfunction, and the like can be prevented in the configuration of the embodiment. That is, this configuration further enhances effects described in the embodiment.

On the premise of this configuration, the embodiment can freely build the system configuration of the system 1000 under the restrictions.

For example, the operator of the POD system 10000 can arbitrarily determine and change the connection order of inline type sheet processing devices and the number of connected inline type sheet processing devices under the restrictions. The system 1000 executes control corresponding to the system configuration status. An example of this control will be described.

Figure 9A:
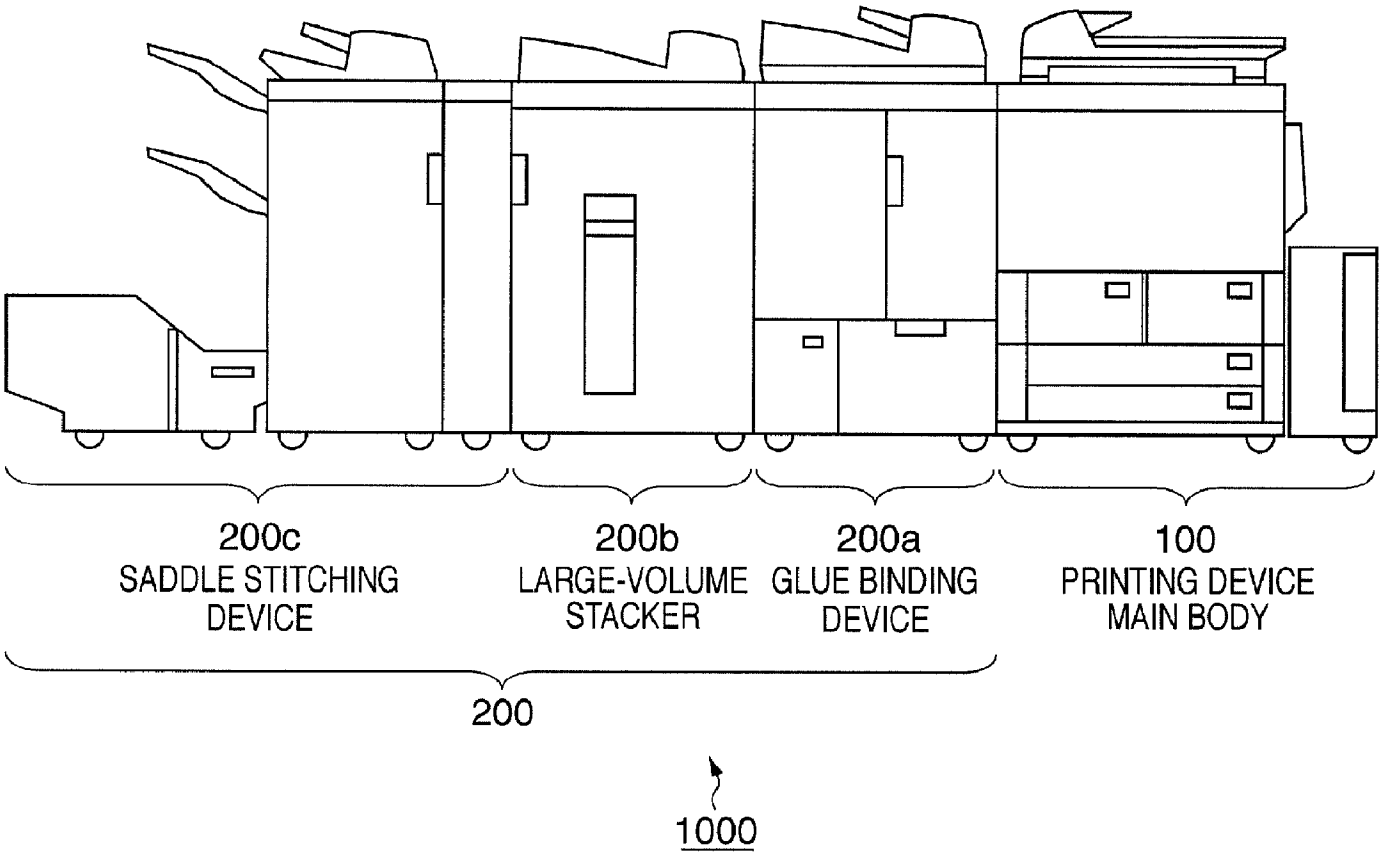
FIG. 9A is a view for explaining a control example of the printing system 1000 to be controlled in the embodiment.

The printing system 1000 can also take the system configuration in FIG. 9A, as an example of a system configuration in which the connection order of inline type sheet processing devices changes from that in the system configuration of FIG. 8A.

The system configuration of FIG. 9A is different from that of FIG. 8A in the connection order of inline sheet processing devices of the system 1000. More specifically, the printing system 1000 is built by connecting the printing device 100→the glue binding device→the large-volume stacker→the saddle stitching device in the order named. The internal system configuration in this case is as shown in FIG. 9B.

Figure 9B:
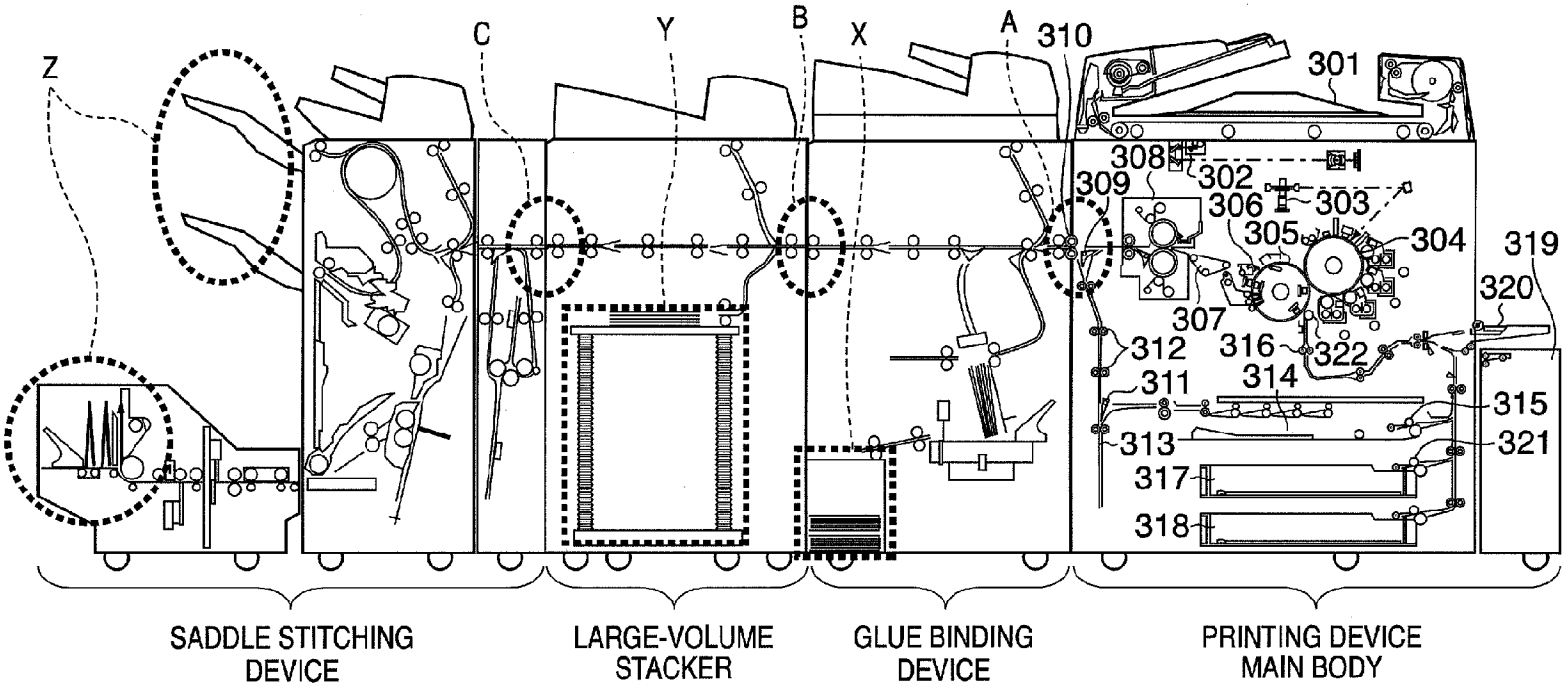
FIG. 9B is a view for explaining the control example of the printing system 1000 to be controlled in the embodiment.

FIG. 9B is a sectional view of the devices of the whole printing system 1000 when the printing system 1000 has the system configuration in FIG. 9A. The system configuration in FIG. 9B corresponds to the internal system configuration in FIG. 9A.

Similar to the above-described system configuration example, the internal system configuration in FIG. 9B can also supply a sheet printed by the printer unit 203 of the printing device 100 into the respective sheet processing devices. More specifically, as shown in FIG. 9B, the respective sheet processing devices comprise sheet feeding paths capable of feeding a sheet from the printer unit 203 via points A, B, and C in the devices.

The system configuration in FIGS. 9A and 9B also follows the above restrictions. For example, the sheet processing devices cascade-connect to the printing device 100 so as to install the saddle stitching device at the most downstream position in the sheet conveyance direction.

On the premise of the above system configuration, for example, when the printing system 1000 has the system configuration shown in FIGS. 9A and 9B, the control unit 205 executes the following control for a job for which the user issues a print execution request via the UI unit according to the above-described method. A control example called (case 1) in FIG. 9B, a control example called (case 2) in FIG. 9B, and a control example called (case 3) in FIG. 9B will be sequentially explained as control examples executed by the control unit 205 for the system 1000 on the condition that the system 1000 has the system configuration shown in FIGS. 9A and 9B.

The control example (case 1) in FIG. 9B which is control executed by the control unit 205 for the system 1000 on the condition that the system 1000 has the system configuration illustrated in FIGS. 9A and 9B will be explained. For example, when the system 1000 has the system configuration in FIGS. 9A and 9B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 9A and 9B. In this case, the control unit 205 makes job sheets printed by the printing device 100 pass through points A and B in FIG. 9B, and causes the large-volume stacker to execute the sheet process. The control unit 205 holds the print result of the stacker job having undergone the sheet process (e.g., the stacking process) by the large-volume stacker, at the delivery destination Y inside the large-volume stacker shown in FIG. 9B, without conveying the print result to another device (e.g., an inline finisher positioned on the output side of the large-volume stacker in the system of FIG. 9B).

An operator can directly take out, from the delivery destination Y, the printed material of the stacker job held at the delivery destination Y in FIG. 9B. In other words, this configuration can omit a series of device and operator operations to convey sheets to the most downstream delivery destination Z in the sheet conveyance direction in FIG. 9B, and take out the printed material of the stacker job from the delivery destination Z.

A series of control operations executed by the control unit 205 when the printing system 1000 has the system configuration in FIGS. 9A and 9B corresponds to the control example (case 1) in FIG. 9B.

The control example (case 2) in FIG. 9B which is control executed by the control unit 205 for the system 1000 on the condition that the system 1000 has the system configuration illustrated in FIGS. 9A and 9B will be explained. For example, when the system 1000 has the system configuration in FIGS. 9A and 9B, a target job whose print execution request is accepted from a user requires a sheet process (e.g., a case binding process or pad binding process) by the glue binding device after a print process. This job is called a "glue binding job".

A case will be explained in which the system 1000 processes the glue binding job when the system 1000 has the system configuration shown in FIGS. 9A and 9B. In this case, the control unit 205 makes job sheets printed by the printing device 100 pass through point A in FIG. 9B, and causes the glue binding device to execute the sheet process. The control unit 205 holds the print result of the glue binding job having undergone the sheet process (e.g., the case binding process or pad binding process) by the glue binding device, at the delivery destination X inside the glue binding device shown in FIG. 9B, without conveying the print result to another device (e.g., an inline finisher positioned on the output side of the glue binding device in the system of FIG. 9B).

The operator can directly take out, from the delivery destination X, the printed material of the glue binding job held at the delivery destination X in FIG. 9B. In other words, this configuration can omit a series of device and operator operations to convey sheets to the most downstream delivery destination Z in the sheet conveyance direction in FIG. 9B and take out the printed material of the glue binding job from the delivery destination Z.

A series of control operations executed by the control unit 205 when the printing system 1000 has the system configuration in FIGS. 9A and 9B corresponds to the control example (case 2) in FIG. 9B.

The control example (case 3) in FIG. 9B which is control executed by the control unit 205 for the system 1000 on the condition that the system 1000 has the system configuration illustrated in FIGS. 9A and 9B will be explained. For example, when the system 1000 has the system configuration in FIGS. 9A and 9B, a target job whose print execution request is accepted from a user requires a sheet process (e.g., a saddle stitching process, punching process, trimming process, shift delivery process, or folding process) by the saddle stitching process after a print process. This job is called a "saddle stitching job".

A case will be explained in which the system 1000 processes the saddle stitching job when the system 1000 has the system configuration shown in FIGS. 9A and 9B. In this case, the control unit 205 makes job sheets printed by the printing device 100 pass through points A, B, and C in FIG. 9B, and causes the saddle stitching device to execute the sheet process. The control unit 205 holds the print result of the saddle stitching job having undergone the sheet process by the saddle stitching device, at the delivery destination Z of the saddle stitching device shown in FIG. 9B without conveying the print result to another device.

The delivery destination Z in FIG. 9B has a plurality of delivery destination candidates. This is because the saddle stitching device of the embodiment can execute a plurality of sheet processes and the delivery destination changes in each sheet process, which will be described with reference to FIG. 13.

A series of control operations executed by the control unit 205 when the printing system 1000 has the system configuration in FIGS. 9A and 9B corresponds to the control example (case 3) in FIG. 9B.

As illustrated in FIGS. 8A, 8B, 9A, and 9B, the printing system 1000 can flexibly change the connection order of sheet processing devices permitted to be used as inline sheet processing devices under the restrictions. The present invention provides many mechanisms for maximizing the above-described effects of the embodiment.

From this viewpoint, in the embodiment, the system 1000 can properly employ a configuration other than the system configurations as shown in FIGS. 8A, 8B, 9A, and 9B. An example of this configuration will be explained below.

For example, the system configurations in FIGS. 8A, 8B, 9A, and 9B each comprise three inline type sheet processing devices. In the embodiment, a user can arbitrarily determine the number of inline type sheet processing devices under the restrictions.

Figure 10A:
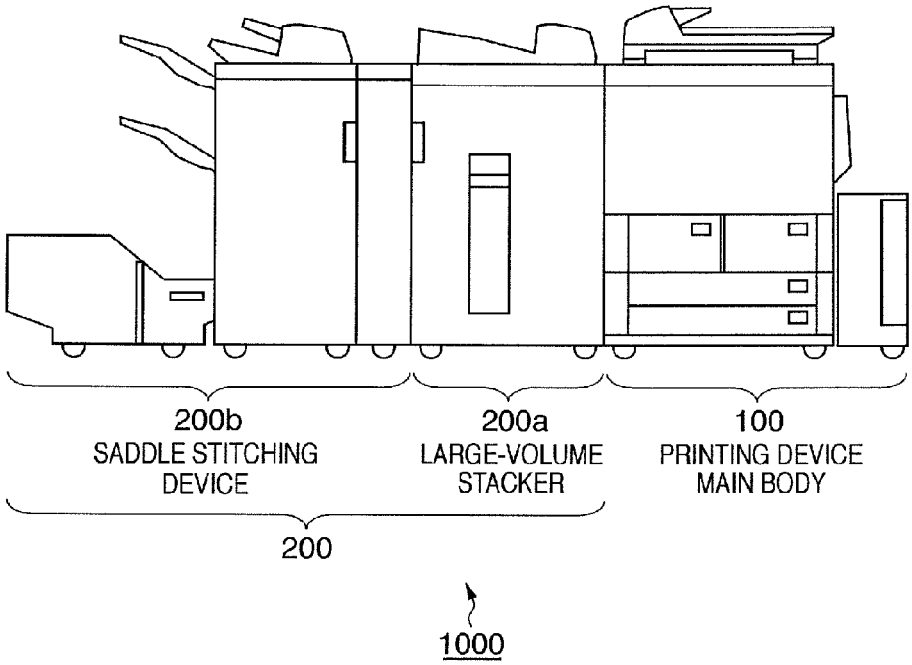
FIG. 10A is a view for explaining a control example of the printing system 1000 to be controlled in the embodiment.

For example, the printing system 1000 can also adopt the system configuration in FIG. 10A.

The system configuration of FIG. 10A is different from those of FIGS. 8A and 9A in the number of connected sheet processing devices. More specifically, the printing system 1000 is built by connecting two sheet processing devices in the order of the printing device 100→the large-volume stacker→the saddle stitching device. The internal system configuration in this case is as shown in FIG. 10B.

Figure 10B:
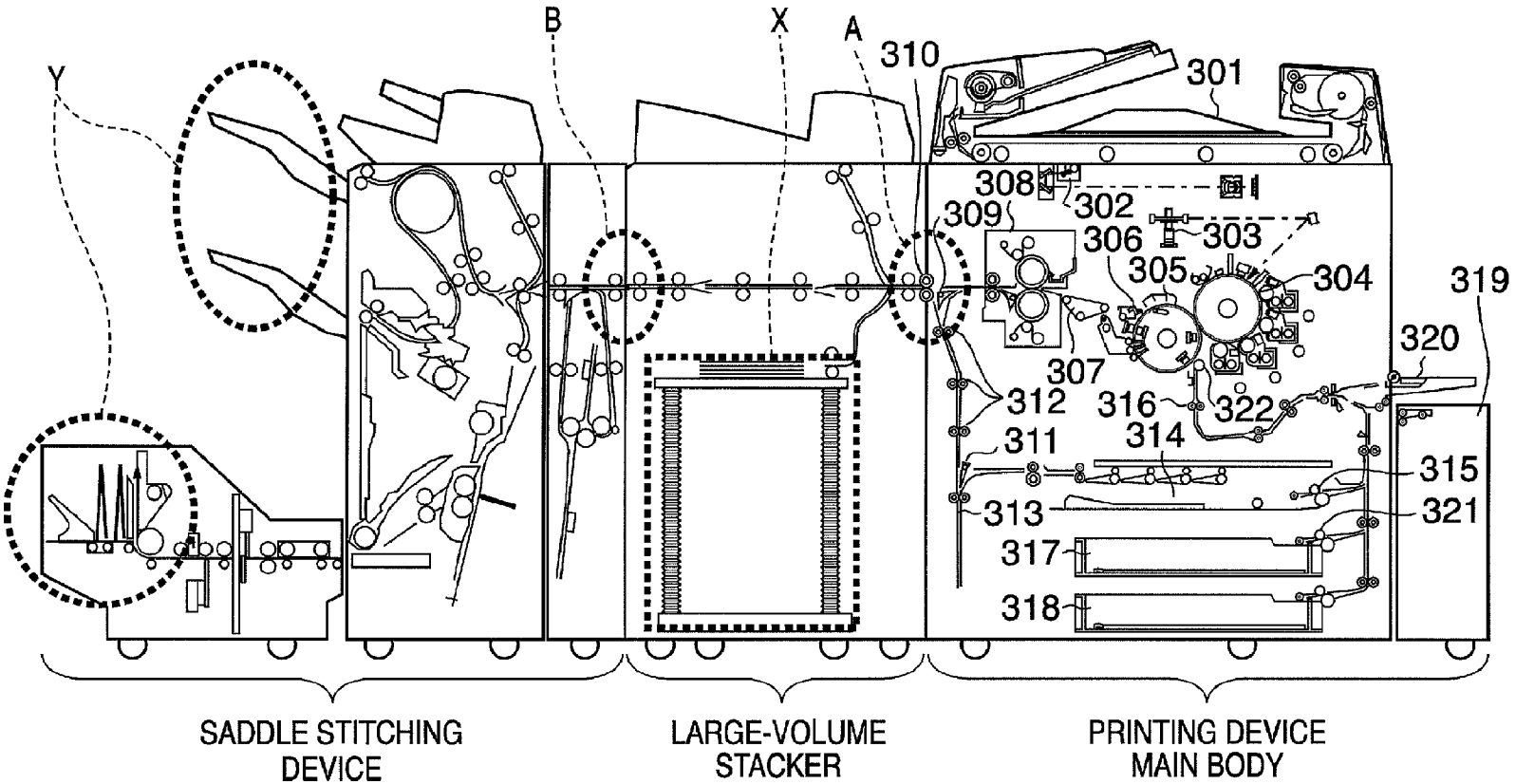
FIG. 10B is a view for explaining the control example of the printing system 1000 to be controlled in the embodiment.

FIG. 10B is a sectional view of the system configuration of the overall printing system 1000 when the printing system 1000 has the system configuration in FIG. 10A. The device configuration of FIG. 10B corresponds to that of FIG. 10A.

Similar to the above-described system configuration examples, the internal device configuration in FIG. 10B can also supply a sheet printed by the printer unit 203 of the printing device 100 into the respective sheet processing devices. More specifically, as shown in FIG. 10B, the respective sheet processing devices comprise sheet feeding paths capable of feeding a sheet via points A and B in the devices. This system configuration also follows the above restrictions. For example, the sheet processing devices are connected so as to install the saddle stitching device at the most downstream position in the sheet conveyance direction, as described above.

On the premise of the above system configuration, for example, when the printing system 1000 has the system configuration as shown in FIGS. 10A and 10B, the control unit 205 executes the following control for a job for which the user issues a print execution request via the UI unit according to the above-described method. A control example called (case 1) in FIG. 10B, a control example called (case 2) in FIG. 10B, and a control example called (inhibition control) in FIG. 10B will be sequentially explained as control examples executed by the control unit 205 for the system 1000 on the condition that the system 1000 has the system configuration shown in FIGS. 10A and 10B.

The control example (case 1) in FIG. 10B will be explained which is control executed by the control unit 205 for the system 1000 on condition that the system 1000 has the system configuration illustrated in FIGS. 10A and 10B. For example, when the system 1000 has the system configuration in FIGS. 10A and 10B, a target job whose print execution request is accepted from a user requires a sheet process (e.g., a stacking process) by the large-volume stacker after a print process. This job is called a "stacker job".

A case will be explained in which the system 1000 processes the stacker job when the system 1000 has the system configuration shown in FIGS. 10A and 10B. In this case, the control unit 205 makes job sheets printed by the printing device 100 pass through point A in FIG. 10B, and causes the large-volume stacker to execute the sheet process. The control unit 205 holds the print result of the stacker job having undergone the sheet process (e.g., the stacking process) by the large-volume stacker, at the delivery destination X inside the large-volume stacker shown in FIG. 10B, without conveying the print result to another device (e.g., an inline finisher positioned on the output side of the large-volume stacker in the system of FIG. 10B).

An operator can directly take out, from the delivery destination X, the printed material of the stacker job held at the delivery destination X in FIG. 10B. In other words, this configuration can omit a series of device and operator operations to convey sheets to the most downstream delivery destination Y in the sheet conveyance direction in FIG. 10B and take out the printed material of the stacker job from the delivery destination Y.

A series of control operations executed by the control unit 205 when the printing system 1000 has the system configuration in FIGS. 10A and 10B corresponds to the control example (case 1) in FIG. 10B.

The control example (case 2) in FIG. 10B will be explained which is control executed by the control unit 205 for the system 1000 on condition that the system 1000 has the system configuration illustrated in FIGS. 10A and 10B. For example, when the system 1000 has the system configuration in FIGS. 10A and 10B, a target job whose print execution request is accepted from a user requires a sheet process (e.g., a saddle stitching process, punching process, trimming process, shift delivery process, or folding process) by the saddle stitching process after a print process. This job is called a "saddle stitching job".

A case will be explained in which the system 1000 processes the saddle stitching job when the system 1000 has the system configuration shown in FIGS. 10A and 10B. In this case, the control unit 205 makes job sheets printed by the printing device 100 pass through points A and B in FIG. 10B, and causes the saddle stitching device to execute the sheet process. The control unit 205 holds the print result of the saddle stitching job having undergone the sheet process by the saddle stitching device, at the delivery destination Y of the saddle stitching device shown in FIG. 10B, without conveying the print result to another device.

The delivery destination Y in FIG. 10B has a plurality of delivery destination candidates. This is because the saddle stitching device of the embodiment can execute a plurality of sheet processes and the delivery destination changes in each sheet process, which will be described with reference to FIG. 13.

A series of control operations executed by the control unit 205 when the printing system 1000 has the system configuration in FIGS. 10A and 10B corresponds to the control example (case 2) in FIG. 10B.

In the system configuration of FIGS. 10A and 10B, the control unit 205 inhibits acceptance of a request from the user to execute a sheet process (e.g., a case binding process or pad binding process) by the glue binding device. This control is (inhibition control) in FIG. 10B which is control executed by the control unit 205 for the system 1000 on the condition that the system 1000 has the system configuration illustrated in FIGS. 10A and 10B. A detailed example of (inhibition control) in FIG. 10B will be described.

For example, when the printing system has the system configuration as in FIGS. 10A and 10B, the control unit 205 controls the UI unit to hatch or gray out the display keys 707 and 708 in causing the UI unit to execute the display of FIG. 7. In other words, the control unit 205 invalidates user operations to the keys 707 and 708.

When the system 1000 has the system configuration shown in FIGS. 10A and 10B, as described above, the control unit 205 inhibits the system 1000 from executing the glue binding process.

Control executed by the control unit 205 when the printing system 1000 has the system configuration in FIGS. 10A and 10B corresponds to (inhibition control) in FIG. 10B.

As described above, the control unit 205 executes various control examples depending on the number of connected inline type sheet processing devices in the printing system 1000. That is, the control unit 205 executes various control examples corresponding to sheet process types executable by the system 1000.

As is apparent from the description of FIGS. 8A to 10B and the like, the control unit of the printing system 1000 causes the system 1000 to execute various control examples corresponding to system configuration statuses (the number of connected inline sheet processing devices and the connection order) of the system 1000.

The embodiment flexibly changes the connection order of inline sheet processing devices and the number of connected inline sheet processing devices in the printing system 1000 so as to meet user needs because the embodiment considers all user merits.

The reason why each inline type sheet processing device permitted to be used in the system 1000 is an independent housing and is detachable from the printing device will be described.

As one reason, this mechanism considers a company or the like which does not require any case binding process but wants to perform a large-volume stacking process, as a POD company which is the delivery destination of the system 1000.

In the system use environment, a need to implement all nine sheet processes by inline sheet processing devices is expected. A need to implement only a specific sheet process by an inline sheet processing device may also arise. The embodiment provides a mechanism coping with various needs from respective POD companies serving as delivery destinations.

The reason why inline type sheet processing devices permitted to be used in the system 1000 can be arbitrarily changed in connection order and combined under the restrictions will be explained. This reason is also a reason for setting a delivery destination at which an operator can take out a printed material from each inline sheet processing device, as shown in FIGS. 8A, 8B, 9A, and 9B.

As one reason, user friendliness of the system 1000 improves by flexibly building the system in accordance with the frequencies of use of sheet processes requested in the printing system 1000.

For example, a POD company having the POD system 10000 in FIG. 1 tends to receive a relatively large number of print jobs requiring a case binding process for a user manual, guidebook, and the like, as print form needs from customers. In this use environment, it is more convenient to build the system 1000 not in the connection order as shown in FIGS. 8A and 8B but in the connection order as shown in FIGS. 9A and 9B.

In other words, it is more convenient to connect the glue binding device at a portion closer to the printing device 100. This is because a shorter sheet conveyance distance in the device necessary to execute a case binding process for a case binding job is effective.

For example, as the sheet conveyance distance is longer, the time taken to complete a printed material as the final product of the job is longer. As the sheet conveyance distance is longer, the jam generation rate in the device during a sheet conveyance operation is likely to be higher. These are reasons for the flexible connection order.

For a POD company which receives many case binding jobs as user needs, not the system configuration of FIGS. 8A and 8B but that of FIGS. 9A and 9B can shorten the sheet conveyance distance necessary to create a printed material of a case binding job, and allows for quick retrieval of the printed material.

Assume that another POD company tends to receive many jobs requiring large-volume sheet stacking. For this POD company, not the system configuration of FIGS. 9A and 9B but that of FIGS. 8A and 8B can shorten the sheet conveyance distance necessary to create a printed material of a stacker job, and allows for quick retrieval of the printed material.

In this fashion, the embodiment facilitates an increase in productivity of jobs in the printing system 1000 with an efficient, flexible system configuration suited to the use environment. In addition, the embodiment can provide many mechanisms which enhance the user friendliness of the system 1000.

Concrete examples of the internal structures of various inline type sheet processing devices available in the system 1000 illustrated in FIGS. 8A to 10B will be described for each sheet processing device.

[Internal Structure of Large-Volume Stacker]

Figure 11:
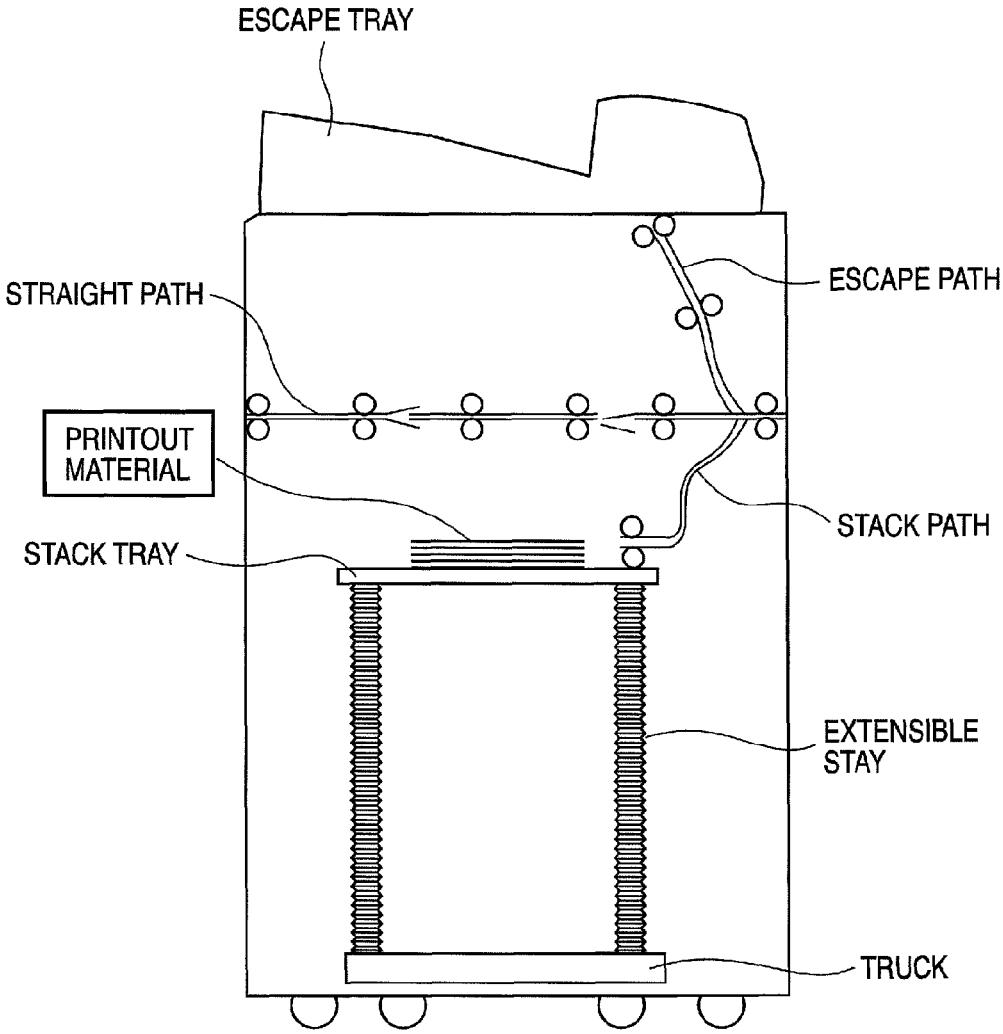
FIG. 11 is a sectional view for explaining an example of the internal structure of an inline finisher to be controlled in the embodiment.

FIG. 11 is a sectional view showing an example of the internal structure of the large-volume stacker in FIGS. 8A to 10B controlled by the control unit 205 in the embodiment.

In the large-volume stacker, the sheet feeding path extending from the printing device 100 is roughly divided into three paths: a straight path, escape path, and stack path, as shown in FIG. 11. The large-volume stacker incorporates these three sheet feeding paths.

Figure 12:
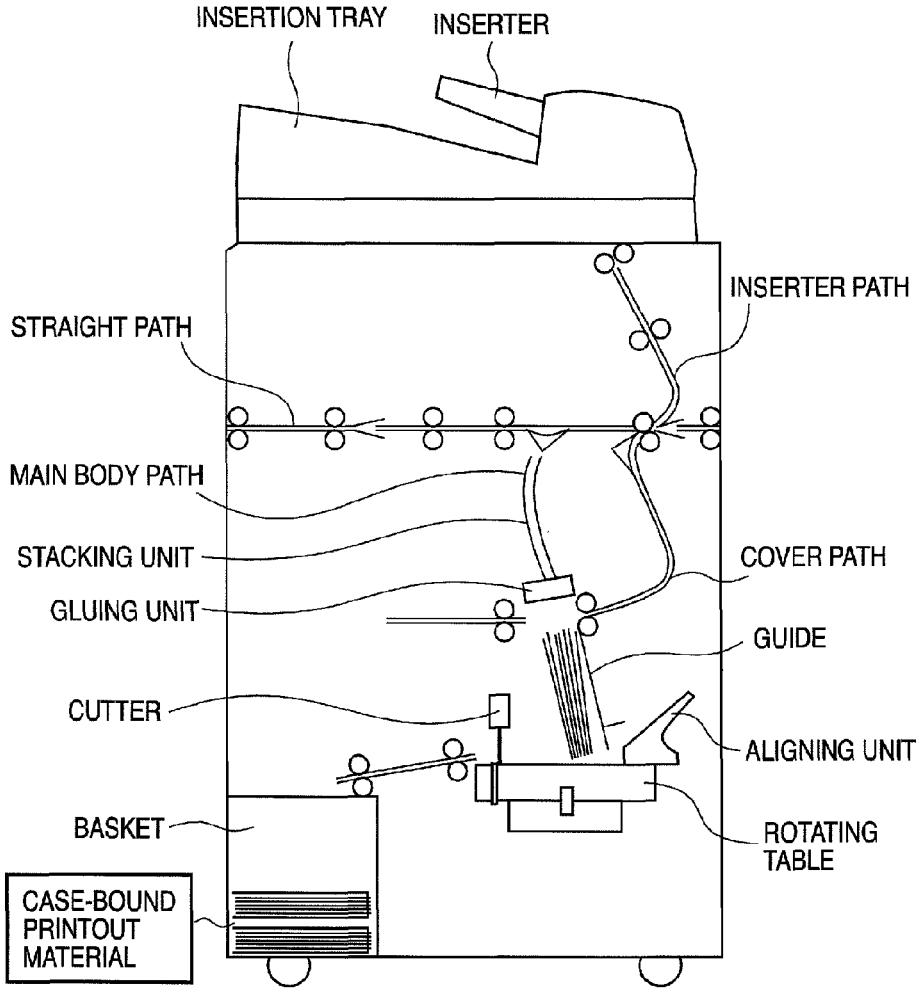
FIG. 12 is a sectional view for explaining an example of the internal structure of an inline finisher to be controlled in the embodiment.

The straight path of the large-volume stacker in FIG. 11 and that of the glue binding device in FIG. 12 function to transfer sheets received from a preceding device to a succeeding device, and are also called through paths in inline sheet processing devices in this example.

The straight path in the large-volume stacker is a sheet feeding path for transferring, to a succeeding device, sheets of a job requiring no sheet stacking process by the stacking unit of the stacker. In other words, the straight path is a unit for conveying sheets of a job requiring no sheet process by the sheet processing device from an upstream device to a downstream device.

The escape path in the large-volume stacker is used to output sheets without stacking them. For example, when no succeeding sheet processing device is connected, a printed material is conveyed to the escape path and taken out from the stack tray so as to quickly take out the printed material from the stack tray for the purpose of output confirmation work (proof print) or the like.

The sheet feeding path in the large-volume stacker comprises a plurality of sheet sensors necessary to detect the sheet conveyance status and jam.

The CPU (not shown) of the large-volume stacker notifies the control unit 205 of sheet detection information from each sensor via a signal line (signal line shown in FIG. 2 for electrically connecting the sheet processing device 200 and control unit 205) for communicating data with the control unit 205. Based on the information from the large-volume stacker, the control unit 205 grasps the sheet conveyance status and jam in the large-volume stacker. When the printing system is configured by cascade-connecting another sheet processing device between the large-volume stacker and the printing device 100, the CPU of the large-volume stacker notifies the control unit 205 via the CPU of the sheet processing device of sensor information of the large-volume stacker. As described above, the large-volume stacker comprises an arrangement unique to an inline finisher.

The stack path in the large-volume stacker is a sheet feeding path for causing the large-volume stacker to stack sheets of a job requiring a sheet stacking process by the stacking unit of the stacker.

For example, the system 1000 comprises the large-volume stacker shown in FIGS. 8A to 10B. In this system configuration status, the control unit 205 accepts a request from a user via the UI unit by a key operation to the key 709 in the display of FIG. 7 to execute a sheet stacking process executable by the stacker for a target job. The control unit 205 controls to convey sheets to the stack path of the large-volume stacker. The sheets conveyed to the stack path are delivered to the stack tray.

The stack tray in FIG. 11 is a stacking unit mounted on an extensible stay. A shock absorber or the like is attached to the joint between the stay and the stack tray. The control unit 205 controls the large-volume stacker to stack printed sheets of a target job using the stack tray. A truck supports the extensible stay from below. When attaching a handle (not shown) to the truck, the truck can carry stacked outputs to another offline finisher.

When the front door of the stacker unit is kept closed, the extensible stay moves up to a position where outputs are easily stacked. If an operator opens the front door (or issues an opening instruction), the stack tray moves downward.

Outputs can be stacked by flat stacking or shift stacking. Flat stacking means always stacking sheets at the same position. Shift stacking means stacking sheets with a shift in a far/near direction every number of copies or jobs so as to divide outputs for easy handling.

The large-volume stacker permitted to be used as an inline type sheet processing device in the system 1000 can execute a plurality of stacking methods when stacking sheets from the printer unit 203. The control unit 205 controls various operations for the stacker.

[Internal Structure of Glue Binding Device]

FIG. 12 is a sectional view showing an example of the internal structure of the glue binding device in FIGS. 8A to 108 controlled by the control unit 205 in the embodiment.

In the glue binding device, the sheet feeding path extending from the printing device 100 is roughly divided into three: a straight path, main body path, and cover path, as shown in FIG. 12. The glue binding device incorporates these three sheet feeding paths.

The straight path (through path) of the glue binding device in FIG. 12 is a sheet feeding path functioning to transfer, to a succeeding device, sheets of a job requiring no sheet glue binding process by the glue binding unit of the device. In other words, the straight path is a unit for conveying sheets of a job requiring no sheet process by the sheet processing device from an upstream device to a downstream device.

The sheet feeding path in the glue binding device comprises a plurality of sheet sensors necessary to detect the sheet conveyance status and jam.

The CPU (not shown) of the glue binding device notifies the control unit 205 of sheet detection information from each sensor via a signal line (signal line shown in FIG. 2 for electrically connecting the sheet processing device 200 and control unit 205) for communicating data with the control unit 205. Based on the information from the glue binding device, the control unit 205 grasps the sheet conveyance status and jam in the glue binding device. When the printing system is configured by cascade-connecting another sheet processing device between the glue binding device and the printing device 100, the CPU of the glue binding device notifies the control unit 205 via the CPU of the sheet processing device of sensor information of the glue binding device. In this manner, the glue binding device comprises an arrangement unique to an inline finisher.

The main body path and cover path in the glue binding device in FIG. 12 are sheet feeding paths for creating a case-bound printed material.

For example, according to the embodiment, the printer unit 203 prints the print data of a body by a case binding print process. Printed sheets are used as the body of an output material corresponding to a case-bound printed material of one bundle. In case binding, a sheet bundle of a body on which print data corresponding to the body (contents) is printed is called a "main body" in this example. A process to wrap the main body with one cover sheet is executed in the case binding process. The control unit 205 executes various sheet conveyance control examples to convey a cover sheet through the cover path, and convey sheets of the main body printed by the printer unit 203 to the main body path.

In this configuration, the control unit 205 accepts a request from a user via the UI unit by a key operation to the key 707 in the display of FIG. 7 to execute a case binding process executable by the glue binding device for a target job. The control unit 205 controls the device as follows.

For example, the control unit 205 sequentially accumulates sheets printed by the printer unit 203 on the stacking unit via the main body path in FIG. 12. After the stacking unit accumulates sheets of all pages on which body data necessary for sheets of one bundle for a job to be processed are printed, the control unit 205 conveys a cover sheet necessary for the job via the cover path.

Case binding has a matter associated with a feature of the embodiment. In a case binding process as an example of a glue binding process in this example, the number of sheets that can be processed as one sheet bundle is much larger than the number of sheets that can be processed as one sheet bundle by a sheet process different from the glue binding process. For example, the case binding process can process a maximum of 200 sheets as one sheet bundle of the body. To the contrary, the stapling process or the like can process a maximum of 20 print sheets as one sheet bundle, and the saddle stitching process can process a maximum of 15 print sheets. The allowable number of print sheets to be processed as one sheet bundle is greatly different between the glue binding process and other sheet processes.

In the embodiment, the control unit 205 can control an inline type sheet processing device to execute the case binding process as a glue binding process. Further, the embodiment can provide new finishing which is not requested in the office environment and is executable by an inline type sheet processing device. In other words, the above arrangement is one mechanism assuming the POD environment, and is associated with control to be described later.

Case binding can use a cover data pre-printed sheet conveyed from the inserter tray of the inserter of the glue binding device, as shown in FIG. 12. Case binding can also use a sheet bearing a cover image printed by the printing device 100. Either sheet is conveyed as a cover sheet to the cover path. Conveyance of the cover sheet is suspended below the stacking unit.

In parallel with this operation, the glue binding device executes a gluing process for a main body of sheets which bear all the pages of the body and are stacked on the stacking unit. For example, the gluing unit applies a predetermined amount of glue to the lower portion of the main body. After the glue spreads sufficiently, the pasted portion of the main body is attached to the center of the cover, covered, and joined. In joining, the main body is pushed down, and the covered main body slides onto a rotating table along the guide. The guide moves so that the covered main body falls onto the rotating table.

The aligning unit aligns the covered main body laid on the rotating table, and the cutter cuts an edge. The rotating table rotates through 90°, the aligning unit aligns the main body, and the cutter cuts the top edge. The rotating table rotates through 180°, the aligning unit aligns the main body, and the cutter cuts the tail edge.

After cutting, the aligning unit pushes the main body to an inner portion, putting the completed covered main body into a basket.

After the glue is satisfactorily dried in the basket, an operator can take out the completed case-bound bundle.

The glue binding device comprises a gluing unit which executes a glue binding process for sheets of a target job for which the user issues a glue binding process execution request together with a print execution request via the UI unit.

As described above with reference to the configuration, the glue binding process executable by an inline type sheet processing device in the embodiment has many process steps and many preparations, compared to other sheet processes. In other words, the glue binding process is different in configuration from sheet processes such as stapling and saddle stitching often used in the office environment. The process time taken to complete a requested sheet process is likely to be longer than those of other finishing processes. The embodiment pays attention to this point.

As is apparent from the glue binding function, the embodiment adopts a mechanism which applies not only to the office environment but also to a new printing environment such as the POD environment, pursues user friendliness and productivity, and puts a printing system and product into practical use. For example, new functions such as the case binding function and large-volume stacking function which are not supported in the office environment are provided as constituent features available even in the POD environment. As illustrated in FIGS. 8A to 10B, system configurations capable of connecting a plurality of inline type sheet processing devices to the printing device are also mechanisms for achieving this purpose.

It should be noted that the embodiment not only provides the above-described new functions and system configurations, but also finds out and examines problems to be tackled, such as use cases and user needs assumed in the use of the function configurations. One feature is to provide constituent features serving as solutions to the problems. In this way, the embodiment finds out and examines in advance market demands and the like as problems to newly equipped functions and system configurations, and employs mechanisms as configurations considering solutions to the problems when an office-equipment maker finds and enters a new market. This is also a feature of the embodiment. As an example of the constituent features, the control unit 205 executes various control examples in the embodiment.

[Internal Structure of Saddle Stitching Device]

Figure 13:
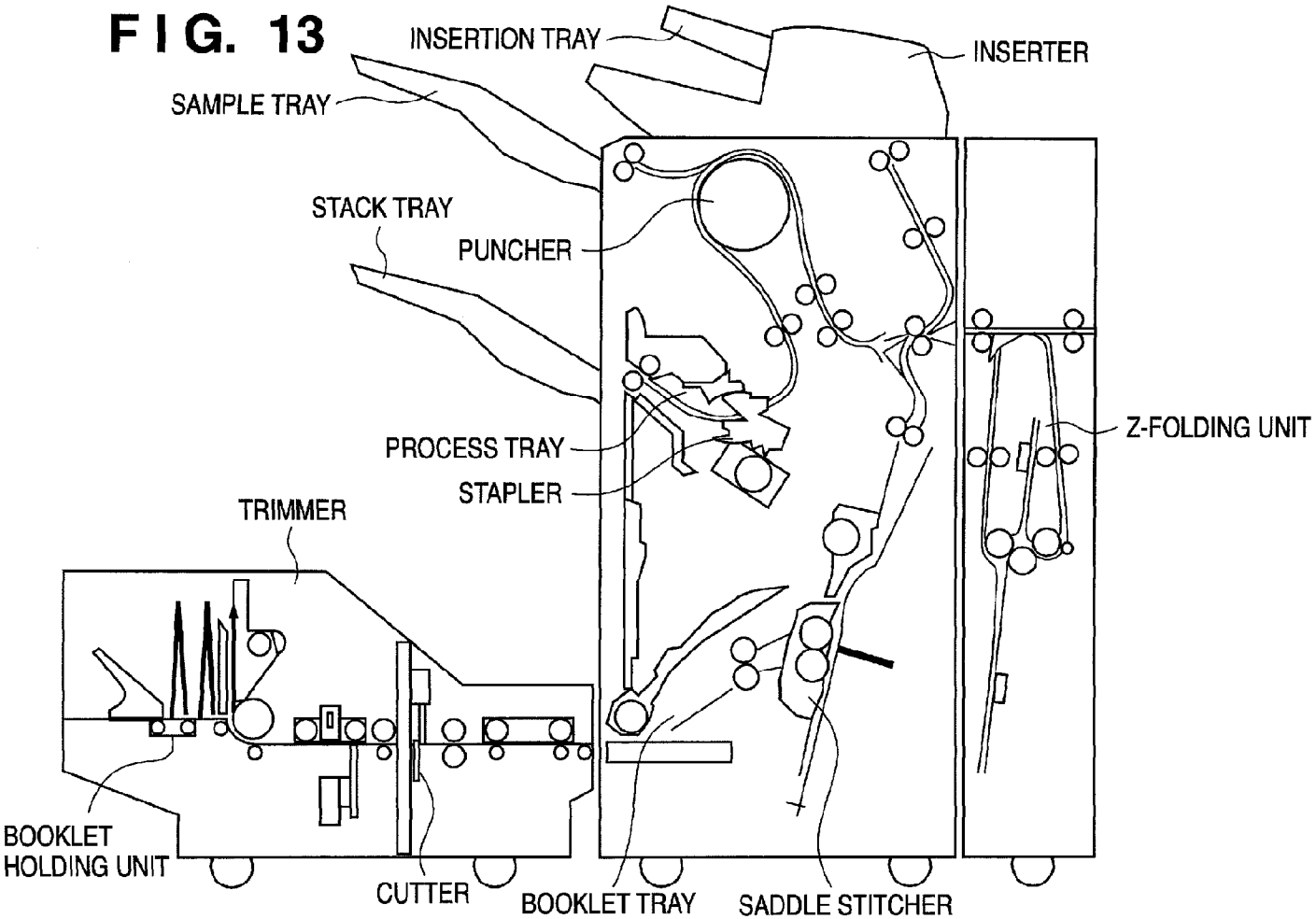
FIG. 13 is a sectional view for explaining an example of the internal structure of an inline finisher to be controlled in the embodiment.

FIG. 13 is a sectional view showing an example of the internal structure of the saddle stitching device in FIGS. 8A to 10B controlled by the control unit 205 in the embodiment.

The saddle stitching device incorporates various units for selectively executing a stapling process, trimming process, punching process, folding process, shift delivery process, and the like for sheets from the printing device 100. As described in the restrictions, the saddle stitching device does not have a through path serving as the function of conveying sheets to a succeeding device.

The sheet feeding path in the saddle stitching device comprises a plurality of sheet sensors necessary to detect the sheet conveyance status and jam.

The CPU (not shown) of the saddle stitching device notifies the control unit 205 of sheet detection information from each sensor via a signal line (signal line shown in FIG. 2 for electrically connecting the sheet processing device 200 and control unit 205) for communicating data with the control unit 205. Based on the information from the saddle stitching device, the control unit 205 grasps the sheet conveyance status and jam in the saddle stitching device. When the printing system is configured by cascade-connecting another sheet processing device between the saddle stitching device and the printing device 100, the CPU of the saddle stitching device notifies the control unit 205 via the CPU of the sheet processing device of sensor information of the saddle stitching device. The saddle stitching device comprises an arrangement unique to an inline finisher.

As shown in FIG. 13, the saddle stitching device comprises a sample tray, stack tray, and booklet tray. The control unit 205 controls to switch the unit for use in accordance with the job type and the number of discharged print sheets.

For example, the control unit 205 accepts a request from a user via the UI unit by a key operation to the key 701 in the display of FIG. 7 to execute a stapling process by the saddle stitching device for a target job. The control unit 205 controls to convey sheets from the printer unit 203 to the stack tray. Before discharging print sheets to the stack tray, they are sequentially accumulated on the process tray in the saddle stitcher for each job, and bound by a stapler on the process tray to discharge the print sheet bundle onto the stack tray. According to this method, the control unit 205 causes the saddle stitching device to staple sheets printed by the printer unit 203.

The saddle stitching device further comprises a Z-folding unit for folding a sheet in three (Z shape), and a puncher for forming two (or three) holes for filing. The saddle stitching device executes a process corresponding to each job type. For example, when the user sets the Z-folding process via the operation unit as a setting associated with a print sheet process for a job to be output, the control unit 205 controls the Z-folding unit to fold print sheets of the job. Then, the control unit 205 controls to make the print sheets pass through the device, and deliver them onto a discharge tray such as the stack tray or sample tray. For example, when the user sets the punching process via the operation unit as a setting associated with a print sheet process for a job to be output, the control unit 205 controls the puncher to punch print sheets of the job.

Then, the control unit 205 controls to make the print sheets pass through the device, and deliver them onto a discharge tray such as the stack tray or sample tray.

The saddle stitcher performs a saddle stitching process to bind print sheets at two center portions, pinch the print sheets at their center by rollers, fold them in half, and create a booklet like a pamphlet.

Print sheets bound by the saddle stitcher are discharged onto the booklet tray. Whether a print sheet processing operation such as a bookbinding process by the saddle stitcher is executable is also based on print sheet process settings made by the user for a job to be output.

The inserter sends print sheets set on the inserter tray to a discharge tray such as the stack tray or sample tray without supplying the print sheets to the printer. The inserter can insert a print sheet set on the inserter between print sheets (sheets printed by the printer unit) sent into the saddle stitcher. The user sets print sheets face up on the inserter tray of the inserter. The pickup roller sequentially feeds print sheets from the top. A print sheet from the inserter is directly conveyed to the stack tray or sample tray, and discharged facing down. To send a print sheet to the saddle stitcher, the print sheet is fed to the puncher once, and then switched back and fed to adjust the face orientation.

Whether a print sheet processing operation such as a print sheet insertion process by the inserter is executable is also based on print sheet process settings made by the user for a job to be output.

In the embodiment, for example, the saddle stitching device also incorporates a cutter (trimmer), which will be described below.

A (saddle-stitched) booklet output from the saddle stitcher enters the trimmer. At this time, the booklet output is fed by a predetermined length by the roller, and cut by a predetermined length by the cutter to align uneven edges between pages of the booklet. The resultant booklet is stored in a booklet holding unit. Whether a print sheet processing operation such as a trimming process by the trimmer is executable is also based on print sheet process settings made by the user for a job to be output.

As described above, the saddle stitching device comprises a saddle stitcher which executes a saddle stitching process for sheets of a target job for which the user issues a saddle stitching process execution request together with a print execution request via the UI unit.

Figure 14:
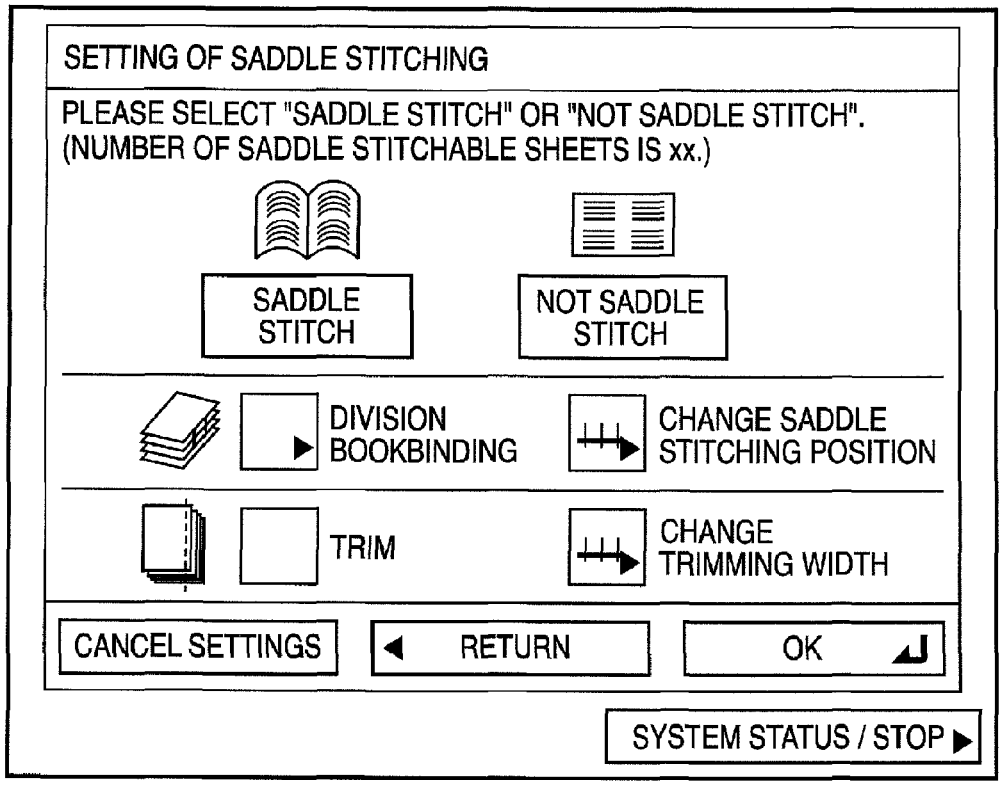
FIG. 14 is a view for explaining an example of display control on the UI unit to be controlled in the embodiment.

For example, when a user selects saddle stitching with the key 705 in the display of FIG. 7, the control unit 205 causes the UI unit to execute a display in FIG. 14. The control unit 205 controls to accept detailed settings of saddle stitching via the display in FIG. 14. For example, the control unit 205 determines whether to actually saddle-stitch sheets near their center with staples. The control unit 205 can also accept a setting such as division bookbinding, change of the saddle stitching position, execution/non-execution of trimming, or change of the trimming width from the user.

Figure 15:
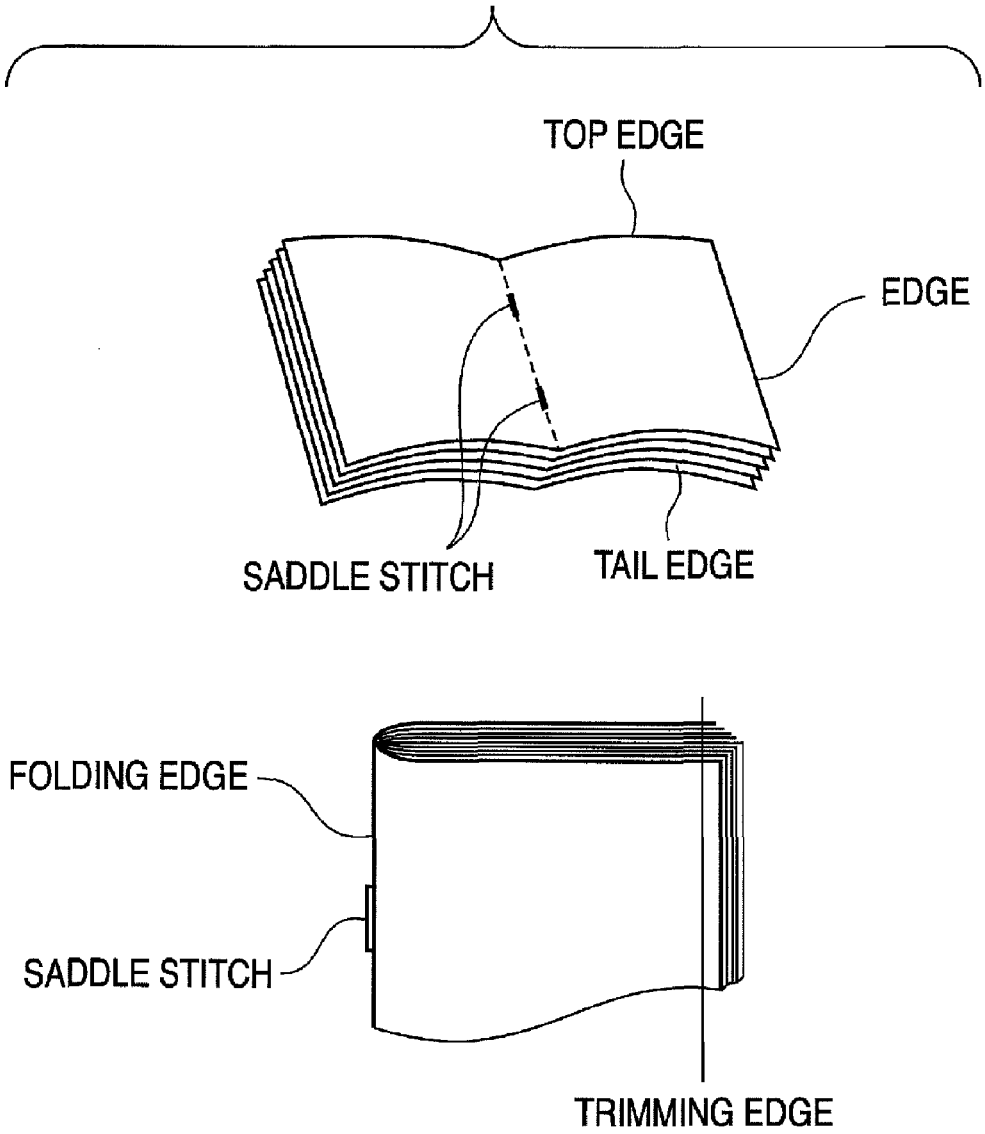
FIG. 15 is a view for explaining a control example when the printing system 1000 to be controlled in the embodiment creates a printed material.

Assume that the user sets "saddle-stitch" and "cut" via the display in FIG. 14 executed by the UI unit under the control of the control unit 205. In this case, the control unit 205 controls the operation of the system 1000 to form a target job into a print style as shown in FIG. 15 as the print result of saddle stitching. As represented by the print result of saddle stitching in FIG. 15, saddle stitches are put, and the edge is trimmed. By setting the positions of the saddle stitch and trimming edge in advance, they can be changed to desired positions.

Figure 16:
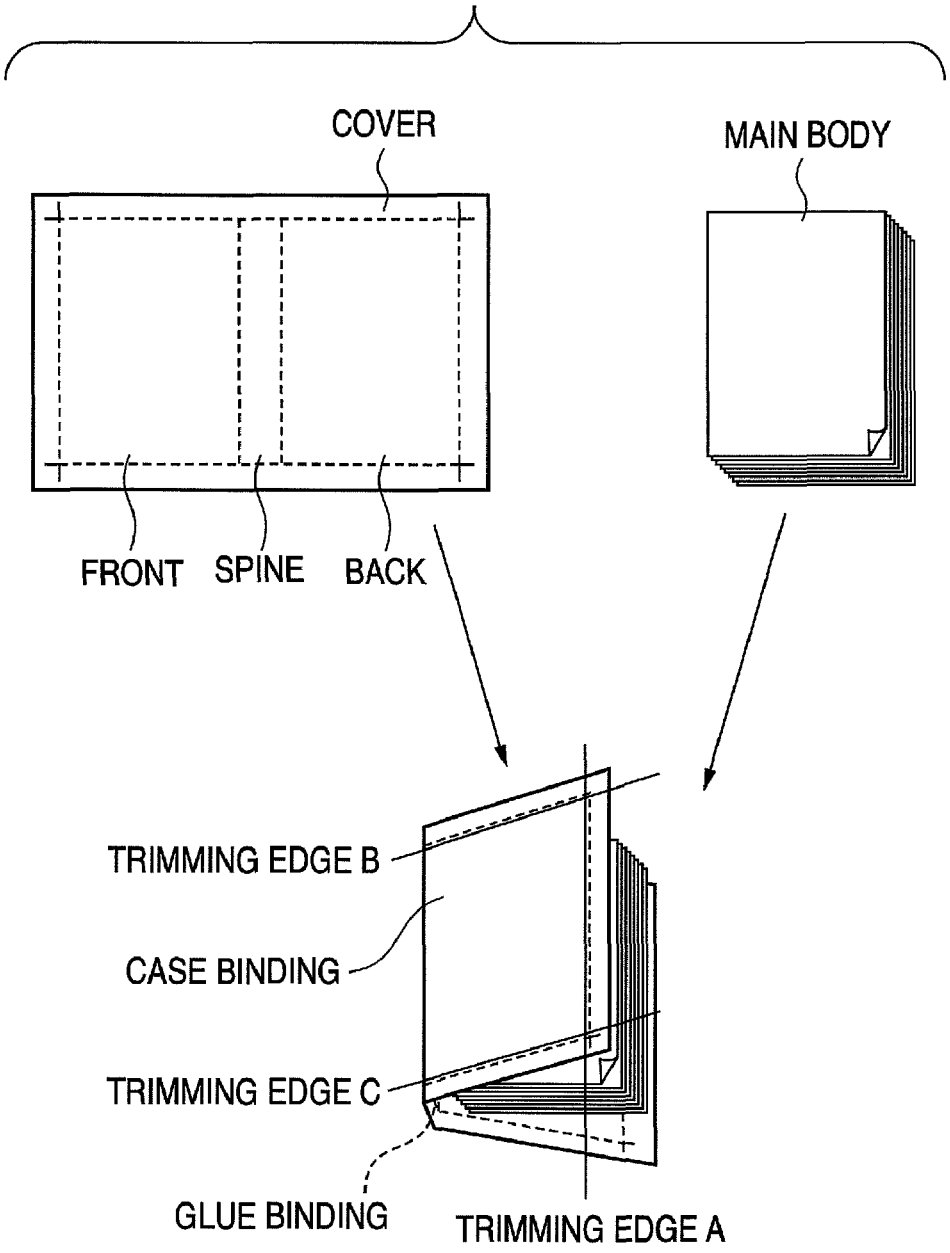
FIG. 16 is a view for explaining a control example when the printing system 1000 to be controlled in the embodiment creates a printed material.

When the user requests execution of a case binding process with the key 707 in the display of FIG. 7, the control unit 205 controls the system 1000 so as to form a target job into a print style as shown in FIG. 16 as the print result of case binding. As represented by the example in FIG. 16, the trimming widths of trimming edges A, B, and C can be set for a printed material subjected to case binding.

The printing system 1000 can accept a target job print execution request and sheet process execution request even from an information processing device serving as an example of an external device. An example when a host computer uses the printing system 1000 will be described.

For example, the system 1000 is controlled as follows when operated by a host computer (e.g., the PC 103 or 104 in FIG. 1) which downloads program data for various processes and control examples in the embodiment from a data supply source (e.g., a WEB) or a specific storage medium. The control entity is the control unit of the PC.

Figure 17A:
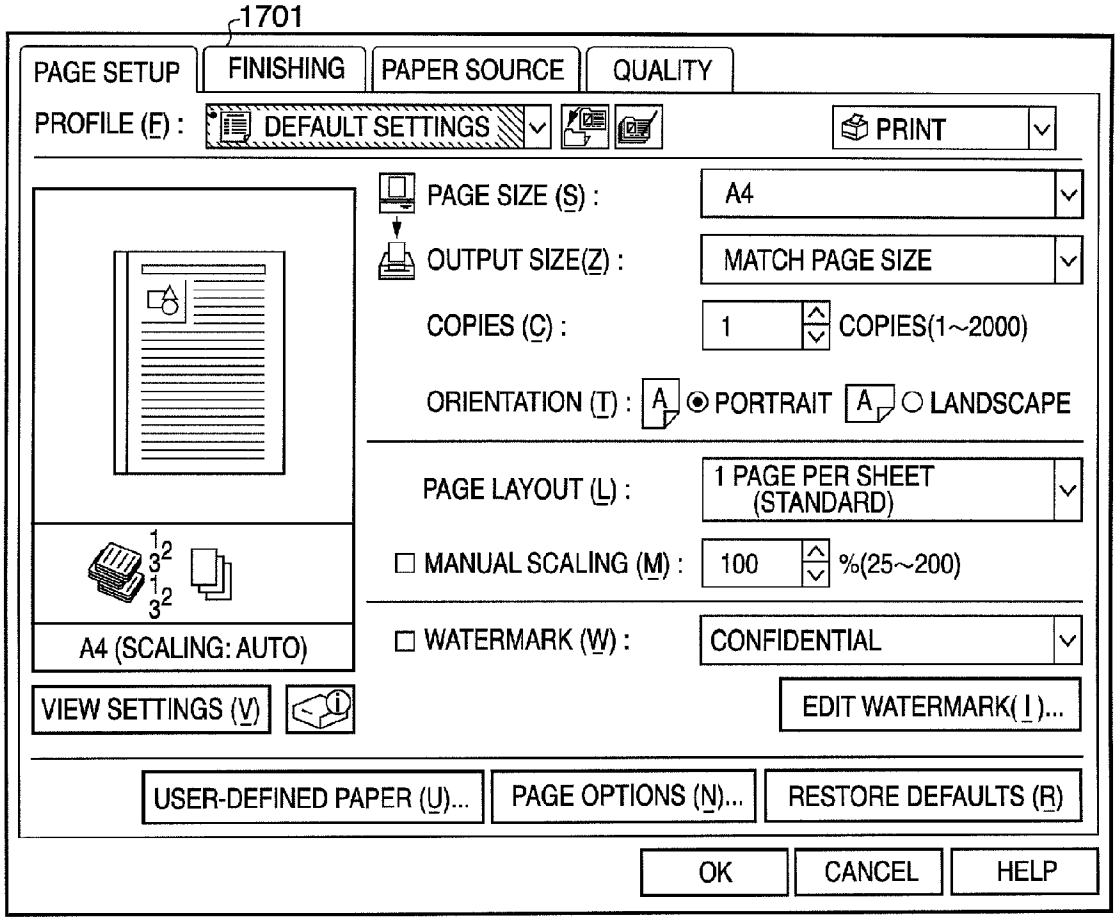
FIG. 17A is a view for explaining an example of display control on the UI unit to be controlled in the embodiment.
Figure 17B:
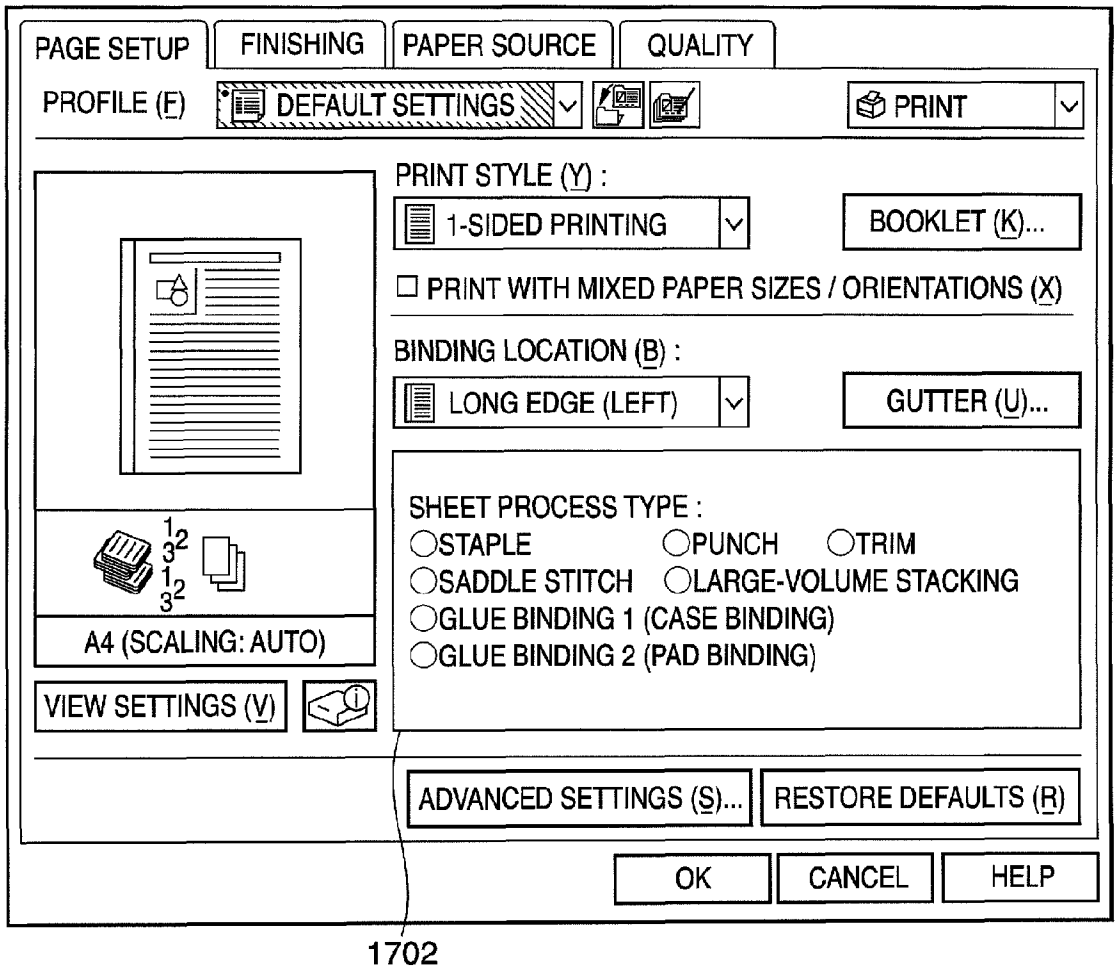
FIG. 17B is a view for explaining an example of display control on the UI unit to be controlled in the embodiment.

Assume that an instruction to activate a printer driver for operating the printing device 100 of the system 1000 is issued in response to a mouse or keyboard operation by a user. In response to the instruction, the CPU of the host computer displays a print setup window shown in FIG. 17A on the display unit of the host computer. FIGS. 17A and 17B are views showing examples of user interface windows controlled in the embodiment.

For example, the user presses a finishing key 1701 with the mouse on the operation window of FIG. 17A or 17B. Then, the CPU of the host computer controls the display unit to switch the print setup window to one as shown in FIG. 17B.

The CPU of the host computer allows the user to select a sheet process type to be executed by the inline type sheet processing device 200 of the system 1000 via the sheet process setting item 1702 on the print setup window of FIG. 17A or 17B.

Although not shown, the external device including the host computer displays, as windows other than those in FIGS. 17A and 17B, display windows capable of inputting instructions equivalent to those that can be input via various display windows described in detail in the embodiment. In other words, the external device can execute the same processes and control examples as those described in the embodiment.

The user selects a desired sheet process via the setting item 1702, and returns to the window in FIG. 17A or 17B to press the OK key.

In response to this, the CPU of the host computer associates, as one job, commands representing various printing conditions set by the user via the print setup window with a series of data to be printed by the printer unit 203, and transmits the job to the system 1000 via the network 101.

After the external I/F unit 202 of the system 1000 receives the job from the computer, the control unit 205 of the system controls the system 1000 to process the job from the host computer based on process components set by the user on the host computer.

The above configuration can obtain various effects described in the embodiment even for a job from an external device or the like, and can further increase the use efficiency of the system 1000.

The control unit of the printing system 1000 according to the embodiment executes various control examples to be described below on the premise of the above-described constituent features.

The configurations described with reference to FIGS. 1 to 17B correspond to constituent features common to all examples in the embodiment. For example, various control examples described in the embodiment correspond to constituent features based on these configurations.

As described with reference to FIGS. 1 to 17B, the printing system 1000 according to the embodiment can construct a printing environment suitable not only for the office environment but also for the POD environment.

For example, the system 1000 employs a mechanism capable of coping with use cases and user needs which are assumed to be not in the office environment but in the POD environment.

For example, a POD company can receive orders of various print forms from customers in the POD environment.

More specifically, an inline sheet processing device can implement finishing (e.g., a glue binding process or large-volume stacking process) which is not requested as a user need in the office environment. In other words, the embodiment can deal with even user needs other than needs (e.g., for stapling) in the office environment in consideration of the POD environment. For example, the printing system 1000 can flexibly cope with the business form of a POD company which does business in the POD environment where the printing system 1000 is delivered.

For example, a plurality of inline sheet processing devices are connectable to the printing device 100, and each inline sheet processing device can independently operate as an independent housing, as described above. The number of connected sheet processing devices is arbitrary, and the printing system 1000 can flexibly add or change an inline sheet processing device.

The embodiment designs the printing system 1000 while paying attention to the operability of the user of the printing system 1000. For example, the embodiment allows an operator to manually register the system configuration of the printing system 1000 in the HD 209. This configuration will be exemplified.

For example, a POD company wants to build the system configuration shown in FIGS. 8A and 8B as the system configuration of the printing system 1000. In this case, the operator of the POD company connects three sheet processing devices in FIGS. 8A and 8B purchased together with the printing device 100 to the printing device in the connection order shown in FIGS. 8A and 8B. Then, the operator presses the user mode key 505 of the operation unit 204. In response to this key operation, the control unit 205 causes the display unit 401 to execute a display in FIG. 18A.

The display in FIG. 18S allows the operator to manually input system configuration information of the printing system 1000. The control unit 205 allows the operator via displays in FIGS. 18A to 18D to determine the types of inline type sheet processing devices to be connected to the printing device 100. In addition, the control unit 205 allows the operator via the displays in FIGS. 18A to 18D to determine the connection order of inline type sheet processing devices to be connected to the printing device 100.

If the operator presses an "advanced settings" key set for each setting item in the display of FIG. 18A, the control unit 205 displays a window (not shown). This window enables specifying sheet processing devices used in the printing system one by one. In the embodiment, since the printing system follows the above-mentioned restrictions, the control unit 205 also notifies the operator of this information as guidance information. For example, the control unit 205 notifies the operator of a guidance "please register the types of sheet processing devices to be connected to the printing device, and their connection order. You can connect a maximum of five devices. Please connect a saddle stitching device as a last device", as shown in FIG. 18A. In this case, the maximum number of connected inline sheet processing devices is five, but is not limited to this.

The control unit 205 controls the display unit 401 to determine sheet processing devices for use one by one from the top setting item in FIG. 18A. The control unit 205 determines that the setting order itself from the top setting item is an actual device connection order.

In this configuration, when the printing system 1000 has the system configuration shown in FIGS. 8A and 8B, the control unit 205 prompts the operator to register the types of sheet processing devices and their connection order, like the display in FIG. 18B. More specifically, the control unit 205 prompts the operator to set "large-volume stacker ⇒ glue binding device ⇒ saddle stitching device" sequentially from the top setting item, like the display in FIG. 18B. The control unit 205 determines that this setting order is an actual connection order, as shown in FIGS. 8A and 8B.

When the printing system 1000 has the system configuration shown in FIGS. 9A and 9B, the control unit 205 prompts the operator to register the types of sheet processing devices and their connection order, like the display in FIG. 18C. More specifically, the control unit 205 prompts the operator to set "glue binding device ⇒ large-volume stacker ⇒ saddle stitching device" sequentially from the top setting item, like the display in FIG. 18C. The control unit 205 determines that this setting order is an actual connection order, as shown in FIGS. 9A and 9B.

When the printing system 1000 has the system configuration shown in FIGS. 10A and 10B, the control unit 205 prompts the operator to register the types of sheet processing devices and their connection order, like the display in FIG. 18D. More specifically, the control unit 205 prompts the operator to set "large-volume stacker ⇒ saddle stitching device" sequentially from the top setting item, like the display in FIG. 18D. The control unit 205 determines that this setting order is an actual connection order, as shown in FIGS. 10A and 10B.

This UI control to improve user friendliness assuming cases of use on site is also a feature of the embodiment.

As described with reference to FIGS. 1 to 18D, the system 1000 comprises various mechanisms toward practical use of products capable of flexibly coping with various cases of use and user needs in the POD environment and the like that are different from cases of use and user needs in the office environment.

The printing system 1000 does not merely have new functions and new configurations as described above. To maximize the effects of the printing system 1000, the system 1000 can execute various control examples as follows.

For example, the control unit of the printing system causes the printing system 1000 to execute the following control.

Before a description of the following concrete control, the configuration of the system 1000 will be complemented.

Each inline finisher according to the embodiment comprises an openable/closable door in the front of the housing in order to remove jammed print sheets or take out a printed material from each finisher.

For example, the large-volume stacker of the embodiment can deliver sheets to the escape tray (to be also referred to as a sample tray), and the stack tray (to be also simply referred to as a stacker unit) capable of stacking a large volume of printed materials, as illustrated in the internal structure of FIG. 13. The large-volume stacker also has a function of conveying sheets to a succeeding finisher via the through path in the large-volume stacker. The stack tray bearing sheets from the printing device 100 can move down in accordance with the amount of sheet stacking of a printed material on the stack tray. The large-volume stacker can also align a printed material.

This configuration has been described with reference to FIG. 13. The large-volume stacker comprises an openable/ closable door 2002 in the front of the large-volume stacker, as shown in an example of the schematic appearance of the large-volume stacker in FIG. 19. The large-volume stacker also comprises a switch 2001 on the top of the housing to allow an operator to input an instruction to open the door 2002. The control unit (not shown) of the large-volume stacker mainly controls various operations in the large-volume stacker. The control unit opens the door 2002 in accordance with an instruction manually input by an operator from the switch 2001. More specifically, the control unit locks the door 2002 with a key (not shown) while the door 2002 is closed, and unlocks and opens the door 2002. Then, the operator can take out a printed material stacked on the stack tray of the large-volume stacker. The control unit can also automatically open the door 2002 not only by an operation from the switch 2001 but also by an instruction from the control unit 205 of the printing device 100. At this time, the control unit 205 transmits a door opening signal to the control unit of the large-volume stacker via a signal line in the device shown in FIG. 2. The operator takes out a printed material stacked on the stack tray of the large-volume stacker by opening the door 2002.

In the embodiment, when the operator is to take out a printed material of a printed job from the large-volume stacker, the control unit 205 mainly controls the printing system 1000 so that no sheet of a succeeding job whose print execution request is issued after the printed job is delivered to the stack tray of the large-volume stacker.

In other words, the printing system 1000 of the embodiment controls a sheet processing unit in a sheet processing device not to deliver any sheet of a job succeeding to a printed job while the operator takes out the printed material of the printed job from the sheet processing device.

However, the control unit 205 controls to execute, e.g., the following operation even while the operator takes out a printed material from the stack tray of the large-volume stacker. An example of the operation is to deliver sheets of a printed succeeding job to the escape tray at the upper portion of the large-volume stacker. Another example of the operation is to convey, via the through path in the large-volume stacker, sheets of a succeeding job serving as a job requiring a sheet process by a sheet processing device connected on the output side of the large-volume stacker.

In other words, these operations correspond to an operation permitted to be executed even while the door 2002 is open. This operation is a typical example of the continuous-run operation in the embodiment. According to the embodiment, the control unit 205 controls the printing system 1000 to execute various operations (to be described below) associated with the continuous-run operation in the embodiment. The embodiment can obtain the following effects by configuring the printing system 1000 to execute control associated with the continuous-run operation.

For example, the embodiment can deal with problems as described in Description of the Related Art. The embodiment can build a convenient printing environment applicable not only to the office environment but also to the POD environment. The embodiment can build a printing environment which can attain not only the following effect A, but also both effects A and B without any new trouble such as a failure in attaining the following effect B owing to attaining effect A.

(Effect A) Assume that the movable unit of a sheet processing device for use in the printing system 1000 is open because it is under maintenance or the operator takes out a printed material. Even in this case, the system 1000 can execute the print process of a job not influenced by this situation. Effect A is to provide a printing environment capable of maintaining productivity as high as possible in consideration of future cases of use and needs in the POD environment.

(Effect B) It is difficult to satisfactorily create a printed material to be delivered to a customer even by a printing system configured to obtain effect A because, for example, the operator does not notice that the movable unit of a sheet processing device is open. This inhibits the system from maintaining high productivity. Even the configuration capable of obtaining effect A causes unexpected troubles as described above. Effect B is to suppress such troubles as much as possible.

The embodiment can build a printing environment where the system 1000 can run as continuously as possible by the continuous-run operation disclosed in the embodiment, and maintain both high productivity and high operability. The embodiment can provide a printing system, job processing method, storage medium, program, and printing device capable of achieving various effects as described above. The embodiment can contribute to practical use of products aiming at the future printing environment such as the POD environment so as to cope with various needs from various users as flexibly as possible in consideration of various situations and use environments.

The printing system 1000 controlled by the control unit 205 is configured as follows.

The system 1000 can supply sheets (print media) of a job printed by the printer unit 203 selectively to a plurality of inline finishers from the printer unit 203 of the printing device 100. The printer unit 203 can print data in the HD 209 capable of storing data of jobs. As a plurality of inline finishers, various inline finishers are available in the embodiment. For example, the printing system 1000 can utilize even an inline finisher having an opening/closing unit which is openable/closable in synchronism with operation by an operator. A typical example of this inline finisher is the large-volume stacker shown in FIG. 19. The large-volume stacker is a post-processing device having a front cover (to be also referred to as a front door) to be opened/closed by the operator. The post-processing device to be described below means an inline finisher described above in the embodiment.

According to the embodiment, the control unit 205 confirms the statuses of a plurality of types of movable units which include an opening/closing unit such as the front door of the large-volume stacker and can respond to operation by an operator in sheet takeout work or the like. The movable unit which is disclosed in the embodiment and can respond to a manual operation by the operator may also be called a "movable member", "movable part", "movable component", or the like. The term "movable unit" is not definitive, but a typical example of the movable unit desirably includes at least an opening/closing unit (opening/closing member) such as a cover unit.

Referring back to the description of the control example, the control unit 205 discriminatively confirms the status of each movable unit representing whether the movable unit disclosed in the embodiment such as the front cover or upper cover of each inline finisher is open (open status) or closed (closed status). In the confirmation, the control unit 205 automatically collects current status information (e.g., information for specifying whether the opening/closing unit is open or closed) representing the status of the movable unit from each unit via an internal signal line.

The control unit 205 executes control associated with a job to be processed based on the status of each movable unit in the system 1000 and the process conditions of the job. Particularly in the embodiment, the control unit 205 determines, based on these pieces of information, whether to permit or inhibit execution of the process of the job by the system 1000 while the movable unit is open in the system 1000.

In the embodiment, assume that the control unit 205 confirms that a movable unit unrelated to (not influenced by) the completion of the process of a target job whose print execution request is issued is open. In this case, even while the movable unit remains open, the control unit 205 causes the printing device 100 to start the print process of the job. Further, the control unit 205 causes an inline finisher necessary for the sheet process of the job to execute a finishing process for sheets of the job while the movable unit is open.

The control unit 205 executes this control for the system 1000. The series of operations is also a typical example of the continuous-run operation in the embodiment.

According to the embodiment, the control unit 205 determines whether each movable unit of each inline finisher for use in the system 1000, such as various opening/closing units including front and upper covers, remains open.

The control unit 205 can accept the execution request of a new job to be processed by the printing device 100 even while the movable unit of one of inline finishers available in the system 1000 is open.

When newly accepting a job, the control unit 205 determines whether the job requires a by an inline finisher whose movable unit remains open.

Assume that the newly accepted job is a job (to be referred to as job X hereinafter) requiring no post-process (sheet process) by the inline finisher whose movable unit remains open. This means that job X is a "job requiring no discharge of a printed material to the discharge destination of an inline finisher whose movable unit is open". When the control unit 205 makes a determination corresponding to this case (to be referred to as case X hereinafter), it permits the printing device 100 to start the print process of the job even while the movable unit is currently open in the system 1000.

In case X, the control unit 205 supplies sheets of job X printed by the printer unit 203 to an inline finisher.

In case X, assume that the system is configured by connecting a plurality of inline finishers to the printing device 100 and the movable unit of an upstream inline finisher among them is open. Also, assume that job X, for which the start of printing is permitted, requires a post-process by a succeeding inline finisher downstream of the upstream inline finisher. In this case, sheets of job X are suppliable into the succeeding inline finisher via the sheet feeding path in the preceding inline finisher even while the movable unit of the preceding inline finisher remains open. The control unit 205 also executes this control for the system 1000.

Assume that the job newly accepted while the movable unit is open is a job (to be referred to as job Y hereinafter) requiring a post-process (synonymous with a sheet process) by the inline finisher whose movable unit remains open. This means that job Y is a "job requiring discharge of a printed material to the discharge destination of an inline finisher whose movable unit is open". When the control unit 205 makes a determination corresponding to this case (to be referred to as case Y hereinafter), it inhibits the printing device 100 from starting the print process of job Y while the movable unit is open in the system 1000.

In case Y, the control unit 205 permits the printing device 100 to start the print process of job Y on the condition that both the following two conditions A and B are satisfied.

(Condition A) The control unit 205 causes the UI unit of the embodiment to notify the operator of guidance information to prompt him to close the currently open movable unit of an inline finisher which is to execute a post-process necessary for job Y. The control unit 205 controls to notify the operator via the UI unit of information on a necessary action to be taken by him to complete the process of job Y.

(Condition B) The control unit 205 confirms that the movable unit of the inline finisher which is to execute the post-process necessary for job Y is closed. This means that the control unit 205 confirms that the status of the movable unit changes from the open status to the closed one.

When both conditions A and B are satisfied, the control unit 205 permits the printing device 100 to start the print process of Y. This is also a feature of the embodiment. It should be noted that the control unit 205 also executes the following control.

For example, the control unit 205 accepts the print execution request of a target job (to be referred to as job Z hereinafter) from the operator with the start key 503. Assume that the movable unit of an inline finisher necessary for the post-process of job Z is open at this time. That is, the movable unit of an inline finisher having a delivery destination necessary for job Z is open.

In this example, the inline finisher necessary for the sheet process of job Z is the large-volume stacker which is the inline finisher 200a in FIG. 8A. The front cover serving as an example of the movable unit of the large-volume stacker is currently open.

In the embodiment, the operator can input the print process conditions of a job to be processed via the operation unit 204 before inputting a print execution request with the start key 503. The control unit 205 reads out, from the memory, print process condition data of job Z set by the operator before an input from the key 503, and confirms the data. By this confirmation, the control unit 205 specifies that job Z requires a sheet process by the large-volume stacker in FIG. 8A.

The control unit 205 utilizes various types of sensor information transmitted via a signal line in the system 1000 shown in FIG. 2 when determining whether each movable unit in the system 1000 is in the open or closed status, or determining whether the status of the movable unit has changed.

Referring back to the description of the concrete example, not only the movable unit of the large-volume stacker in FIG. 8A is open, but also that of another inline finisher in the system 1000 in FIG. 8A is currently open. In this example, the front cover of the saddle stitching device which is the inline finisher 200c in FIG. 8A is open.

As described above, the two movable units (in this example, the front covers of the large-volume stacker and saddle stitching device in the system 1000 in FIG. 8A) are open as the status of the system 1000 when the print execution request of job Z is input. In this case (to be referred to as case Z hereinafter), the control unit 205 executes the following control as control of the continuous-run operation associated with job Z.

In case Z, the control unit 205 inhibits the printer unit 203 from starting the print process of job Z even if the operator inputs the print execution request of job Z with the start key 503.

Upon reception of the print execution request, the control unit 205 causes the UI unit of the embodiment to display guidance information to prompt the operator to close the front cover of the large-volume stacker in FIG. 8A, as information on job Z whose printing is inhibited. For example, the control unit 205 causes the display unit 401 of the operation unit 204 to display a display window (e.g., a popup window of a window 2404 in FIG. 24-6) with guidance information to close the front cover of the large-volume stacker.

These control operations executed by the control unit 205 in case Z are based on the fact that the movable unit of the large-volume stacker having a delivery destination serving as the printed material delivery destination of job Z is in the open status.

Even if the control unit 205 inhibits the printing device 100 from executing the print process of job Z, it permits the printing device 100 to store all the pages of print data of job Z in the HD 209.

For example, the control unit 205 allows for execution of the document scan operation of job Z by the scanner unit 201 and the storage operation of the scanned image data in the HD 209.

This yields an effect capable of, e.g., shortening the time required until the end of printing after the start of printing a target job.

Referring back to the description of the concrete example, assume that the operator, who has confirmed the display contents after the guidance information of job Z is displayed, closes the front cover of the large-volume stacker in FIG. 8A. That is, the status of the front cover changes from the open status to the closed one. The control unit 205 confirms the status change, and then causes the printer unit 203 to start the print process of job Z.

The control unit 205 supplies the printed material of job Z printed by the printer unit 203 into the large-volume stacker in FIG. 8A, and stacks it on the internal tray of the large-volume stacker in FIG. 8A, completing the process of job Z.

In case Z, the control unit 205 executes the above control for job Z. This control is an example of control "to inhibit the printer unit 203 from executing the print process of job Z without notifying the operator of guidance information (popup display of the window 2404 in this example) to close the front cover of the large-volume stacker in FIG. 8A".

In case Z, assume that the status of the front cover of the large-volume stacker in FIG. 8A changes from the open status to the closed one after displaying the guidance, but the front cover of the saddle stitching device in FIG. 8A is still in the open status.

In this case, even while the front cover of the saddle stitching device remains open, the control unit 205 permits the printing device 100 to execute the print process of job Z in response to the status change of the front cover of the large-volume stacker.

Also in this case, the control unit 205 allows the printing device 100 to execute the print process of job Z without notifying the operator of guidance information to prompt him to close the front cover of the saddle stitching device before executing the print process of job Z.

For example, the control unit 205 controls the system 1000 to execute the print process of job Z requiring the delivery destination of the large-volume stacker without displaying a popup window in a window 2403 to prompt the operator to close the front cover of the saddle stitching device.

These control operations pay the following points in the embodiment.

For example, in case Z, the large-volume stacker in FIG. 8A is an inline finisher necessary for the post-process of job Z, whereas the saddle stitching device in FIG. 8A is not an inline finisher necessary for the post-process of job Z. That is, in case Z, the large-volume stacker in FIG. 8A is an inline finisher at the delivery destination which coincides with the delivery destination of job Z, and the saddle stitching device in FIG. 8A is not an inline finisher at the delivery destination which coincides with the delivery destination of job Z.

Thus, before printing job Z, the control unit 205 executes the notification process to prompt the operator to close the movable unit of the large-volume stacker which influences the process of job Z. The control unit 205 permits printing of job Z without executing, before printing job Z, the notification process to prompt the operator to close the movable unit of the saddle stitching device which does not influence the process of job Z.

According to this embodiment, the control unit 205 controls the system 1000 to enable the start of the print process of a target job after notifying the operator via the UI unit of guidance information on a movable unit which influences the process of the job. The control unit 205 controls the system to enable the start of the print process of the job without notifying the operator via the UI unit of guidance information on a movable unit which does not influence the process of the job even while the movable unit is open.

The control unit 205 also executes display control synchronized with selective job control. While suppressing any trouble such as the following concerns (1) to (3), the effects described in the embodiment can be obtained, fully exploiting the system 1000. The effects achieved by the embodiment can be further enhanced.

(1) For example, when a movable unit which does not influence the process of a target job is open, the operator is notified against his instruction of guidance information to prompt him to close the movable unit.

(2) This notification requests unnecessary processes of the operator, making it difficult to maintain high operability.

(3) The system 1000 can run as continuously as possible by printing a target job even while a movable unit which does not influence the process of the job is open. However, (1) and (2) make it difficult to maintain high productivity.

These points are also a typical example of features of the embodiment.

The control unit 205 causes the UI unit of the embodiment to notify the operator of guidance information when he requests the notification of guidance information to prompt him to close a movable unit which does not influence a target process.

For example, in case Z, the control unit 205 validates the "system status/stop" key 617 on the display unit 401 at any timing before the start of printing job Z, during printing it, and after the start of printing it. At any timing, in response to an operator input from the key 617, the control unit 205 allows the display unit 401 to display guidance information to prompt the operator to close the front cover of the saddle stitching device which does not influence the process of job Z.

This configuration can present in real time, for example, how to close the movable unit of an inline finisher which does not influence the process of a target job, if the operator so desires. This configuration can further improve operability in addition to the above-described effects.

In the embodiment, pieces of notification information displayed as information on a movable unit on the display unit 401 of the operation unit 204 which serves as an example of the UI unit of the embodiment and also functions as a notification unit are roughly classified into the following four types:

(1) status information which can notify the operator that a movable unit which influences the process of a target job is open, (2) status information which can notify the operator that a movable unit which does not influence the process of a target job is open, (3) guidance information to prompt the operator to close a movable unit which influences the process of a target job, and (4) guidance information to prompt the operator to close a movable unit which does not influence the process of a target job.

In the embodiment, the control unit 205 controls to display notification information (1) and notification information (2) among (1) to (4) on the status line at the bottom of the display area of the display unit 401. These pieces of information are available as status information of the system 1000.

The control unit 205 controls the display unit 401 to automatically display both information (1) and information (2) on the status line in response to a change of the status of a movable unit from the closed status to the open one without inputting any explicit display instruction from the operator.

The control unit 205 controls to keep status information of the open movable unit displayed on the status line until the status changes from the open status to the closed one.

For example, the control unit 205 allows the display unit 401 to display any of the following windows (A), (B), and (C) even while keeping status information displayed on the status line to represent that a movable unit which does not influence the process of a target job is open. A concrete example of this control will be described later.

(A) A window for setting the print process conditions of a target job.

(B) A window for accepting the print execution request of a target job.

(C) A window representing progress information during the print process of a target job.

One window may simultaneously display pieces of status information on open movable units. When the status line displays status information representing the open status of a movable unit, the control unit 205 inhibits simultaneous display of pieces of status information, and switches and displays them sequentially in the priority order.

In the embodiment, notification information (3) and notification information (4) among (1) to (4) are available as guidance information to prompt an operator to take a necessary action.

The control unit 205 controls the display unit 401 to display popup notification information (3) as job information associated with a job to be processed. The control unit 205 also controls the display unit 401 to display notification information (3) without inputting any explicit display instruction from the operator.

The control unit 205 controls the display unit 401 to automatically display popup notification information (3) in response to a change of the status of a movable unit which influences the process of a target job, from the closed status to the open one. The control unit 205 controls the display unit 401 to display information (3) even when the operator inputs an explicit instruction from the operation unit 204.

The control unit 205 controls the display unit 401 to display notification information (4) when the operator inputs an explicit instruction from the operation unit 204. The control unit 205 controls the display unit 401 not to automatically display notification information (4) prior to the start of the print process of a target job.

The embodiment employs a display process by a unit having the above-described display function, as a method of notifying the operator of various types of notification information, which include the above-described pieces of notification information and are disclosed in the embodiment. However, the present invention is not limited to this display process. For example, a unit having an audio output function may output, by sound, various types of notification information disclosed in the embodiment. Alternatively, a unit having the printer function such as the printer unit 203 may print out various types of notification information disclosed in the embodiment. In this fashion, the present invention can adopt any configuration as long as the system 1000 can transmit notification information disclosed in the embodiment to a user (e.g., an operator who operates the system 1000). This is an example of the mechanism which can further enhance the effects disclosed in the embodiment, and is not always indispensable.

Referring back to the description of the control example, the control examples described with jobs X, Y, and Z are typical examples of selective job process control and display control associated with one job in the continuous-run operation. Another control example of the control associated with the continuous-run operation in the embodiment will be explained with reference to the system 1000 having the system configuration in FIG. 8B. The following control example is associated with a plurality of jobs in the continuous-run operation.

Assume that the control unit 205 confirms that the system 1000 has the system configuration in FIG. 8B. Also, assume that the control unit 205 confirms that the door 2002 of the stacker in FIG. 8B is currently open in accordance with an opening request from the operator via the switch 2001 in order to take out the printed material of a stacker job (to be referred to as a stacker job 8A hereinafter) stacked on the stack tray of the large-volume stacker in FIG. 8B. In the case (to be referred to as case 8A hereinafter) in which the control unit 205 makes these two confirmations, the control unit 205 searches the HD 209 for a job succeeding to the stacker job 8A.

In case 8A, assume that the control unit 205 confirms that there is a succeeding job whose print execution request is accepted after the job 8A. Also, assume that the control unit 205 confirms that the succeeding job (to be referred to as a job 8B hereinafter) requires a sheet process by the large-volume stacker in FIG. 8B. In this case (to be referred as case 8B hereinafter), the control unit 205 inhibits the printing device 100 from starting the print process of the job 8B while the door 2002 of the large-volume stacker in FIG. 8B is open. Also in case 8B, the control unit 205 controls the printing device 100 so that the job 8B keeps waiting for printing.

In case 8B, the door 2002 of the large-volume stacker in FIG. 8B is open when the operator inputs the print execution request of the job 8B from the UI unit (e.g., when he presses the start key 503). The job 8B requires discharge of a printed material to the delivery destination of the large-volume stacker in FIG. 8B.

In case 8B, the control unit 205 inhibits the print process of the job 8B even upon reception of a print execution request, as described above. At the same time, the control unit 205 causes the display unit 401 to automatically display guidance information to close the door 2002 of the large-volume stacker in FIG. 8B.

That is, in case 8B, the control unit 205 inhibits the printing device 100 from starting the print process of the job 8B without notifying the operator via the operation unit 204 of guidance information to close the door 2002 of the large-volume stacker in FIG. 8B. In case 8B, the control unit 205 permits the printing device 100 to execute the print process of the job 8B on the condition that the operator closes the door 2002 after the notification of the guidance information (i.e., the status of the door 2002 changes from the open status to the closed one). In case 8B, the control unit 205 causes the printing system 1000 to execute this control for the job 8B.

In case 8A, assume that the control unit 205 confirms that there is a succeeding job whose print execution request is accepted after the job BA. Also, assume that the control unit 205 confirms that the succeeding job (to be referred to as a job 8C hereinafter) requires a gluing process by the glue binding device in FIG. 8B corresponding to an inline finisher positioned on the output side (downstream side) of the large-volume stacker in FIG. 8B. In this case (to be referred to as case 8C hereinafter), the control unit 205 permits the printing device 100 to start the print process of the job 8C while the door 2002 of the large-volume stacker in FIG. 8B is open.

For example, in case 8C, the control unit 205 reads out print data of the job 8C from the HD 209 and causes the printer unit 203 to print while keeping the door 2002 of the stacker in FIG. 8E open. Also in case 8C, the control unit 205 makes sheets, on which the printer unit 203 prints the print data of the job 8C, pass through a feeding path of point A in FIG. 8B the through path in the large-volume stacker in FIG. 8B point B in FIG. 8B while keeping the door 2002 of the stacker in FIG. 8B open. By this method, the control unit 205 causes the system 1000 to supply sheets of the job 8C from the printing device 100 into the glue binding device in FIG. 8B while the door 2002 of the large-volume stacker in FIG. 8B is open. In case 8C, the control unit 205 causes the glue binding device in FIG. 8B to execute a glue binding process for sheets (print media) of the job 8C supplied from the printing device 100 while keeping the door 2002 of the stacker in FIG. 88B open. In this manner, the control unit 205 completes the process of the job 8C in the system 1000 while keeping the door 2002 of the stacker in FIG. 8B open.

Also in case 8C, the door 2002 of the large-volume stacker in FIG. 8B is open when the operator inputs the print execution request of the job 8C from the UI unit (e.g., when he presses the start key 503). The job 8C does not require discharge of a printed material to the delivery destination of the large-volume stacker in FIG. 8B.

In case 8C, the control unit 205 inhibits the display unit 401 from automatically displaying guidance information to prompt the operator to close the door 2002 of the large-volume stacker in FIG. 8B when he inputs the print execution request of the job 8C from the UI unit. Further in case 8C, the control unit 205 permits the printing device 100 to start the print process of the job 8C even while the door 2002 remains open.

That is, in case 8C, the control unit 205 permits the printing device 100 to start the print process of the job 8C without automatically notifying the operator via the operation unit 204 of guidance information to prompt him to close the door 2002 of the large-volume stacker in FIG. 8B.

In case 8C, the control unit 205 causes the printing system 1000 to execute this control for the job 8C.

In case 8A, assume that the control unit 205 confirms that there is a succeeding job whose print execution request is accepted after the job 8A. Also, assume that the control unit 205 confirms that the succeeding job (to be referred to as a job 8D hereinafter) requires a sheet process by the saddle stitching device in FIG. 8B corresponding to an inline finisher positioned on the output side of the glue binding device in FIG. 8B. In this case (to be referred to as case 8D hereinafter), the control unit 205 permits the printing device 100 to start the print process of the job 8D while the door 2002 of the large-volume stacker in FIG. 8B is open.

For example, in case 8D, the control unit 205 reads out print data of the job ED from the HD 209 and causes the printer unit 203 to print while keeping the door 2002 of the stacker in FIG. 8B open. Also in case 8D, the control unit 205 makes sheets on which the printer unit 203 prints the print data of the job 8D, pass through a feeding path of point A in FIG. 8B ⇒ the through path in the large-volume stacker in FIG. 8B ⇒ point B in FIG. 8B ⇒ point C in FIG. 8B while keeping the door 2002 of the stacker in FIG. 8B open. By this method, the control unit 205 causes the system 1000 to supply sheets of the job 8D from the printing device 100 into the saddle stitching device in FIG. 8B while the door 2002 of the large-volume stacker in FIG. 8B is open. In case 8D, the control unit 205 causes the saddle stitching device in FIG. 8B to execute a sheet process for sheets (print media) of the job 8D supplied from the printing device 100 while keeping the door 2002 of the stacker in FIG. 8B open. As a result, the control unit 205 completes the process of the job 8D in the system 1000 while keeping the door 2002 of the stacker in FIG. 8B open.

Also in case 8D, the door 2002 of the large-volume stacker in FIG. 8B is open when the operator inputs the print execution request of the job 8D from the UI unit (e.g., when he presses the start key 503). Similar to the job 8C, the job 8D does not require discharge of a printed material to the delivery destination of the large-volume stacker in FIG. 8B.

Also in case 8D, the control unit 205 inhibits the operation unit 204 from automatically displaying guidance information to close the door 2002 of the large-volume stacker in FIG. 8B when the operator inputs the print execution request of the job 8D from the UI unit. Further in case 8D, the control unit 205 permits the printing device 100 to start the print process of the job 8D even while the door 2002 remains open.

That is, also in case 8D, the control unit 205 permits the printing device 100 to start the print process of the job 8D without automatically notifying the operator via the operation unit 204 of guidance information to prompt him to close the door 2002 of the large-volume stacker in FIG. 8B.

In case 8D, the control unit 205 causes the printing system 1000 to execute this control for the job 8D.

According to the embodiment, the control unit 205 executes selective job control based on the process conditions of a job to be processed and status information of the movable unit of the system 1000, like the above-described three control examples in cases 8B, 8C, and 8D. In synchronism with the job control, the control unit 205 also selectively executes display control based on the process conditions of the job to be processed and status information of the movable unit.

Still another control example of the control associated with a plurality of jobs in the continuous-run operation in the embodiment will be explained below.

Assume that the control unit 205 confirms that the system 1000 has the system configuration in FIG. 9B. Also, assume that the control unit 205 confirms that the door 2002 of the stacker in FIG. 9B is currently open in accordance with an opening request from the operator via the switch 2001 in order to take out the printed material of a stacker job (to be referred to as a stacker job 9A hereinafter) stacked on the stack tray of the large-volume stacker in FIG. 9B. In the case (to be referred to as case 9A hereinafter) in which the control unit 205 makes these two confirmations, the control unit 205 searches the HD 209 for a job succeeding to the stacker job 9A.

In case 9A, assume that the control unit 205 confirms that there is a succeeding job whose print execution request is accepted after the job 9A. Also, assume that the control unit 205 confirms that the succeeding job (to be referred to as a job 9B hereinafter) requires a sheet process by the large-volume stacker in FIG. 9B. In this case (to be referred as case 9B hereinafter), the control unit 205 inhibits the printing device 100 from starting the print process of the job 9B while the door 2002 of the large-volume stacker in FIG. 9B is open. Also in case 9B, the control unit 205 controls the printing device 100 so that the job 9B keeps waiting for printing.

In case 9B, the door 2002 of the large-volume stacker in FIG. 9B is open when the operator inputs the print execution request of the job 9B from the UI unit (e.g., when he presses the start key 503). The job 9B requires discharge of a printed material to the delivery destination of the large-volume stacker in FIG. 9B.

In case 9B, the control unit 205 inhibits the print process of the job 9B even upon reception of a print execution request, as described above. At the same time, the control unit 205 causes the display unit 401 to automatically display guidance information to prompt the operator to close the door 2002 of the large-volume stacker in FIG. 9B.

That is, in case 9B, the control unit 205 inhibits the printing device 100 from starting the print process of the job 9B without automatically notifying the operator via the operation unit 204 of guidance information to prompt him to close the door 2002.

In case 9B, the control unit 205 permits the printing device 100 to execute the print process of the job 9B on the condition that the operator closes the door 2002 after the notification of the information (i.e., the status of the large-volume stacker in FIG. 9B changes from the open status to the closed one).

In case 9B, the control unit 205 causes the printing system 1000 to execute this control for the job 9B.

In case 9A, assume that the control unit 205 confirms that there is a succeeding job whose print execution request is accepted after the job 9A. Also, assume that the control unit 205 confirms that the succeeding job (to be referred to as a job 9C hereinafter) requires a gluing process by the glue binding device in FIG. 9B corresponding to an inline finisher positioned on the input side (upstream side) of the large-volume stacker in FIG. 9B. In this case (to be referred to as case 9C hereinafter), the control unit 205 permits the printing device 100 to start the print process of the job 9C while the door 2002 of the large-volume stacker in FIG. 9B is open.

For example, in case 9C, the control unit 205 reads out print data of the job 9C from the HD 209 and causes the printer unit 203 to print while keeping the door 2002 of the stacker in FIG. 9B open. Also in case 9C, the control unit 205 makes sheets, on which the printer unit 203 prints the print data of the job 9C, pass through point A in FIG. 9B while keeping the door 2002 of the stacker in FIG. 9B open. By this method, the control unit 205 causes the system 1000 to supply sheets of the job 9C from the printing device 100 into the glue binding device in FIG. 9B while the door 2002 of the large-volume stacker in FIG. 9B is open.

In case 9C, the control unit 205 causes the glue binding device in FIG. 9B to execute a glue binding process for sheets (print media) of the job 9C supplied from the printing device 100 while keeping the door 2002 of the stacker in FIG. 9B open. In this manner, the control unit 205 completes the process of the job 9C in the system 1000 while keeping the door 2002 of the stacker in FIG. 9B open.

Also in case 9C, the door 2002 of the large-volume stacker in FIG. 9B is open when the operator inputs the print execution request of the job 9C from the UI unit (e.g., when he presses the start key 503). The job 9C does not require discharge of a printed material to the delivery destination of the large-volume stacker in FIG. 9B.

In case 9C, the control unit 205 inhibits the display unit 401 from automatically displaying guidance information to prompt the operator to close the door 2002 of the large-volume stacker in FIG. 9B when he inputs the print execution request of the job 9C from the UI unit. Further in case 9C, the control unit 205 permits the printing device 100 to start the print process of the job 9C even while the door 2002 remains open.

That is, in case 9C, the control unit 205 permits the printing device 100 to start the print process of the job 9C without automatically notifying the operator via the operation unit 204 of guidance information to prompt him to close the door 2002 of the large-volume stacker in FIG. 9B.

In case 9C, the control unit 205 causes the printing system 1000 to execute this control for the job 9C.

In case 9A, assume that the control unit 205 confirms that there is a succeeding job whose print execution request is accepted after the job 9A. Also, assume that the control unit 205 confirms that the succeeding job (to be referred to as a job 9D hereinafter) requires a sheet process by the saddle stitching device in FIG. 9B corresponding to an inline finisher positioned on the output side of the large-volume stacker in FIG. 9B. In this case (to be referred to as case 9D hereinafter), the control unit 205 permits the printing device 100 to start the print process of the job 9D while the door 2002 of the large-volume stacker in FIG. 9B is open.

For example, in case 9D, the control unit 205 reads out print data of the job 9D from the HD 209 and causes the printer unit 203 to print while keeping the door 2002 of the stacker in FIG. 98 open. Also in case 9D, the control unit 205 makes sheets on which the printer unit 203 prints the print data of the job 9D, pass through a feeding path of point A in FIG. 9B ⇒ point B in FIG. 9B ⇒ the through path in the large-volume stacker in FIG. 9B ⇒ point C in FIG. 9B while keeping the door 2002 of the stacker in FIG. 9B open. By this method, the control unit 205 causes the system 1000 to supply sheets of the job 9D from the printing device 100 into the saddle stitching device in FIG. 9B while the door 2002 of the large-volume stacker in FIG. 9B is open. In case 9D, the control unit 205 causes the saddle stitching device in FIG. 9B to execute a sheet process (e.g., saddle stitching process) for sheets (print media) of the job 9D supplied from the printing device 100 while keeping the door 2002 of the stacker in FIG. 9B open. As a result, the control unit 205 completes the process of the job 9D in the system 1000 while keeping the door 2002 of the stacker in FIG. 9B open.

Also in case 9D, the door 2002 of the large-volume stacker in FIG. 9B is open when the operator inputs the print execution request of the job 9D from the UI unit (e.g., when he presses the start key 503). Similar to the job 9C, the job 9D does not require discharge of a printed material to the delivery destination of the large-volume stacker in FIG. 9B.

Also in case 9D, the control unit 205 inhibits the display unit 401 from automatically displaying guidance information to close the door 2002 of the large-volume stacker in FIG. 9B when the operator inputs the print execution request of the job 9D from the UI unit. Further in case 9D, the control unit 205 permits the printing device 100 to start the print process of the job 9D even while the door 2002 remains open.

That is, also in case 9D, the control unit 205 permits the printing device 100 to start the print process of the job 9D without automatically notifying the operator via the operation unit 204 of guidance information to prompt him to close the door 2002 of the large-volume stacker in FIG. 9B.

In case 9D, the control unit 205 causes the printing system 1000 to execute this control for the job 9D.

Various job control operations and display control operations illustrated with reference to cases 8A to 9D are also typical examples of control in the continuous-run operation. This means one typical example in a configuration capable of executing the following control for the system 1000.

Assume that the printing device 100 accepts the print execution request of the first job requiring a sheet process by a sheet processing device (to be referred to as the first sheet processing device) requiring the opening operation of the movable unit when the operator takes out sheets. Then, assume that the printing device 100 accepts the print execution request of the second job as a succeeding job after performing the print process of the first job.

Assume that the second job accepted after the first job requires a sheet process by the first sheet processing device used for the sheet process of the first job. Also, assume that the movable unit of the first sheet processing device is in the open status. This case will be called the first case.

If the control unit 205 makes a determination corresponding to the first case, it inhibits the printing device 100 from executing the print process of the second job while the movable unit of the first sheet processing device remains open. In the first case, when receiving the print execution request of the second job, the control unit 205 causes the UI unit to automatically notify the operator of guidance information to prompt the operator to close the movable unit of the first sheet processing device. That is, even if the control unit 205 receives the print execution request of the second job in the first case, it inhibits the printing device 100 from executing the print process of the second job without automatically notifying the operator via the operation unit 204 of the guidance information.

In the embodiment, the control unit 205 executes this control in the first case.

To the contrary, assume that the second j ob does not require a sheet process by the first sheet processing device used for the sheet process of the first job. Also, assume that the movable unit of the first sheet processing device is in the open status. This case will be called the second case.

If the control unit 205 makes a determination corresponding to the second case, it permits the printing device 100 to execute the print process of the second job while the movable unit of the first sheet processing device remains open. In the second case, when receiving the print execution request of the second job, the control unit 205 inhibits the UI unit from automatically notifying the operator of guidance information to prompt him to close the movable unit of the first sheet processing device. That is, in response to receiving the print execution request of the second job in the second case, the control unit 205 permits the printing device 100 to execute the print process of the second job without automatically notifying the operator via the UI unit of the guidance information.

In the embodiment, the control unit 205 executes this control in the second case.

In the second case, the control unit 205 controls to convey all the sheets of the second printed job into a sheet processing device (to be referred to as the second sheet processing device hereinafter) used for the sheet process of the second job even while the movable unit of the first sheet processing device remains open. The control unit 205 causes the second sheet processing device to execute a sheet process necessary for the second job for a bundle of sheets of the second job while keeping the movable unit open.

In the embodiment, the control unit 205 executes the control in this situation for the system 1000.

The mechanism of increasing productivity and operability as much as possible in the printing system 1000, like the control examples disclosed in cases 8A to 9D and the first and second cases, is a control example of the continuous-run operation disclosed in the embodiment.

As is apparent from a comparison between the control examples using FIGS. 8B and 9B, job control executed by the control unit 205 changes even in control associated with the continuous-run operation every time the system configuration of the system 1000 changes. Also in this control, the control unit 205 utilizes system configuration information described at the beginning, status information of each inline finisher, and print process condition information of each job whose print execution request is accepted by the printing device 100. Various control examples to be described below are also control associated with the continuous-run operation.

It should be noted that sheet processes (synonymous with post-processes) described in the embodiment mean various post-processes (sorting, stapling, trimming, sheet delivery, saddle stitching, folding, case binding, pad binding, and large-volume stacking), execution of which is requested by the operator for a job to be processed via the UI window of FIG. 7 or that of FIG. 17B. That is, a sheet conveyance process to convey a print medium through the sheet feeding path in the system 1000 does not correspond to a "sheet process (post-process) necessary for a job to be processed" in the embodiment.

As one control of the continuous-run operation, the control unit 205 inhibits or permits the start of printing a succeeding job whose print execution request is issued after a job whose sheets are to be taken out by the operator from a sheet processing device. The control unit 205 can also execute display control synchronized with this operation.

This configuration is also a typical example of the configuration based on a configuration unique to an inline finisher which connects to the printing device physically and electrically.

On the premise of this configuration, the control unit 205 serving as an example of the control unit of the printing system 1000 executes the following control.

Prerequisite constituent features will be complemented before a description of the control.

It is premised that the system 1000 comprises the printing device 100 having the printer unit 203 capable of printing data in the HD 209 capable of storing data of jobs. The system 1000 comprises a plurality of sheet processing devices 200a to 200n which can connect to the printing device 100 and can execute sheet processes for sheets of a job printed by the printer unit 203. Each sheet processing device allows the operator to take out a printed material having undergone a sheet process. The system 1000 can selectively supply sheets of a job printed by the printer unit 203 from the printer unit 203 of the printing device 100 to these sheet processing devices.

On the premise of this system configuration, the control unit 205 serving as an example of the control unit of the embodiment executes the following control.

A display method on the display means when the cover is open, and how to control a job operation by the control unit 205 will be explained as a feature of the embodiment. For descriptive convenience, the control will be explained with reference to FIGS. 20-1 to 20-3 and subsequent drawings in a case that the printing system is configured by connecting the large-volume stacker 200a, glue binding device 200b, and saddle stitching device 200c to the printing device main body 100 in FIGS. 8A and 8B in the order named.

Figures 1, 20:
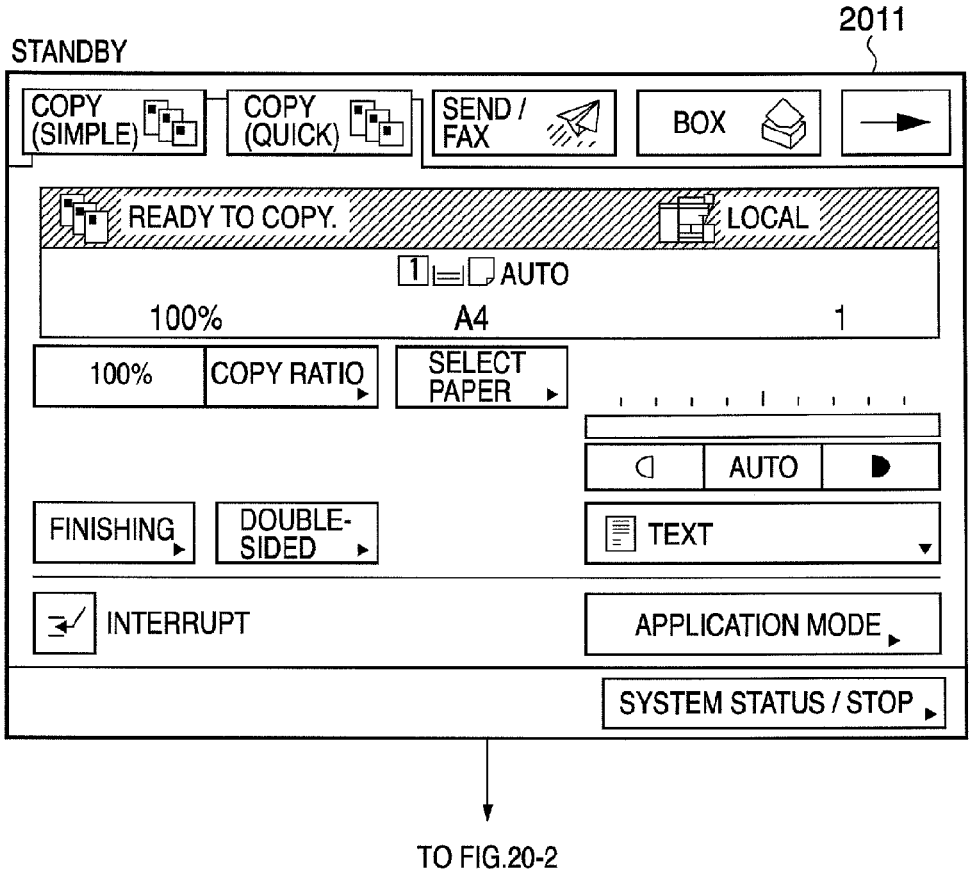
Figures 2, 20:
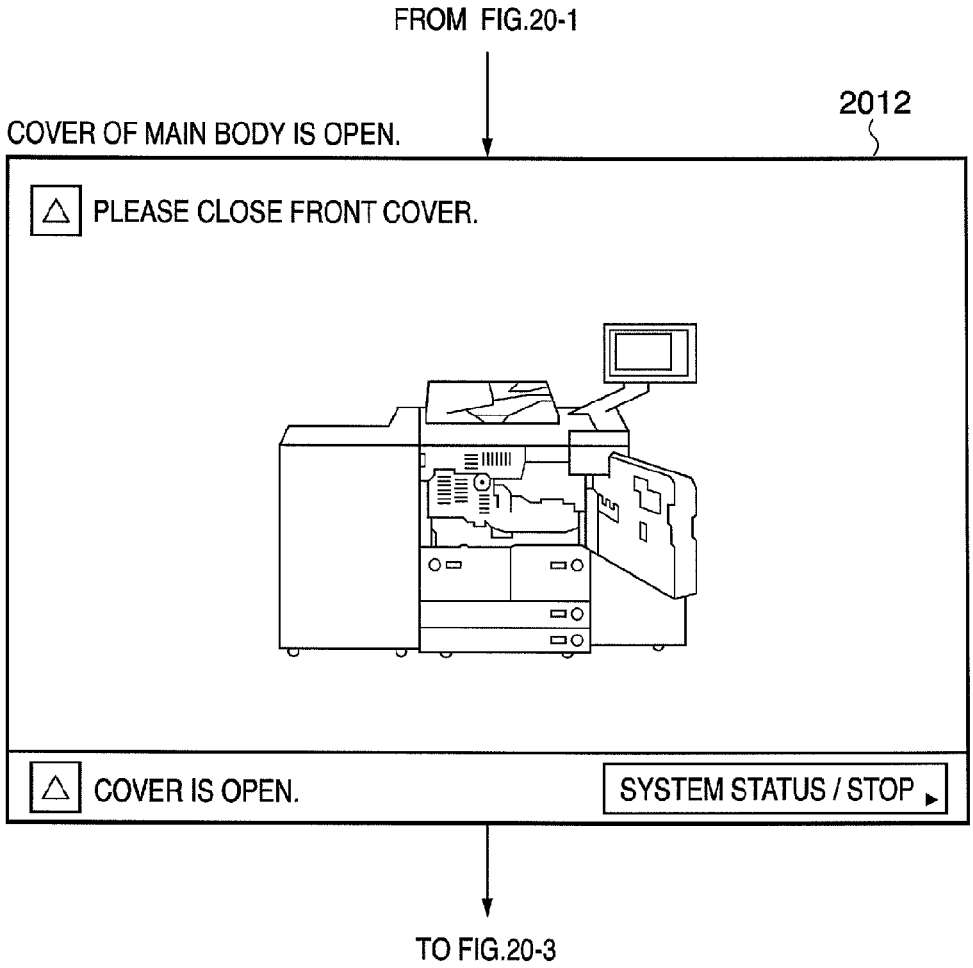
Figures 3, 20:
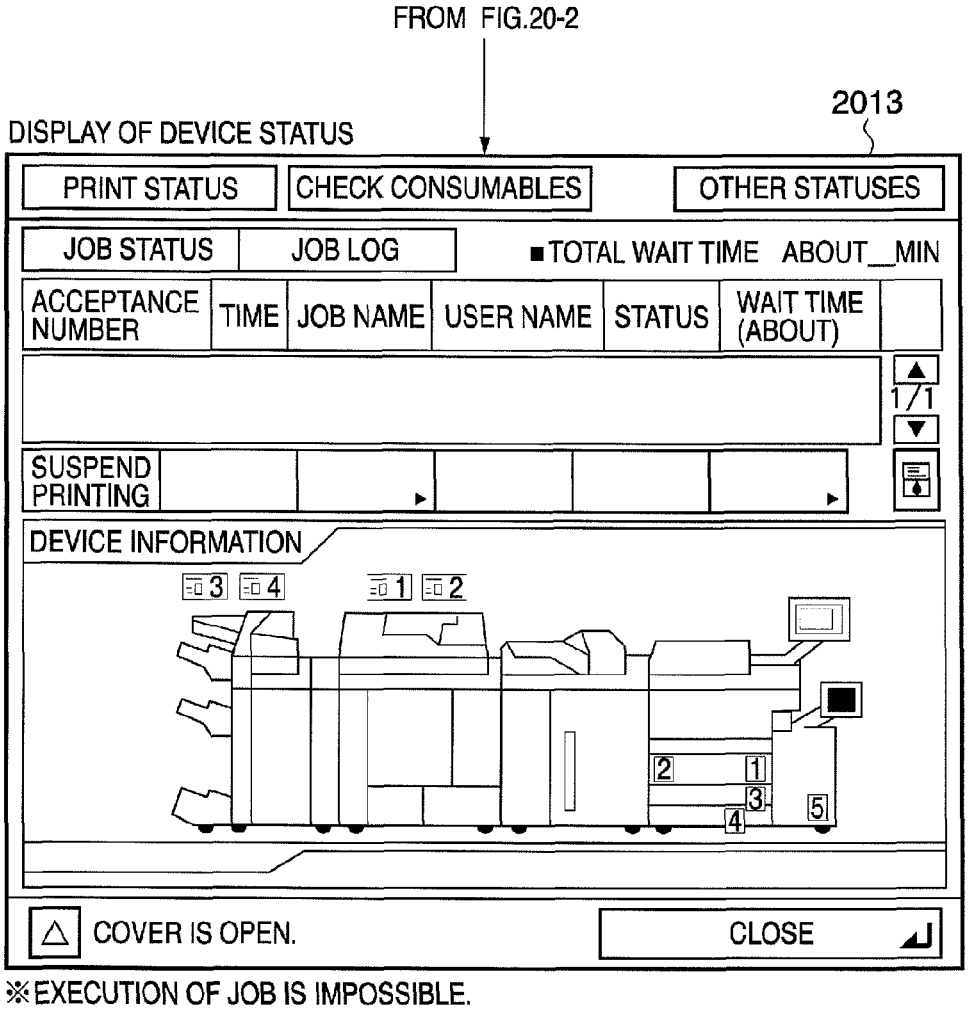

Display control executed by the control unit 205 on the condition that the cover of the printing device 100 is open in the absence of any job to be printed in the system 1000 will be explained. The cover-open status of the printing device 100 means that the cover unit of the printing device 100 serving as an example of the movable unit which is disclosed in the embodiment and is manually operable by the operator is open. The front cover of the housing of the printing device 100 will be exemplified. FIGS. 20-1 to 20-3 are views showing an example of display control executed by the control unit 205 on the touch panel unit 401 (display unit) of the operation unit 204 while the cover of the printing device main body 100 is open. In FIG. 20-1, reference numeral 2011 denotes a display window displayed on the display unit 401 under the control of the control unit 205 on the condition that there is no job to be processed and the printing device 100 stands by. When the system 1000 is in this state, the control unit 205 controls the system 1000 to allow input of a new job.

If the operator opens the cover of the printing device 100 while the window 2011 is displayed, the control unit 205 receives information to this effect via an internal signal line. In response to this information notification, the control unit 205 causes the display unit 401 to display a window display 2012 which prompts the operator to close the cover.

In this manner, when the movable unit of the printing device 100 that can respond to a manual operation by the operator is open, the control unit 205 limits (inhibits) acceptance of a new print execution request so as not to input any new job to the printing device 100. When the cover of the printing device 100 is open, the control unit 205 inhibits the printing device 100 from executing any print process even if other sheet processing devices are available. When the cover of the device 100 is open, the control unit 205 controls to inhibit all operations of all jobs requiring the print process. For this purpose, the control unit 205 changes the display contents of the display unit 401 into those of the window 2012, controlling not to input an instruction and the like for executing the print process.

According to the embodiment, the control unit 205 causes the display unit 401 to automatically display the window 2012 when the status of the movable unit of the printing device 100 changes from the closed status to the open one. The window 2012 exhibits guidance information to prompt the operator to close the movable unit of the printing device 100.

Even while the window 2012 is displayed, the control unit 205 controls to allow the operator to press a "system status/stop" key in a lower area in the display window. This key is used to input an instruction to notify the operator of the device status of the system 1000.

Assume that the operator presses the "system status/stop" key in the window 2012 while the display unit 401 displays the window 2012. In response to the input from the "system status/stop" key, the control unit 205 causes the display unit 401 to display a device status display window 2013, instead of the window 2012.

In this case, the control unit 205 keeps displaying information that the cover of the printing device 100 is open on the status line at the lower portion even while the window 2013 is displayed.

The following description is related to control executed by the control unit 205 on the condition that the movable unit of a sheet processing device that can respond to a manual operation by the operator is open in the absence of any job to be printed in the system 1000. This control will be explained with reference to FIGS. 21A and 21B. The sheet processing device described below is an inline finisher in the embodiment.

In the embodiment, the control unit 205 confirms that the movable unit of the printing device 100 is closed. The control unit 205 further confirms that the movable unit of at least one of the sheet processing devices 200 available in the system 1000 is open.

In this case, the control unit 205 permits input of a new job requiring the print process. For example, in this case, the control unit 205 controls to accept the print process condition settings and print execution request of the new job via the operation unit 204.

In this case, the movable unit of the sheet processing device is open as the device status of the system 1000. To transmit this status information to the operator, the control unit 205 controls the display unit 401 to display a message representing this information on the status line at the bottom of the display window area of the display unit 401.

Figures 1, 21A:
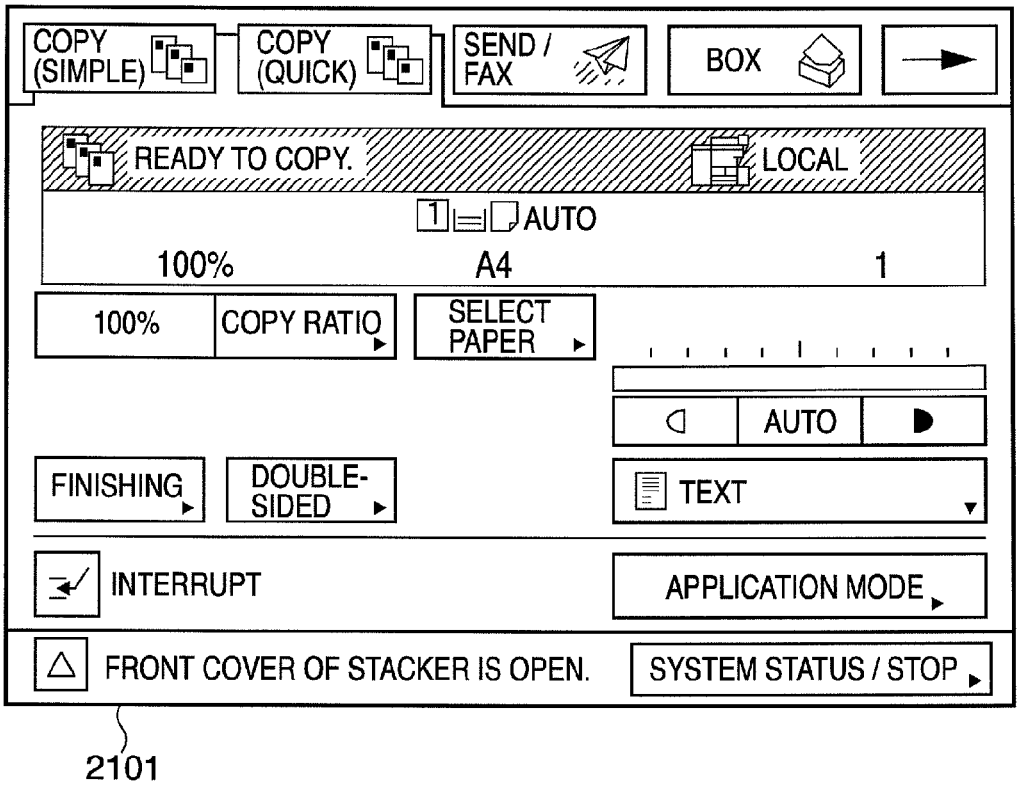
Figures 2, 21A:
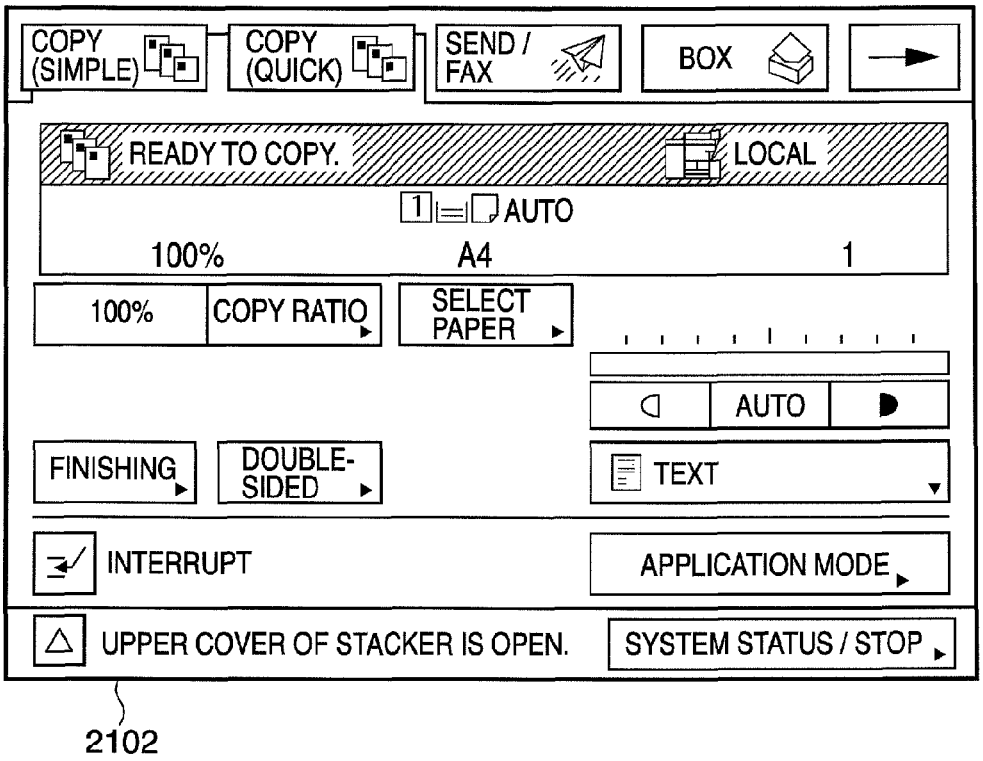
Figures 3, 21A:
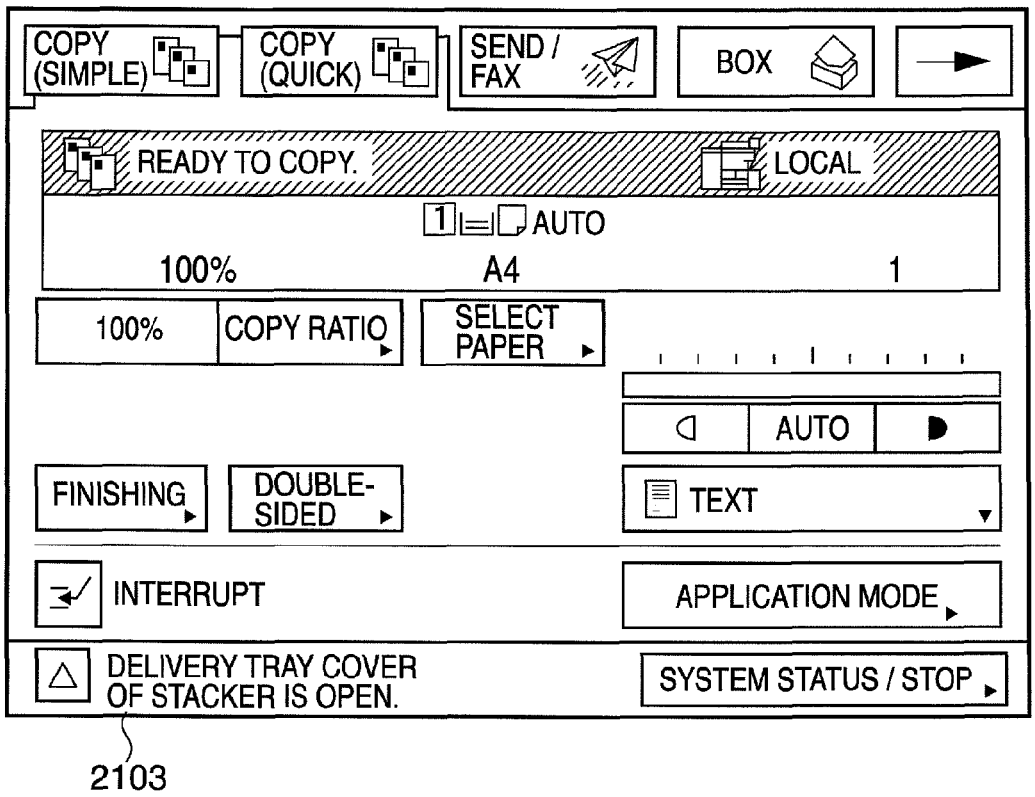
Figures 4, 21A:
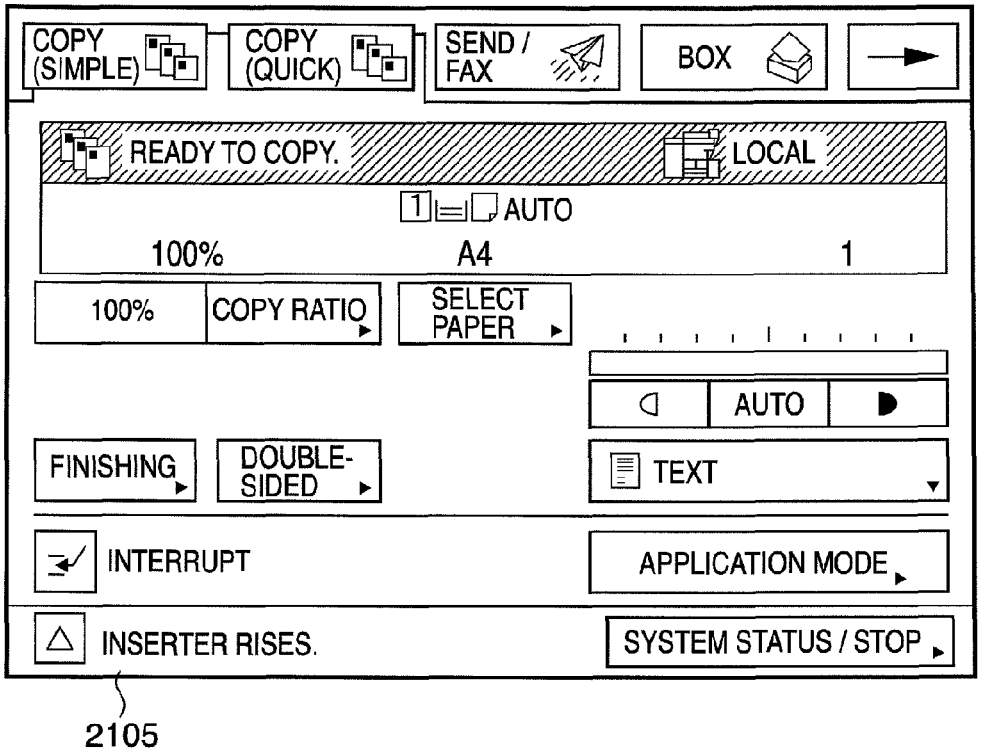
Figures 5, 21A:
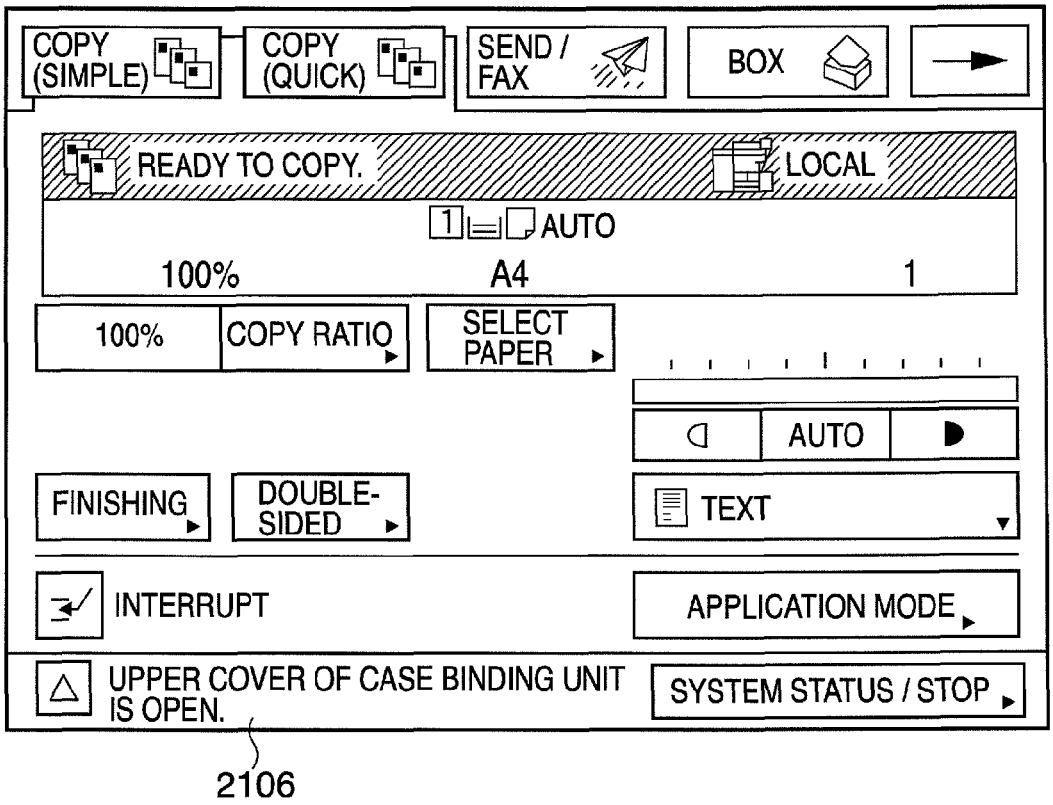
Figures 6, 21A:
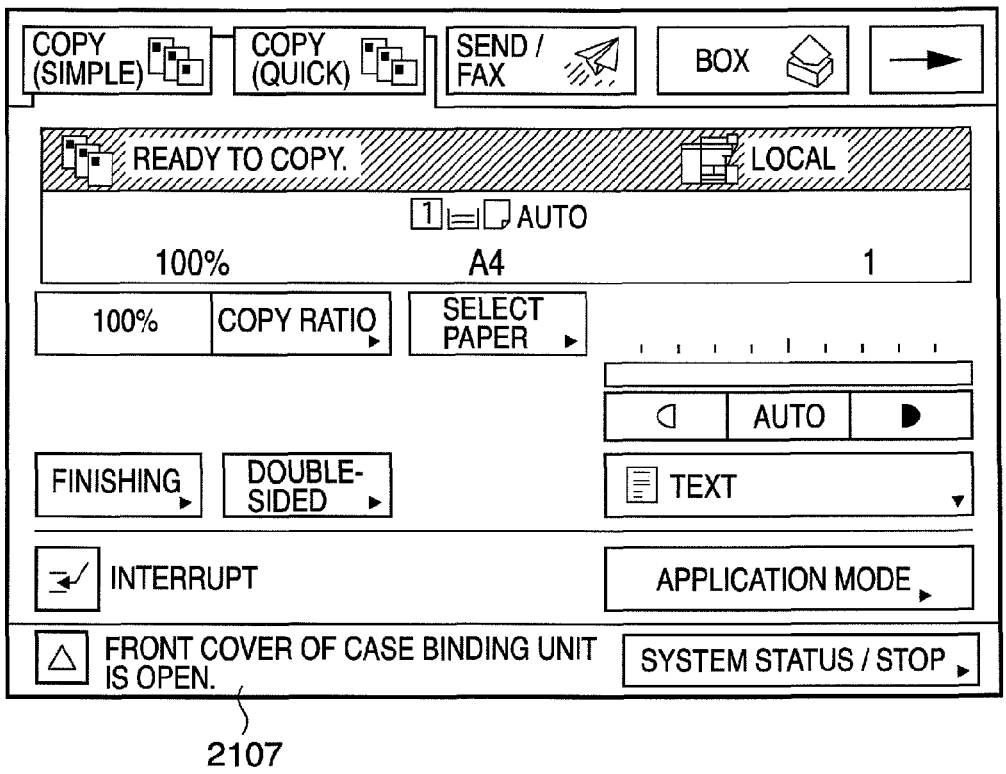
Figures 7, 21A:
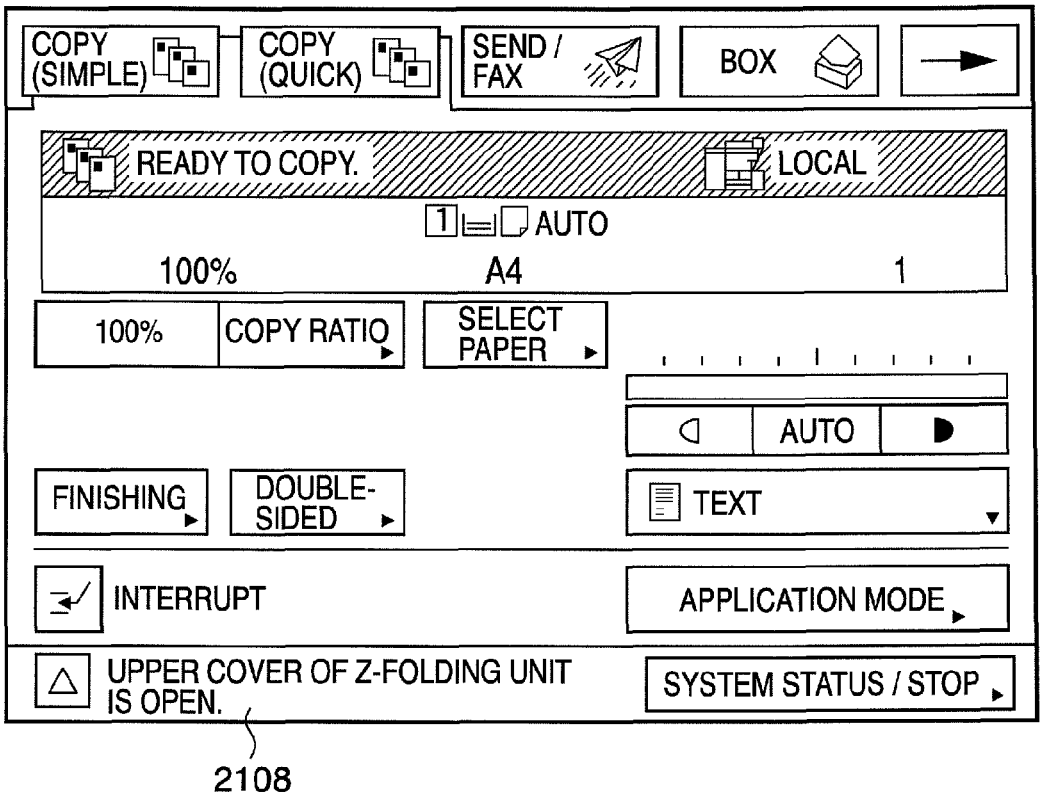
Figures 1, 21B:
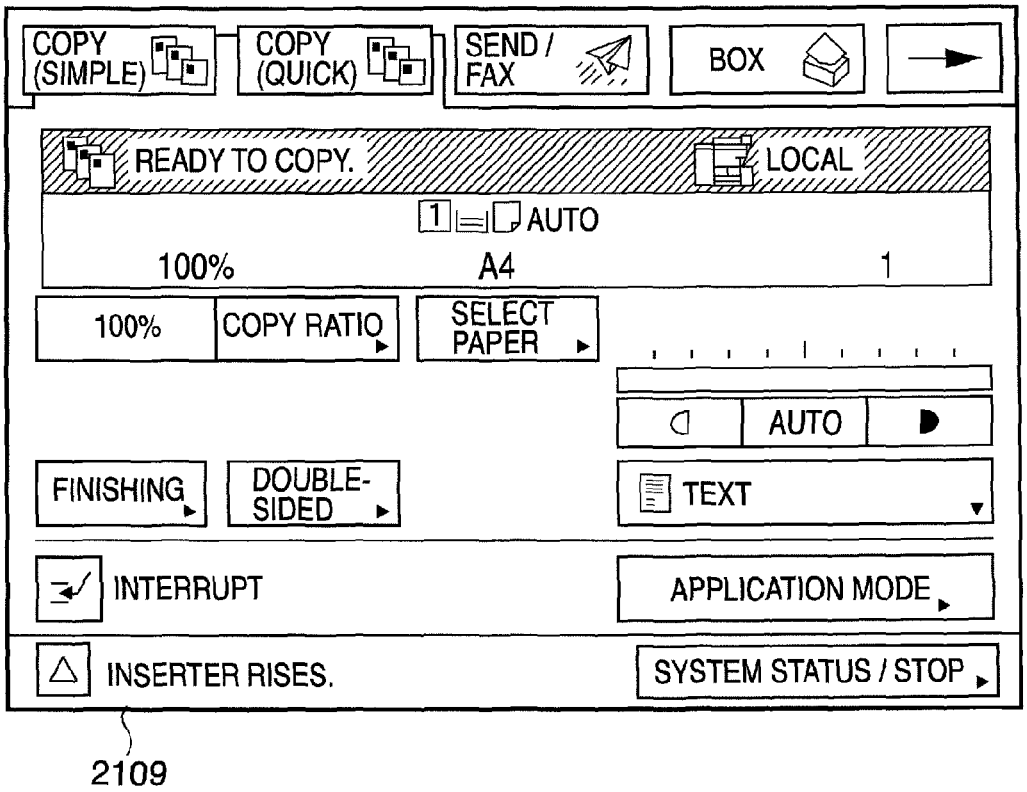
Figures 2, 21B:
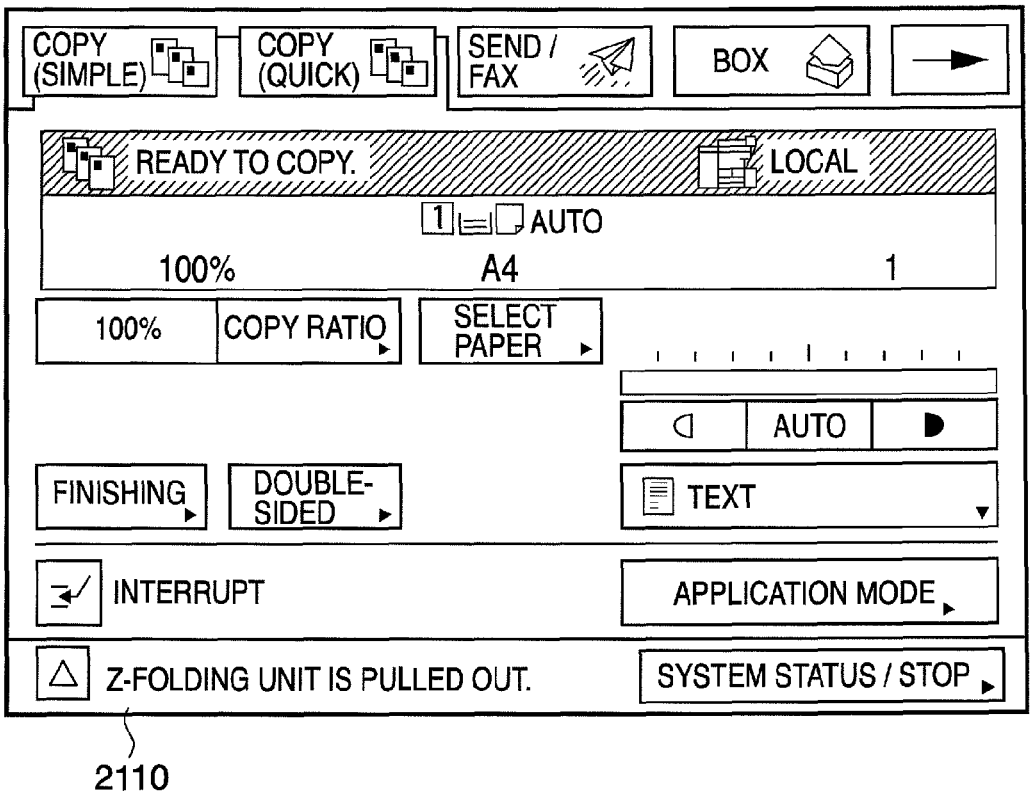
Figures 3, 21B:
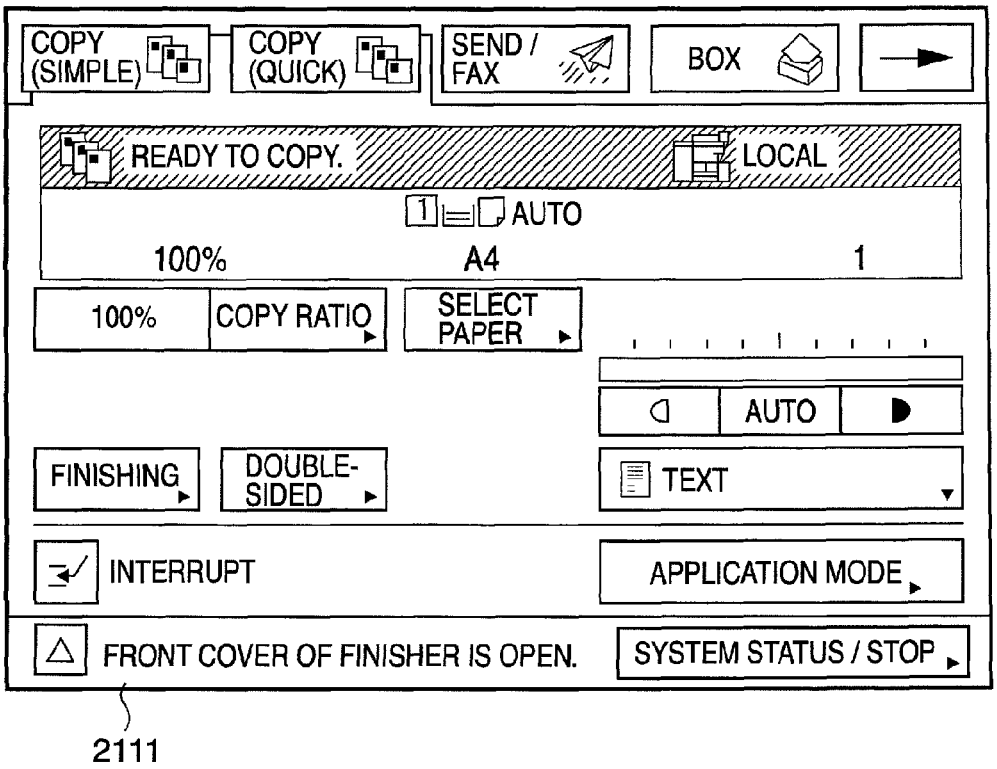
Figures 4, 21B:
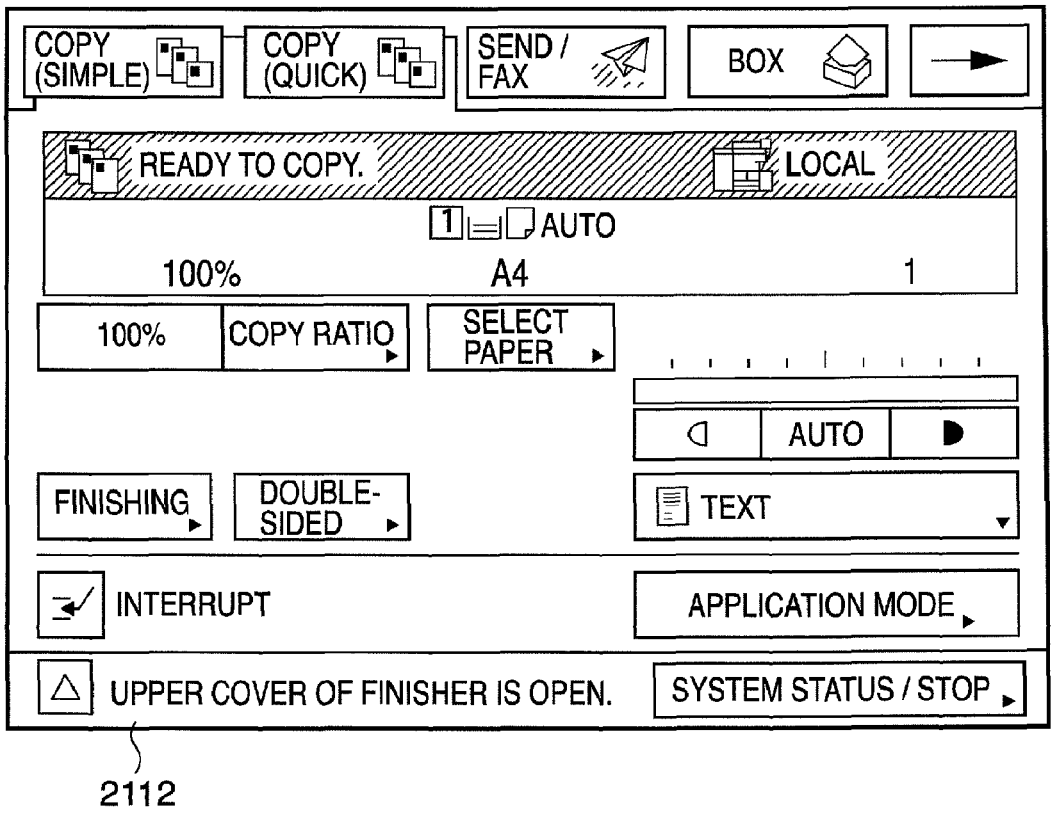
Figures 5, 21B:
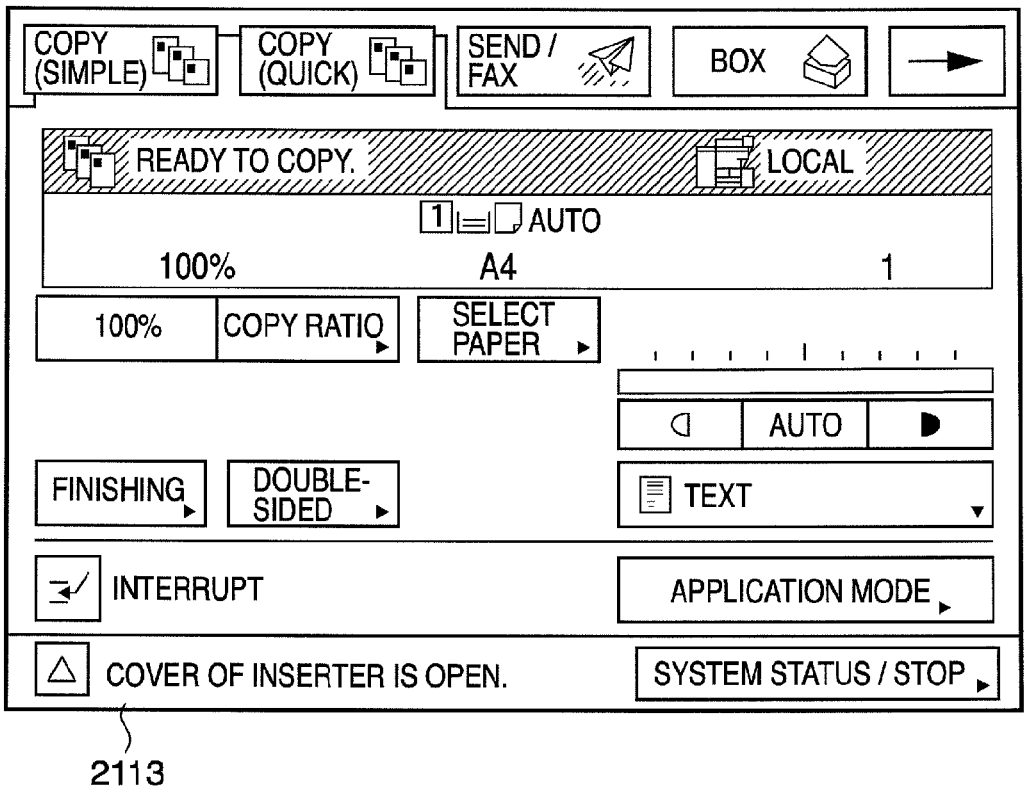
Figures 6, 21B:
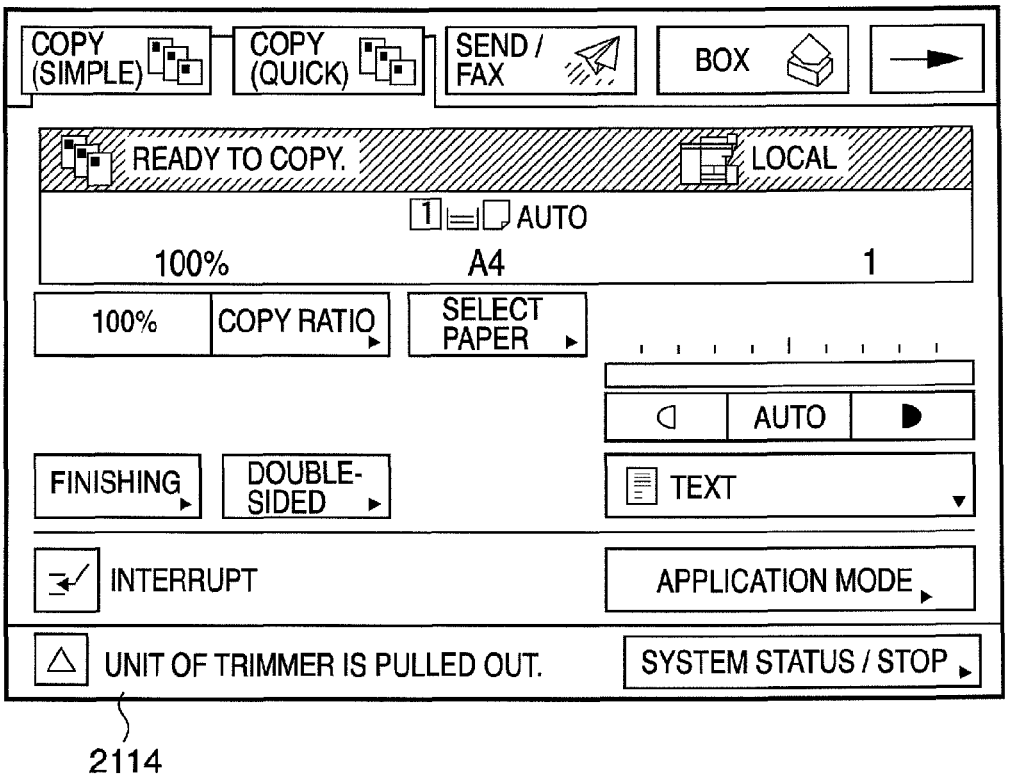
Figures 7, 21B:
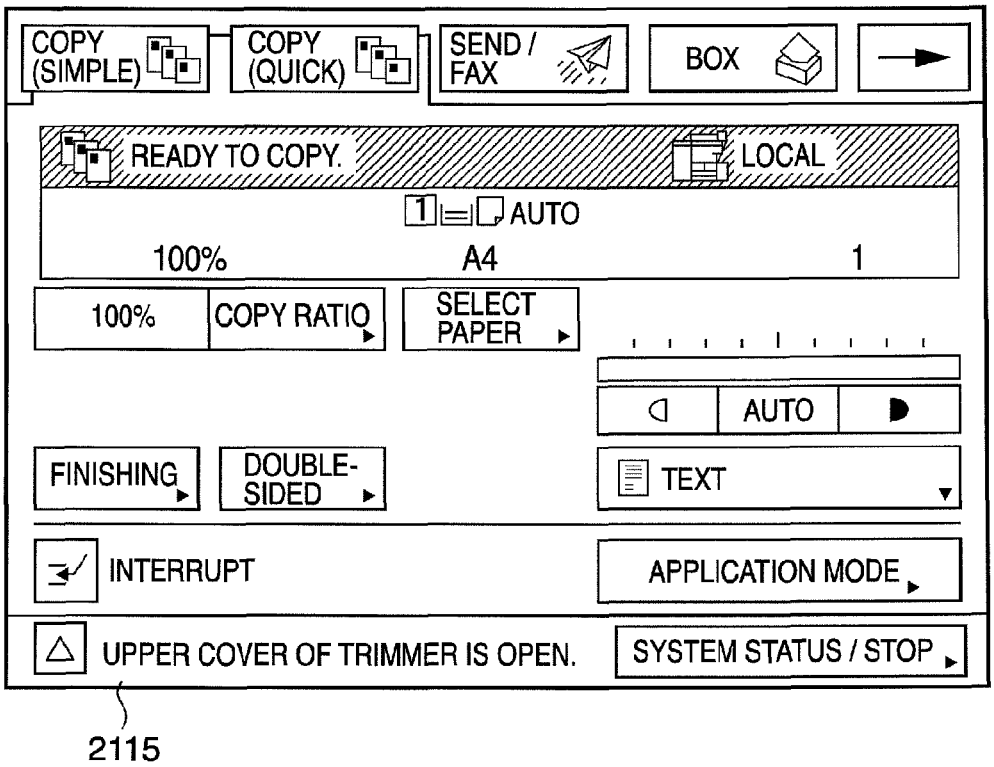
Figures 8, 21B:
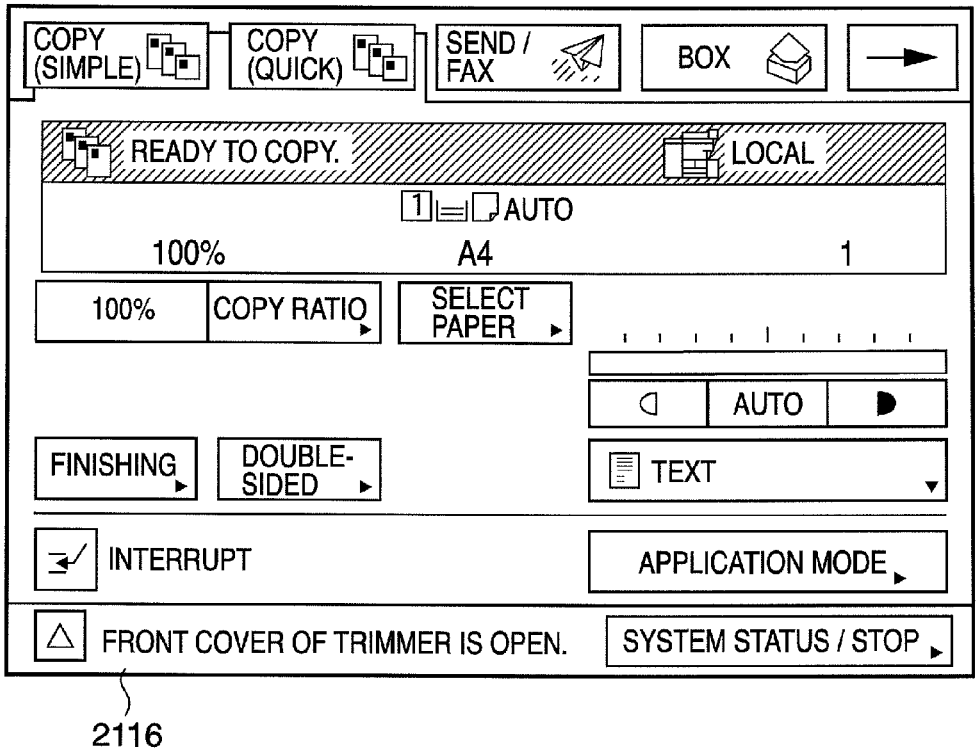

A concrete example of display control executed by the control unit 205 for the operation unit 204 having the display unit 401 will be explained with reference to a display window 2101 in FIG. 21A-1 to a display window 2116 in FIG. 21B-8. FIGS. 21A-1 to 21A-7 and 21B-1 to 21B-8 illustrate a total of 15 types of movable units as typical examples of the movable unit which can respond to a manual operation by the operator and is disclosed in the embodiment. The control unit 205 executes displays in FIGS. 21A-1 to 21A-7 and 21B-1 to 21B-8 on the premise that it confirms that at least the movable unit of the printing device 100 is closed.

Assume that the control unit 205 confirms that at least the large-volume stacker exists as an inline finisher of the system 1000 and the front cover (corresponding to the front door 2002 in FIG. 19) of the stacker is open. In this case, the control unit 205 causes the display unit 401 to display the window 2101 in FIG. 21A-1. The control unit 205 controls the operation unit 204 to accept the process conditions and print execution request of a new job from the operator via the window 2101 while the status line keeps displaying a message which notifies him that the front cover is open.

For example, the control unit 205 causes the display unit 401 to display the message illustrated in the window 2101 serving as a candidate to be displayed on the status line on the condition that, for example, the front cover of the large-volume stacker is open to take out a printed material from the stack tray. The control unit 205 controls the display unit 401 to erase status information displayed on the status line of the window 2101 on the condition that the front cover of the stacker is closed. Another control example will be described below.

Assume that the control unit 205 confirms that the system configuration comprises at least the large-volume stacker as an inline finisher of the system 1000 and the upper cover of the stacker is open. In this case, the control unit 205 causes the display unit 401 to display the window 2102 in FIG. 21A-2. The control unit 205 controls the operation unit 204 to accept the process conditions and print execution request of a new job from the operator via the window 2102 while the status line keeps displaying a message which notifies him that the upper cover is open.

The large-volume stacker in the embodiment comprises the upper cover as a movable unit which is openable/closable by the operator to cancel a jam on the straight path (see the internal structure in FIG. 11) of the stacker. When confirming that the operator opens the upper cover, the control unit 205 causes the display unit 401 to display the message illustrated in the window 2102. The control unit 205 controls the display unit 401 to erase status information displayed on the status line of the window 2102 on the condition that the upper cover of the stacker is closed. Still another control example will be described below.

Assume that the control unit 205 confirms that at least the large-volume stacker exists as an inline finisher of the system 1000 and the delivery tray cover of the stacker is open. In this case, the control unit 205 causes the display unit 401 to display the window 2103 in FIG. 21A-3. The control unit 205 controls the operation unit 204 to accept the process conditions and print execution request of a new job from the operator via the window 2103 while the status line keeps displaying a message which notifies him that the delivery tray cover is open.

The large-volume stacker in the embodiment comprises, as a movable unit which can respond to a manual operation by the operator, the delivery tray cover at a portion (see the internal structure in FIG. 11) where sheets are conveyed from the escape path to the escape tray. When confirming that the operator opens the delivery tray cover, the control unit 205 causes the display unit 401 to display the message illustrated in the window 2103. The control unit 205 controls the display unit 401 to erase status information displayed on the status line of the window 2103 on the condition that the delivery tray cover is closed.

Assume that the system 1000 is in a situation in which the control unit 205 causes the operation unit 204 to execute one of the three displays of the windows 2101 to 2103 in FIGS. 21A-1 to 21A-3. That is, the movable unit (in this example, one of the front cover, upper cover, and delivery tray cover) of the large-volume stacker serving as an inline finisher available in the system 1000 is open. In this situation, a job, for which the control unit 205 permits the start of the print process, does not require any sheet process by the large-volume stacker.

Assume that the operator uses the key 503 to input the print execution request of a job requiring no sheet process by the large-volume stacker when the control unit 205 causes the display unit 401 to display one of the windows 2101 to 2103 in FIG. 21A-1 to 21A-3.

In this case, the control unit 205 keeps displaying the status information so that the status line keeps displaying the message that the movable unit of the large-volume stacker is open.

In this case, the control unit 205 controls the system 1000 so that the printing device 100 can start the print process of the job without causing the display unit 401 to display guidance information to prompt the operator to close the movable unit of the large-volume stacker.

This control is one control example contained in control "to permit starting the print process of a job to be processed without notifying the operator via the notification unit of guidance information to prompt him to close the movable unit of an inline finisher".

The control unit 205 controls the system 1000 to inhibit (limit) execution of the print process of a job requiring a sheet process by the large-volume stacker unless a specific condition is satisfied in the situation in which one of the windows 2101 to 2103 is displayed.

Assume that the operator uses the key 503 to input the print execution request of a job requiring a sheet process by the large-volume stacker when the control unit 205 causes the display unit 401 to display one of the windows 2101 to 2103 in FIG. 21A-1 to 21A-3.

In this case, even when receiving the print execution request of the job, the control unit 205 inhibits the start of the print process of the job, and causes the display unit 401 to display guidance information to prompt the operator to close the movable unit of the large-volume stacker.

In this case, the control unit 205 controls the system 1000 so that the printing device 100 can start the print process of the job after the display unit 401 displays the guidance information and the operator closes the movable unit of the large-volume stacker.

This control is one control example contained in control "to inhibit starting the print process of a job to be processed without notifying the operator via the notification unit of guidance information to prompt him to close the movable unit of an inline finisher".

In the embodiment, the display of a popup window in a window 2304 in FIG. 23-5 to be described later is employed as an example of the display of guidance information to prompt the operator to close the movable unit of the large-volume stacker.

Control examples other than those of the windows 2101 to 2103 will be described.

Assume that the control unit 205 confirms that at least the glue binding device exists as an inline finisher of the system 1000 and the inserter (see the internal structure in FIG. 12) of the glue binding device is open. In this case, the control unit 205 causes the display unit 401 to display the window 2105 in FIG. 21A-4. The control unit 205 controls the operation unit 204 to accept the process conditions and print execution request of a new job from the operator via the window 2105 while the status line keeps displaying a message which notifies him that the inserter is open. The inserter and insertion tray (see FIG. 12) of the glue binding device are also openable/closable by the operator when removing a sheet jammed in the inserter path in the binding device, and are also examples of the movable unit in the embodiment. The control unit 205 controls the display unit 401 to erase the message displayed on the status line of the window 2105 on the condition that the inserter of the glue binding device is closed. Another control example will be described below.

Assume that the control unit 205 confirms that at least the glue binding device exists as an inline finisher of the system 1000 and the upper cover of the glue binding device is open. In this case, the control unit 205 causes the display unit 401 to display the window 2106 in FIG. 21A-5. The control unit 205 controls the operation unit 204 to accept the process conditions and print execution request of a new job from the operator via the window 2106 while the status line keeps displaying a message which notifies him that the upper cover of the glue binding device is open. The upper cover (see the internal structure in FIG. 12) of the glue binding device is also openable/closable by the operator when removing a sheet jammed in the straight path, and is also an example of the movable unit in the embodiment. The control unit 205 controls the display unit 401 to erase the message displayed on the status line of the window 2106 on the condition that the upper cover of the glue binding device is closed. Still another control example will be described below.

Assume that the control unit 205 confirms that at least the glue binding device exists as an inline finisher of the system 1000 and the front cover of the glue binding device is open. In this case, the control unit 205 causes the display unit 401 to display the window 2107 in FIG. 21A-6. The control unit 205 controls the operation unit 204 to accept the process conditions and print execution request of a new job from the operator via the window 2107 while the status line keeps displaying a message which notifies him that the front cover of the glue binding device is open. The control unit 205 controls the display unit 401 to erase the message displayed on the status line of the window 2107 on the condition that the front cover of the glue binding device is closed.

Figure 4:
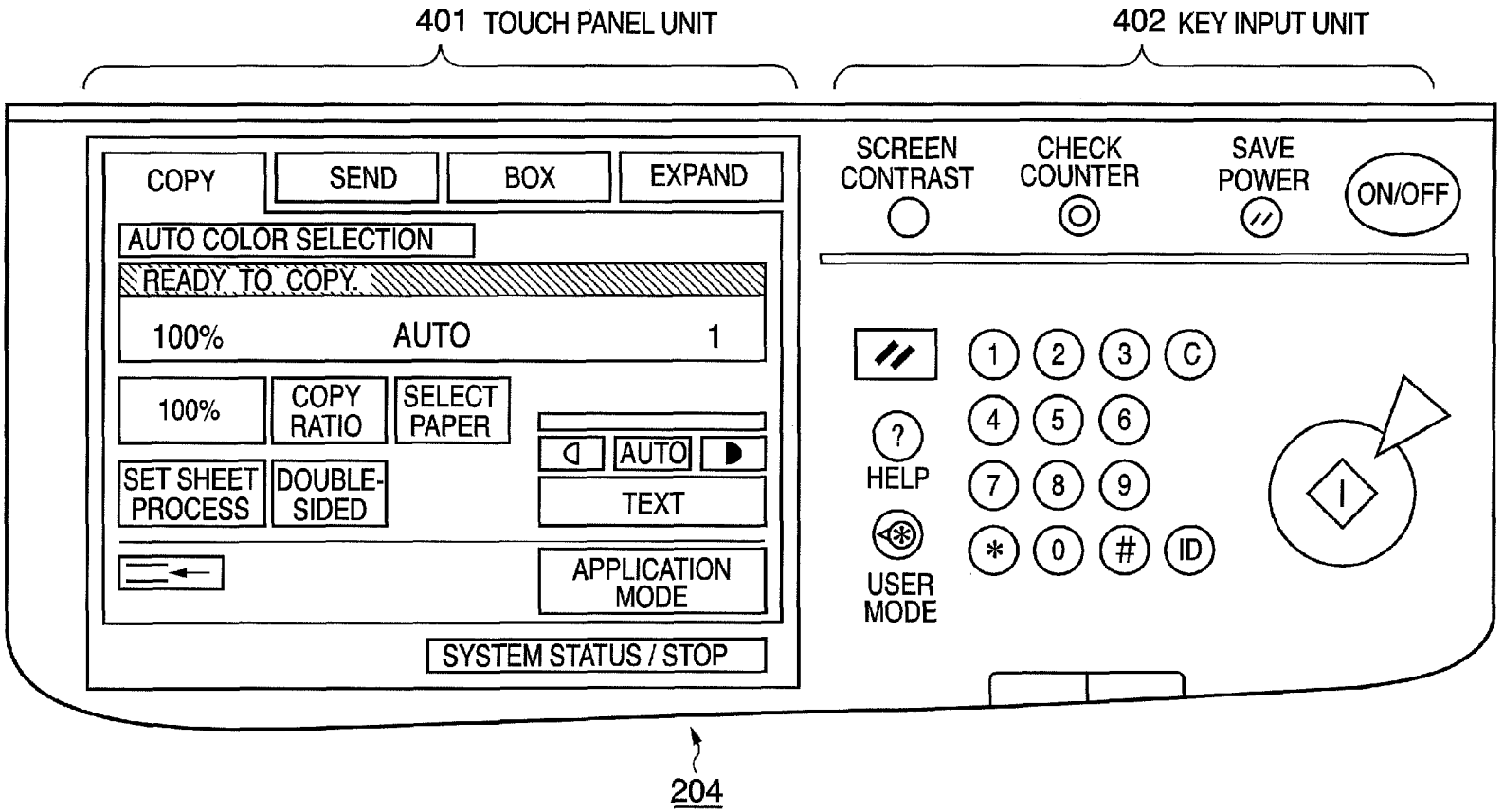
FIG. 4 is a view for explaining an example of a UI unit to be controlled in the embodiment.

Assume that the system 1000 is in a situation in which the control unit 205 causes the operation unit 204 to execute one of the three displays of the windows 2105 to 2107 in FIGS. 21A-4 to 21A-6. That is, the movable unit (in this example, at least one of the inserter, upper cover, and front cover) is open which can respond to a manual operation by the operator and is attached to the glue binding device serving as an inline finisher available in the system 1000. In this situation, a job, for which the control unit 205 permits the start of the print process, does not require any sheet process by the glue binding device.

Assume that the operator uses the key 503 to input the print execution request of a job requiring no sheet process by the glue binding device when the control unit 205 causes the display unit 401 to display one of the windows 2105 to 2107 in FIGS. 21A-4 to 21A-6.

In this case, the control unit 205 keeps displaying the status information so that the status line keeps displaying the message that the movable unit of the glue binding device is open.

In this case, the control unit 205 controls the system 1000 so that the printing device 100 can start the print process of the job without causing the display unit 401 to display guidance information to prompt the operator to close the movable unit of the glue binding device.

This control is one control example contained in control "to permit starting the print process of a job to be processed without notifying the operator via the notification unit of guidance information to prompt him to close the movable unit of an inline finisher".

The control unit 205 controls the system 1000 to inhibit (limit) execution of the print process of a job requiring a sheet process by the glue binding device unless a specific condition is satisfied in the situation in which one of the windows 2105 to 2107 is displayed.

Assume that the operator uses the key 503 to input the print execution request of a job requiring a sheet process by the glue binding device when the control unit 205 causes the display unit 401 to display one of the windows 2105 to 2107 in FIGS. 21A-4 to 21A-6.

In this case, even when receiving the print execution request of the job, the control unit 205 inhibits the start of the print process of the job, and causes the display unit 401 to display guidance information to prompt the operator to close the movable unit of the glue binding device.

In this case, the control unit 205 controls the system 1000 so that the printing device 100 can start the print process of the job after the display unit 401 displays the guidance information and the operator closes the movable unit of the glue binding device.

This control is one control example contained in control "to inhibit starting the print process of a job to be processed without notifying the operator via the notification unit of guidance information to prompt him to close the movable unit of an inline finisher".

In the embodiment, the display of a popup window in a window 2503 in FIG. 25-3 to be described later is employed as an example of the display of guidance information to prompt the operator to close the movable unit of the glue binding device.

Control examples other than those of the windows 2105 to 2107 will be described.

Assume that the control unit 205 confirms that at least the saddle stitching device exists as an inline finisher of the system 1000 and the upper cover of the Z-folding unit (see the internal structure in FIG. 13) of the saddle stitching device is open. In this case, the control unit 205 causes the display unit 401 to display the window 2108 in FIG. 21A-7. The control unit 205 controls the operation unit 204 to accept the process conditions and print execution request of a new job from the operator via the window 2108 while the status line keeps displaying a message which notifies him that the upper cover of the Z-folding unit is open. The control unit 205 controls the display unit 401 to erase the message displayed on the status line of the window 2108 on the condition that the upper cover of the Z-folding unit is closed. The upper cover (see the internal structure in FIG. 13) of the Z-folding unit of the saddle stitching device is also an example of the movable unit in the embodiment that is also openable/closable by the operator when, for example, removing a sheet jammed in the feeding path extending to a succeeding sheet processing device. Another control example will be described below.

Assume that the control unit 205 confirms that at least the saddle stitching device exists as an inline finisher of the system 1000 and the inserter at the top of the saddle stitching device is open. In this case, the control unit 205 causes the display unit 401 to display the window 2109 in FIG. 21B-1. The control unit 205 controls the operation unit 204 to accept the process conditions and print execution request of a new job from the operator via the window 2109 while the status line keeps displaying a message which notifies him that the inserter is open. The control unit 205 controls the display unit 401 to erase the message displayed on the status line of the window 2109 on the condition that the inserter of the saddle stitching device is closed. The inserter (see the internal structure in FIG. 13) of the saddle stitching device is also an example of the movable unit which can respond to an operator operation. Another control example will be described below.

Assume that the control unit 205 confirms that at least the saddle stitching device exists as an inline finisher of the system 1000 and the Z-folding unit of the saddle stitching device is pulled out to the front. In this case, the control unit 205 causes the display unit 401 to display the window 2110 in FIG. 21B-2. The control unit 205 controls the operation unit 204 to accept the process conditions and print execution request of a new job from the operator via the window 2110 while the status line keeps displaying a message which notifies him that the Z-folding unit is open. The control unit 205 controls the display unit 401 to erase the message displayed on the status line of the window 2110 on the condition that the Z-folding unit of the saddle stitching device is returned to the original position. The Z-folding unit (see the internal structure in FIG. 13) of the saddle stitching device is also an example of the movable unit which can respond to an operation by the operator.

In addition to these movable units, the saddle stitching device whose internal structure is shown in FIG. 13 comprises other movable units manually operable by the operator. Pieces of information to be displayed on the status line illustrated in the windows 2111 to 2116 in FIGS. 21B-3 to 21B-8 are displayed when the corresponding movable units are open.

Assume that the control unit 205 confirms that at least the saddle stitching device exists as an inline finisher of the system 1000 and the front cover of the housing which incorporates the puncher and stapler of the saddle stitching device is open. In this case, the control unit 205 causes the display unit 401 to display the window 2111 in FIG. 21B-3. The control unit 205 controls the operation unit 204 to accept the process conditions and print execution request of a new job from the operator via the window 2111 while the status line keeps displaying a message which notifies him that the front cover of the saddle stitching device is open. The control unit 205 controls the display unit 401 to erase the message displayed on the status line of the window 2111 on the condition that the front cover of the saddle stitching device is closed.

Assume that the control unit 205 confirms that at least the saddle stitching device exists as an inline finisher of the system 1000 and the upper cover of the housing which incorporates the puncher and stapler of the saddle stitching device is open. In this case, the control unit 205 causes the display unit 401 to display the window 2112 in FIG. 21B-4. The control unit 205 controls the operation unit 204 to accept the process conditions and print execution request of a new job from the operator via the window 2112 while the status line keeps displaying a message which notifies him that the upper cover is open. The control unit 205 controls the display unit 401 to erase the message displayed on the status line of the window 2112 on the condition that the upper cover is closed.

Assume that the control unit 205 confirms that at least the saddle stitching device exists as an inline finisher of the system 1000 and the cover of the inserter of the saddle stitching device is open. In this case, the control unit 205 causes the display unit 401 to display the window 2113 in FIG. 21B-5. The control unit 205 controls the operation unit 204 to accept the process conditions and print execution request of a new job from the operator via the window 2113 while the status line keeps displaying a message which notifies him that the cover of the inserter is open. The control unit 205 controls the display unit 401 to erase the message displayed on the status line of the window 2113 on the condition that the cover of the inserter of the saddle stitching device is closed.

The front cover, upper cover, and inserter cover of the saddle stitching device are also examples of the movable unit which is openable/closable by the operator when, for example, removing a sheet jammed in the saddle stitching device.

Assume that the control unit 205 confirms that at least the saddle stitching device exists as an inline finisher of the system 1000 and the trimmer unit of the saddle stitching device is pulled out. In this case, the control unit 205 causes the display unit 401 to display the window 2114 in FIG. 21B-6. Also in this case, as shown in the window 2114, the control unit 205 controls the operation unit 204 to accept the print execution request of a new job from the operator while the status line keeps notifying him that the trimmer unit is pulled out. The control unit 205 controls the display unit 401 to erase the message on the status line of the window 2114 in FIG. 21B-6 on the condition that the trimmer unit is returned to the original position. The trimmer unit can be pulled out by a manual operation by the operator, and is also an example of the movable unit disclosed in the embodiment.

Assume that the control unit 205 confirms that at least the saddle stitching device exists as an inline finisher of the system 1000 and the upper cover of the trimmer of the saddle stitching device is open. In this case, the control unit 205 causes the display unit 401 to display the window 2115 in FIG. 21B-7. Also in this case, as shown in the window 2115, the control unit 205 controls the operation unit 204 to accept the print execution request of a new job from the operator while the status line keeps notifying the operator that the upper cover of the trimmer is open. The control unit 205 controls the display unit 401 to erase the message on the status line of the window 2115 in FIG. 21B-7 on the condition that the upper cover of the trimmer is closed.

Assume that the control unit 205 confirms that at least the saddle stitching device exists as an inline finisher of the system 1000 and the front cover of the trimmer of the saddle stitching device is open. In this case, the control unit 205 causes the display unit 401 to display the window 2116 in FIG. 21B-8. The control unit 205 controls the operation unit 204 to accept the process conditions and print execution request of a new job from the operator via the window 2116 while the status line keeps displaying a message which notifies him that the front cover of the trimmer is open. The control unit 205 controls the display unit 401 to erase the message displayed on the status line of the window 2116 on the condition that the front cover of the trimmer is closed.

The unit, upper cover, and front cover of the trimmer are also examples of the movable unit which is operable by the operator when, for example, removing a sheet jammed in the trimmer.

Assume that the system 1000 is in a situation in which the control unit 205 causes the operation unit 204 to execute one of the nine displays of the window 2108 in FIG. 21A-7 to the window 2116 in FIG. 21B-8. That is, the movable unit of the saddle stitching device serving as an inline finisher available in the system 1000 is open. In this situation, a job, for which the control unit 205 permits the start of the print process, does not require any sheet process by the saddle stitching device.

Assume that the operator uses the key 503 to input the print execution request of a job requiring no sheet process by the saddle stitching device when the control unit 205 causes the display unit 401 to display one of the window 2108 in FIG. 21A-7 to the window 2116 in FIG. 21B-8.

In this case, the control unit 205 keeps displaying the status information so that the status line keeps displaying the message which notifies him that the movable unit of the saddle stitching device is open.

In this case, the control unit 205 controls the system 1000 so that the printing device 100 can start the print process of the job without causing the display unit 401 to display guidance information to prompt the operator to close the movable unit of the saddle stitching device.

This control is one control example contained in control "to permit starting the print process of a job to be processed without notifying the operator via the notification unit of guidance information to prompt him to close the movable unit of an inline finisher".

The control unit 205 controls the system 1000 to inhibit (limit) execution of the print process of a job requiring a sheet process by the saddle stitching device unless a specific condition is satisfied in the situation in which one of the windows 2108 to 2116 is displayed.

Assume that the operator uses the key 503 to input the print execution request of a job requiring a sheet process by the saddle stitching device when the control unit 205 causes the display unit 401 to display one of the windows 2108 to 2116.

In this case, even when receiving the print execution request of the job, the control unit 205 inhibits the start of the print process of the job, and causes the display unit 401 to display guidance information to prompt the operator to close the movable unit of the saddle stitching device.

In this case, the control unit 205 controls the system 1000 so that the printing device 100 can start the print process of the job after the display unit 401 displays the guidance information and the operator closes the movable unit of the saddle stitching device.

This control is one control example contained in control "to inhibit starting the print process of a job to be processed without notifying the operator via the notification unit of guidance information to prompt him to close the movable unit of an inline finisher".

In the embodiment, the display of a popup window in a window 2403 in FIG. 24-3 to be described later is employed as an example of the display of guidance information to prompt the operator to close the movable unit of the saddle stitching device.

Control executed by the control unit 205 on the condition that the control unit 205 confirms that at least one of types of movable units of the sheet processing devices 200 is open has been exemplified with reference to FIGS. 21A and 21B. Control executed by the control unit 205 when displaying one of the window 2101 in FIG. 21A-1 to the window 2116 in FIG. 21B-8 is different from one executed by the control unit 205 when displaying the window 2012 or 2013 in FIGS. 20-2 and 20-3.

For example, in the control illustrated in FIGS. 21A and 21B, the control unit 205 causes the operation unit 204 to display a message (status information) that the movable unit is open, on the status line at the bottom of the display window. The control unit 205 controls the operation unit 204 to allow the operator to input the print process condition settings and print execution request of a new job while keeping the status information displayed.

More specifically, when executing the control illustrated in FIGS. 21A and 21B, the control unit 205 does not perform control to execute full-screen display which covers the entire display area, so as not to accept any operation from the operator and to inhibit input of a new job. This is an example of the mechanism of obtaining the effects of the embodiment to ensure the continuous-run operation of the system 1000 as much as possible and process a plurality of jobs at high productivity without inhibiting execution of a job before finalizing which of inline finishers is used for a newly input job. This configuration is also an example of the mechanism of obtaining other effects of the embodiment to achieve the above effects while maintaining high operability without demanding extra work of the operator.

Assume that a plurality of movable units among a total of 15 movable units illustrated in FIGS. 21A and 21B are open in the system 1000. In this case, the control unit 205 controls to display pieces of status information of these open movable units sequentially one by one on the status line out of a total of 15 messages to be displayed on the status line in the windows of FIGS. 21A and 21B. At this time, for example, the control unit 205 controls to display messages representing the open status of the movable units preferentially from an inline finisher close to the printing device 100. It may be configured to, when movable units are open at a plurality of portions, display pieces of status information of these movable units in accordance with a predetermined priority order. When displaying pieces of status information of the movable units on the status line, they are automatically switched at predetermined intervals. Accordingly, all the messages of pieces of status information of the open movable units are displayed automatically. The control unit 205 may also execute this display control.

Control when a job is input will be explained. A control example when the control unit 205 newly accepts a job execution request while none of the above-mentioned movable unit is open in the system 1000 (all the movable units are closed) will be described with reference to FIGS. 22-1 to 22-3.

In the following description, "no cover is open" means that all movable units manually operable by the operator in order to, for example, manually remove a jam are closed in the system 1000. In the following description, "standby state" means a state in which the printing device 100 does not suffer any print interrupt factors or the like and the printing device 100 is printable.

Figures 1, 22:
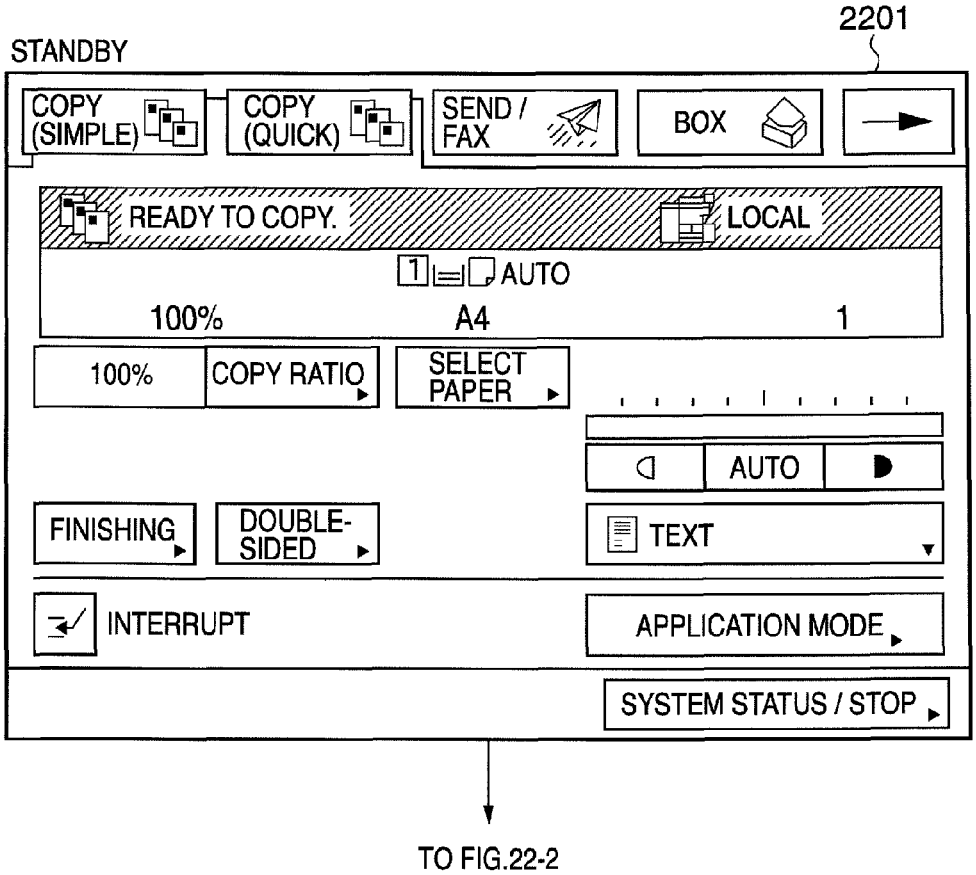
Figures 2, 22:
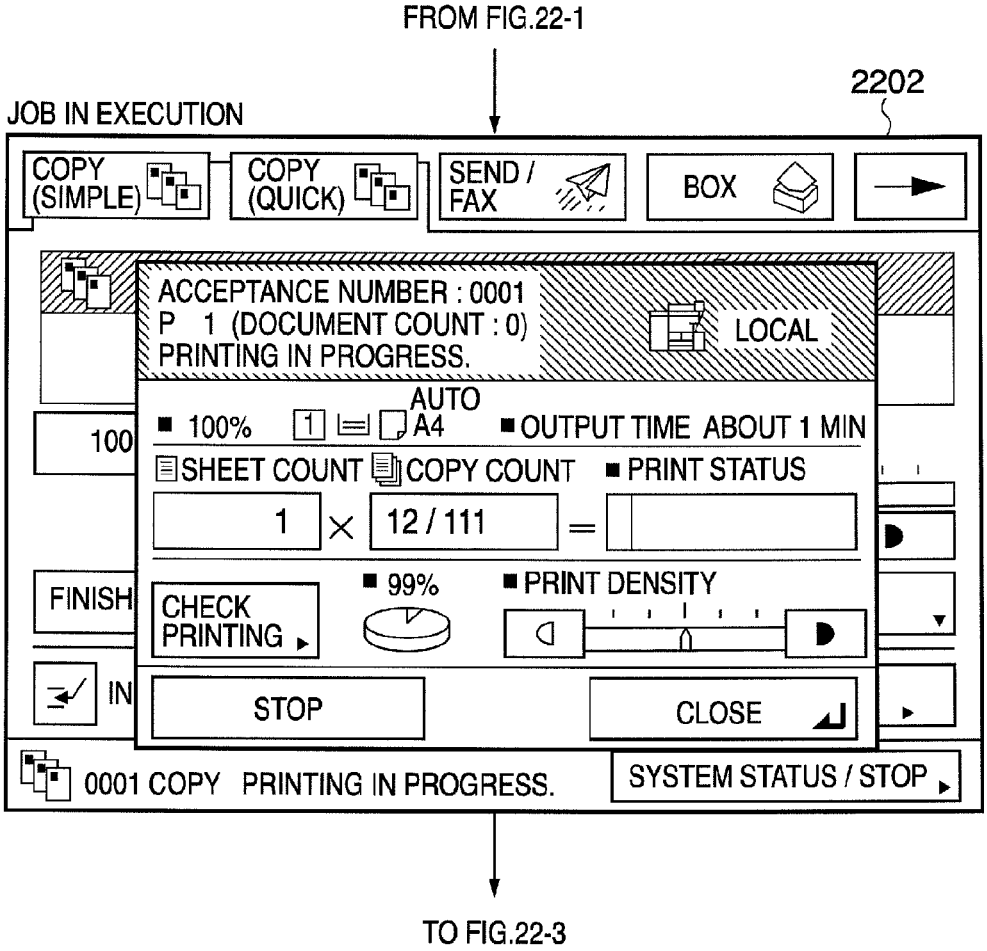
Figures 3, 22:
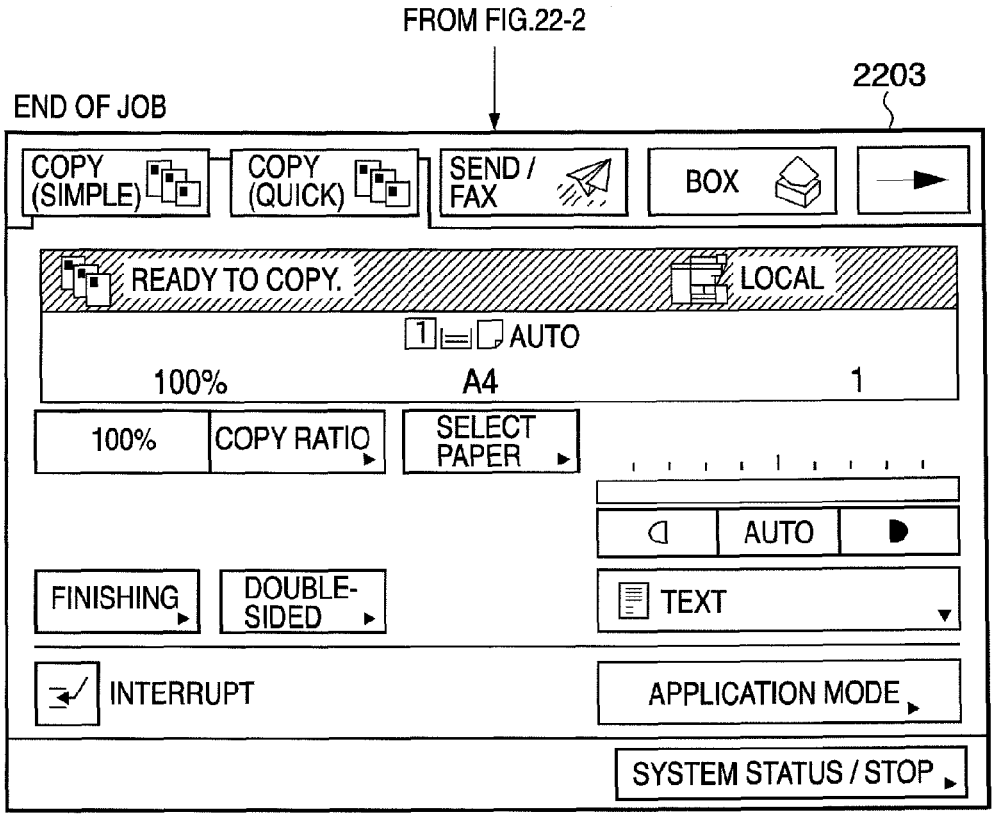

In the standby state of the system 1000, the control unit 205 causes the display unit 401 to display a window 2201 in FIG. 22-1 in order to display to the operator a message to this effect. The control unit 205 waits for input of a new job via the window 2201.

Assume that the operator sets the print process conditions of a new job to be processed using the operation unit 204, and presses the start key 503 in the standby state. When the user presses the key 503, the control unit 205 determines that the operator has input the print start request of the job. Then, the control unit 205 causes the printing device 100 to start the print process of the job.

Assume that this job is a copy job. In this case, the control unit 205 causes the scanner unit 201 to scan print data of the job in accordance with input of the print start request from the key 503. The control unit 205 causes the HD 209 to store the scanned print data of the job. After that, the control unit 205 causes the printer unit 203 to print the print data of the job that is stored in the HD 209. In this way, the control unit 205 executes the scan and storage processes of the job prior to the print process.

If the job is a box job, the HD 209 has already stored print data of the job prior to input of the print start request from the operation unit 204. Thus, if the job is a box job, the control unit 205 causes the printer unit 203 to print by reading out the print data of the job from the HD 209 without executing the scan and storage processes of the job after receiving the print start request from the operation unit 204.

The embodiment treats various jobs (e.g., a copy job and box job) as jobs to be printed. Control disclosed in the embodiment is applicable commonly to these jobs.

By this method, the control unit 205 causes the display unit 401 to display a display window capable of notifying the operator of the job progress when the printing device 100 actually starts processing the job whose print start request is issued.

For example, when printing of the job is in progress in the system 1000, the control unit 205 causes the display unit 401 to display a window 2202 in FIG. 22-2 as the display representing the progress. In the embodiment, the control unit 205 causes the display unit 401 to display a popup window representing that the job is in execution, as shown in the display of the window 2202. The popup window illustrated in the window 2202 can notify the operator of the progress of a current job in real time, and is called a job process status window in the embodiment.

Assume that the system 1000 completes the process of the job through the series of processes. In response to this, the control unit 205 controls the display unit 401 to erase (close) the job process status window from the window, and change the display contents of the display unit 401 to those in the standby state. For example, the control unit 205 causes the display unit 401 to display a window 2203 of the same display contents as those of the window 2201 after the end of processing of the job displayed in the popup window of the window 2202.

This is an example of job execution control executed by the control unit 205 and an example of display control on the display unit 401 while no cover is open.

This control is executed while all movable units operable by the operator are closed in the system 1000. That is, this control is a control example in a case that the statuses of the movable units do not change from the closed status to the open one. To the contrary, guidance information notification control executed in a case that one of the movable units of inline finishers changes from the closed status to the open one, and job control in this case will be exemplified.

Control executed by the control unit 205 in a case that the status of the front cover of the large-volume stacker in the system 1000 changes from the closed status to the open one along with operation by an operator will be described with reference to FIGS. 23-1 to 23-7.

Figures 1, 23:
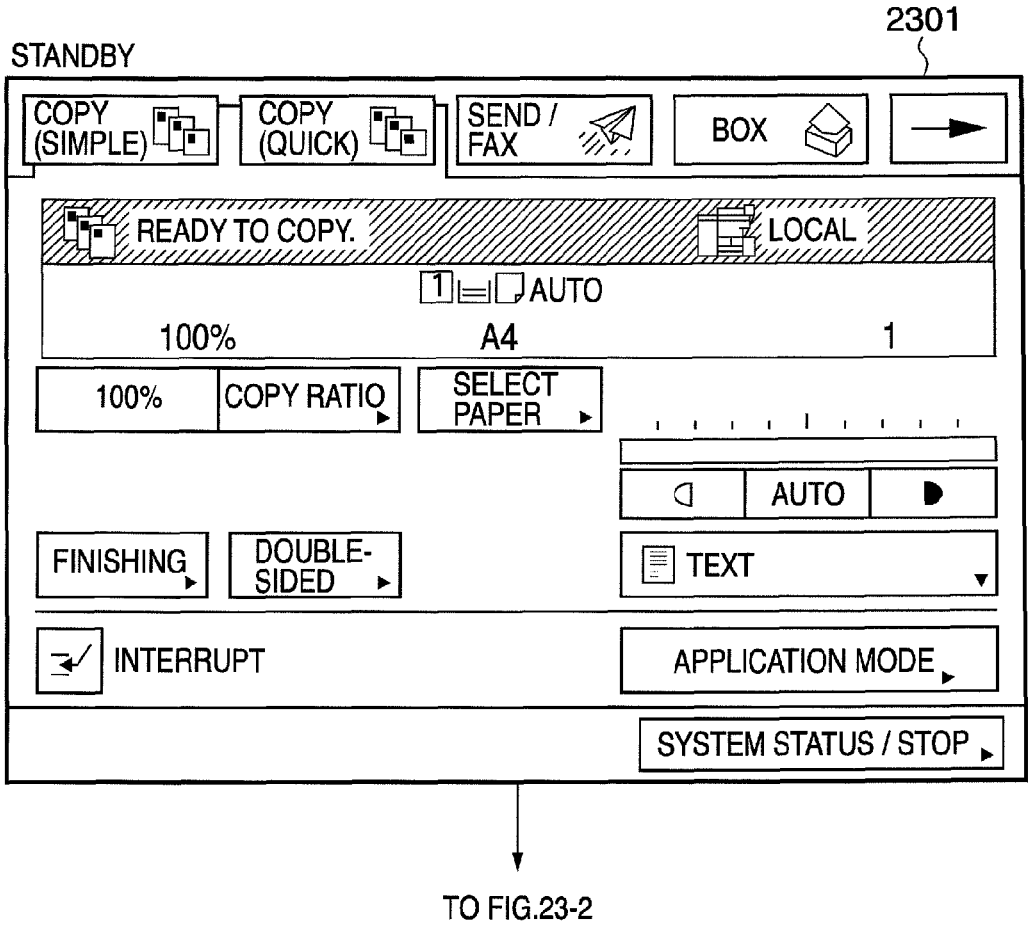
Figures 2, 23:
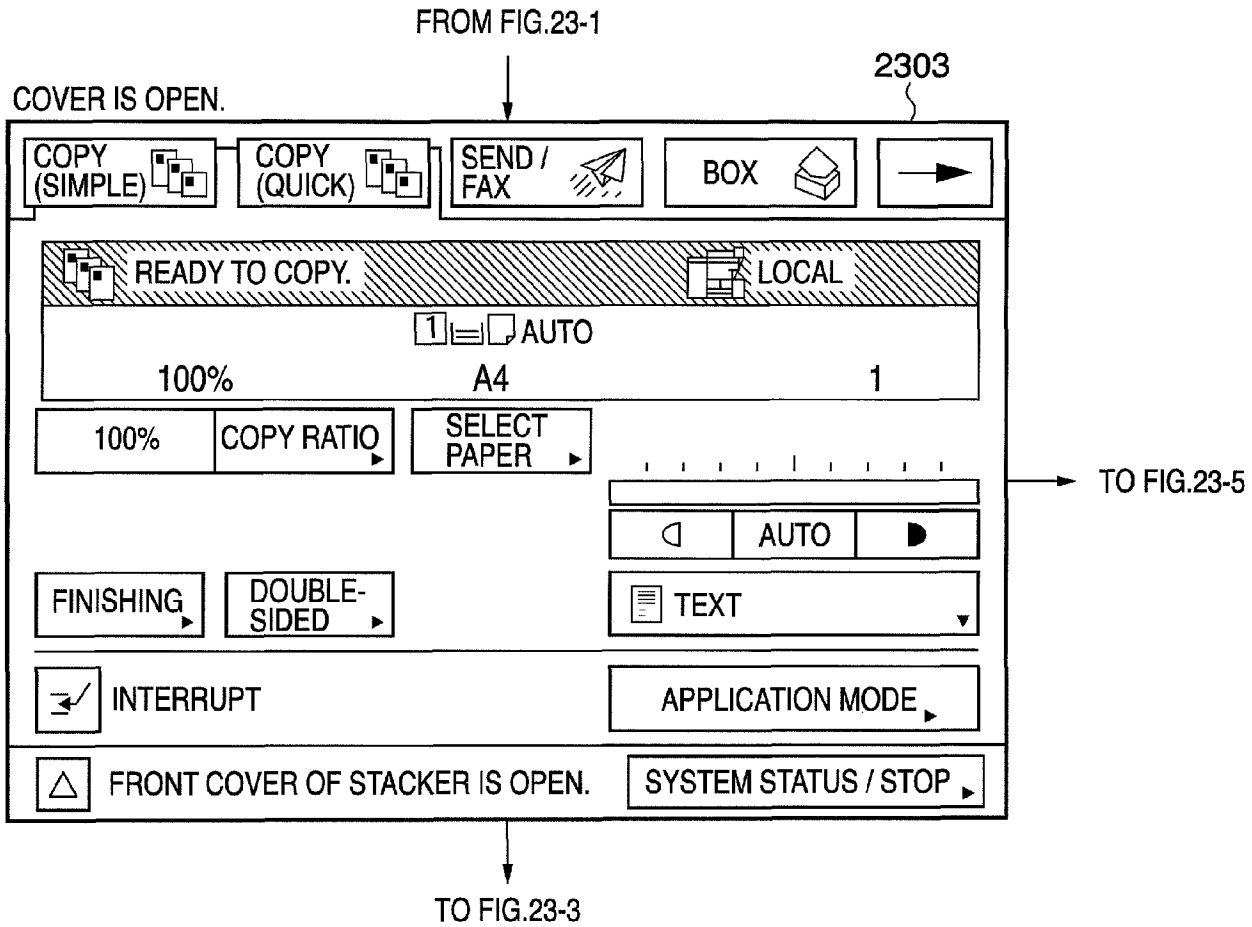
Figures 3, 23:
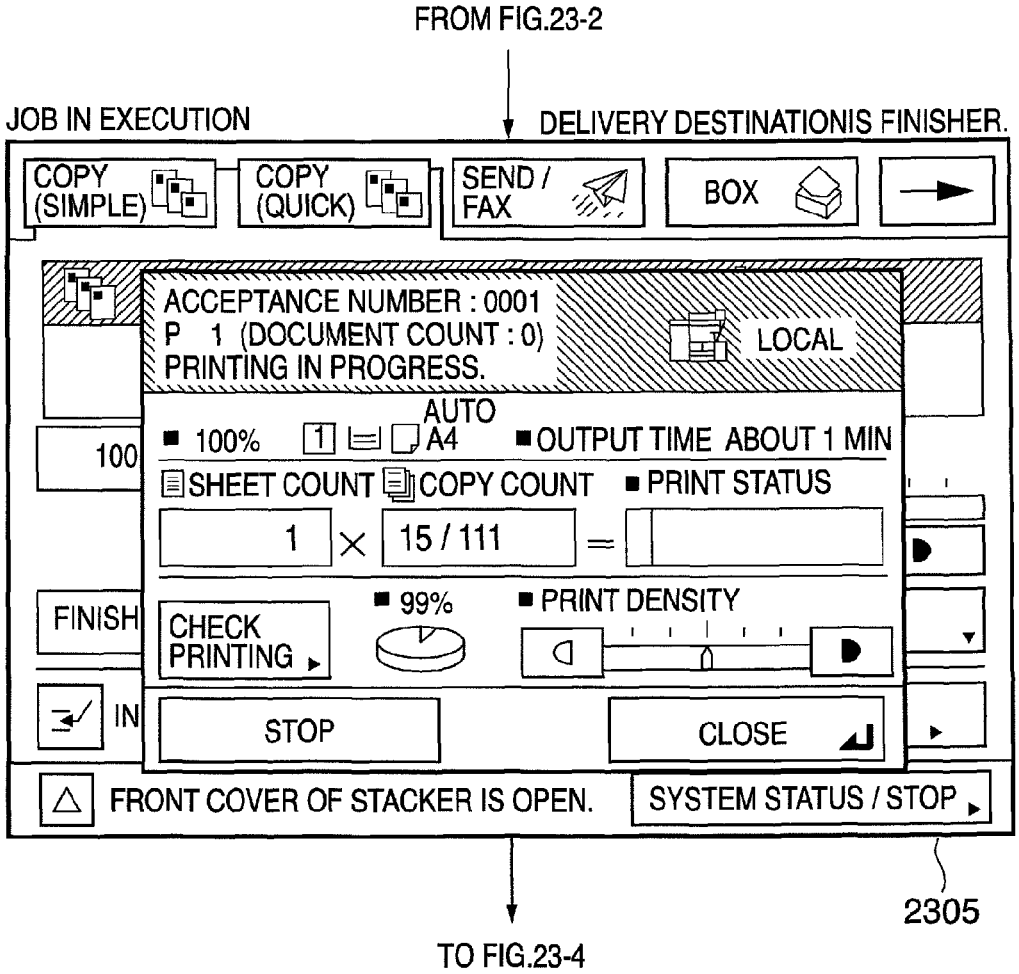
Figures 4, 23:
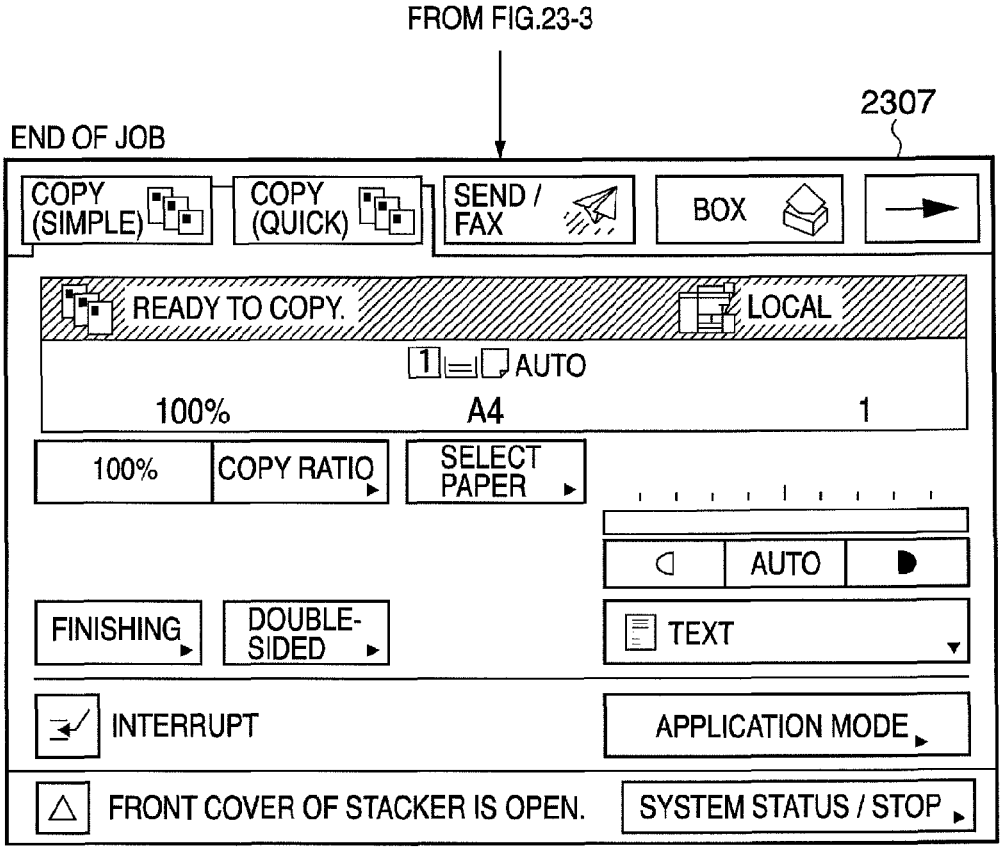
Figures 5, 23:
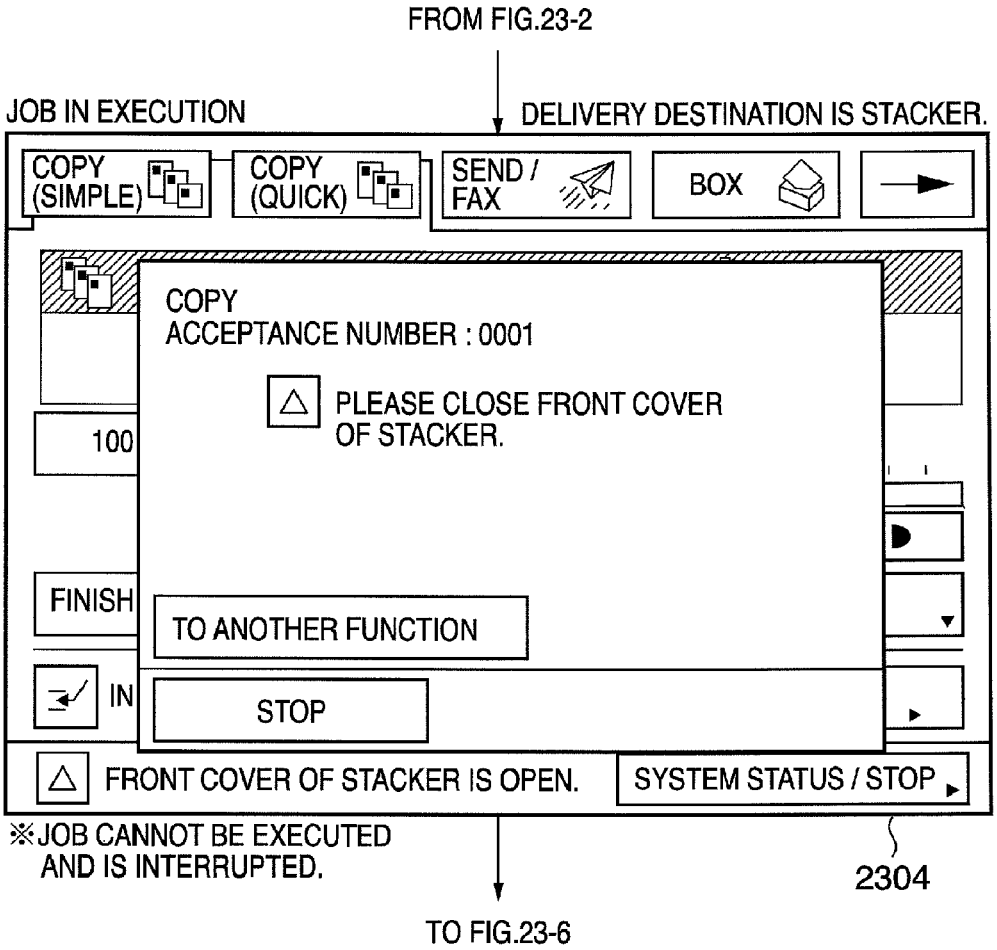
Figures 6, 23:
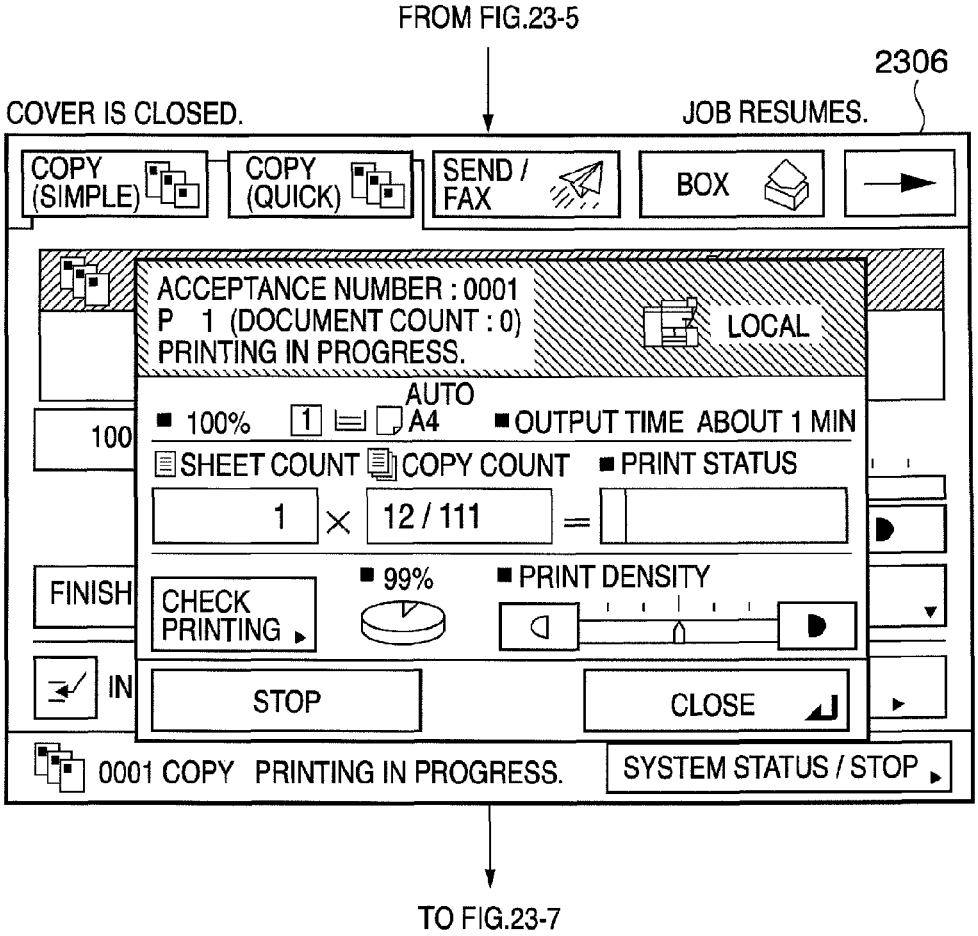
Figures 7, 23:
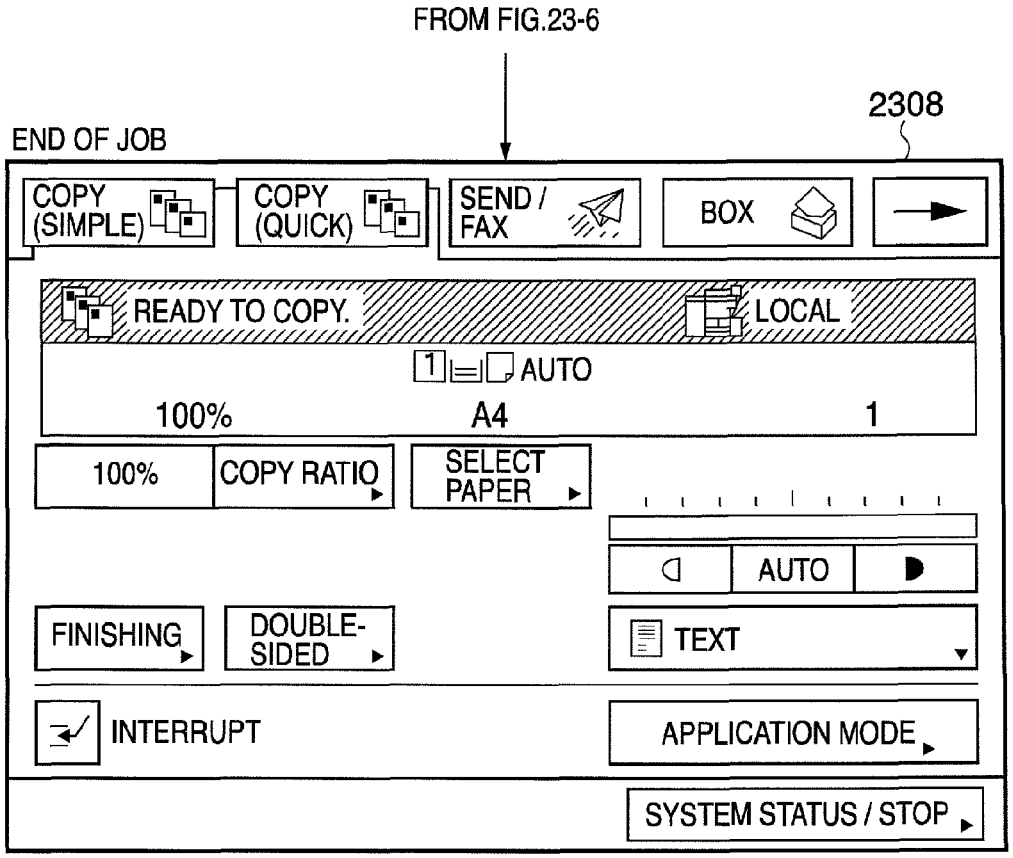

When the control unit 205 confirms that the printing device 100 is in the standby state and no cover is open, it causes the display unit 401 to display a window 2301 in FIG. 23-1. In this state, the control unit 205 permits input of a job. Input of a job in the embodiment means inputting a request (instruction) to process a job requiring the print process. If the operator opens the front cover of the large-volume stacker in this state, the large-volume stacker notifies the control unit 205 of information to this effect via an internal signal line. From this information, the control unit 205 confirms that the status of the front cover changes from the closed status to the open one. After the confirmation, the control unit 205 changes the display contents of the display unit 401 from the window 2301 to a window 2303. The control unit 205 controls to display a message that the front cover of the stacker is open, on the status line (lower portion of the window) in the display of the window 2303. The control unit 205 can accept the print process condition settings and print execution request of a new job from the operator via the window 2303 while keeping the message displayed. In this way, when the movable unit of an inline finisher is open, the control unit 205 inhibits the operation unit 204 from executing the full-screen cover-open display, unlike the window 2012 in FIG. 20-2.

The full-screen cover-open display notifies the operator of information on an open movable unit. In addition, the full-screen cover-open display inhibits (invalidates) acceptance of a request from the operator to set the process conditions of a job requiring the print process and execute the process of the job. For example, the control unit 205 causes the display unit 401 to show the full-screen cover-open display on the condition that the operator opens the movable unit of the printing device 100. The window 2012 in FIG. 20-2 is also an example of the full-screen cover-open display.

Referring back to the description of FIGS. 23-1 to 23-7, assume that the operator uses the operation unit 204 to input a new job whose printed material delivery destination is the delivery destination of the large-volume stacker, while the display unit 401 displays the window 2303 in FIG. 23-2. For example, this situation corresponds to a case in which the operator inputs, with the start key 503, the print execution request of a new job which designates the large-volume stacker by an input from the key 709 in FIG. 7.

In this case, the control unit 205 inhibits the printing device 100 from starting the print process of the job though the operator inputs the print execution request of the job by pressing the key 503. In this case, the control unit 205 inhibits execution of the print process of the job, and changes the display contents of the display unit 401 from the window 2303 to the window 2304.

The control unit 205 executes this control on the condition that the job to be processed requires a post-process by an inline finisher whose movable unit is open.

For example, the job to be processed requires the delivery destination of the large-volume stacker. The delivery destination of the job coincides with that of the inline finisher whose cover is currently open. Hence, the control unit 205 executes this control based on the determination result. In this case, the control unit 205 causes the display unit 401 to display the popup window shown in the window 2304 as the execution interrupt window of the job.

In this embodiment, when the operator inputs the print process request of a job requiring a post-process by an inline finisher having an open movable unit, the control unit 205 causes the display unit 401 to display a display window containing a message which prompts the operator to close the movable unit of the inline finisher associated with the process of the job. The popup window of the window 2304 contains job information "copy job, acceptance number 0001" which specifies the type and identification number of the job, together with guidance information "please close the front cover of the stacker". In this manner, the control unit 205 causes the UI unit to notify the operator of guidance information associated with an action to be taken by him to resume the process of a job requiring a post-process by an inline finisher having a currently open movable unit.

The embodiment uses expressions "interrupt of a job" and "resume of a job". This is because the job is a copy job requiring a document image data scan process and a storage process in the HD 209 prior to the start of the print process.

Even in a case that execution of the print process of the job is inhibited, like in this example, the control unit 205 causes the printing device 100 to complete the document scan operation and the like necessary for the job to be executed prior to the start of the print process. The control unit 205 controls the printing device 100 to stop (interrupt) the process of the job upon completion of all processes necessary before the start of the print process.

Since the control unit 205 executes this control for the printing device 100, the embodiment uses the expressions "interrupt of a job" and "resume of a job".

Referring back to the description of FIGS. 23-1 to 23-7, according to the embodiment, the control unit 205 controls a popup window to be displayed on the display unit 401, to notify the operator of information unique to a job which directly influences a job to be processed, like the display example of the window 2304.

For example, the control unit 205 causes the display unit 401 to display guidance information in the popup window so as to close a movable unit which influences the process of the job whose print process is inhibited, like the display example of the window 2304. However, the control unit 205 controls the display unit 401 not to display, in the popup window, information on a movable unit which does not influence the process of the job whose print process is inhibited, even if the movable unit is open. For example, even when the movable unit which does not influence the process of the job is open, the control unit 205 inhibits the display unit 401 from displaying guidance information in the popup window to close the movable unit.

The control unit 205 controls the display unit 401 to automatically display information on a movable unit to be displayed in the popup window and on the status line, without explicitly designating the display of the information by the operator from the operation unit 204. For example, according to the embodiment, the control unit 205 controls the display unit 401 to automatically display target movable unit information based on status information of a movable unit in the system 1000 and a change of the status. This point is common to all configurations disclosed in the embodiment.

Referring back to the description of FIGS. 23-1 to 23-7, according to the embodiment, even while displaying guidance information to close a movable unit which influences a job to be processed, the control unit 205 controls to display status information of an open movable unit on the status line as information discriminated from the guidance information.

For example, when a movable unit which influences a job to be processed is open, the control unit 205 controls to display, as status information on the status line, a message that the movable unit which influences the job is open.

According to the embodiment, even when a movable unit which does not influence a job to be processed is open, the control unit 205 controls to display, as status information on the status line, a message that the movable unit which does not influence the job is open.

In the example of the window 2304, the control unit 205 displays status information on the status line of the window to notify the operator that the front cover of the stacker is open even while the popup window displays guidance information to close the front cover. The operator can identify the guidance information as job information on a job to be processed. The operator can identify the status information as that of the system 1000.

In the embodiment, as long as a movable unit is in the open status, the control unit 205 displays status information on the status line regardless of whether the movable unit influences or does not influence the process of a target job. In the embodiment, the control unit 205 controls the display unit 401 to display, in the window, guidance information to close a movable unit associated with the process of the target job while keeping the status information displayed.

The popup window in the embodiment that can notify the operator of guidance information to close the movable unit of an inline finisher which influences a job to be processed also has a display key configured to allow the operator to input a specific instruction.

For example, the control unit 205 causes the display unit 401 to display a window having a "to another function" key and "stop" key together with guidance information to close the front cover of the large-volume stacker, as shown in the popup window of the window 2304.

Assume that the operator presses the "to another function" key in the popup window. In the case, while the process of a print start-inhibited job stands by (i.e., while the print start inhibition state of the job is maintained), the control unit 205 controls the system 1000 to execute the process of another job.

For example, in response to an input from the "to another function" key, the control unit 205 controls the operation unit 204 to erase the popup display of the window 2304 from the window and accept the process condition settings and print execution request of another job requiring the print process, other than the print start-inhibited job.

Assume that the operator presses the "stop" key in the popup window. In this case, the control unit 205 controls the system 1000 to stop (cancel) the process of the print start-inhibited job and execute the process of another job. For example, if the HD 209 has already stored print data of the print-inhibited job, the control unit 205 controls to erase the print data from the HD 209.

In this situation, the movable unit is open regardless of which of the "to another function" key and "stop" key in the popup window is pressed. Hence, the control unit 205 keeps displaying the status information on the status line to notify the operator that the movable unit is open.

For example, the control unit 205 controls to close the popup window and change the display contents of the display unit 401 to those of a window 2307 in response to the press of the "to another function" key or "stop" key in the popup window by the operator.

Assume that the operator, who has confirmed the popup display of the window 2304 while the window 2304 is displayed, closes the currently open front door of the large-volume stacker which is to execute a necessary for the print start-inhibited job. That is, the status of the front door changes from the open status to the closed one. In response to this, the control unit 205 permits the printer unit 203 to start the print process of the print-inhibited job. That is, the control unit 205 controls the system to resume the process of the print-inhibited job at this point.

When confirming the status of a movable unit or a change of the status, the control unit 205 acquires sensor information necessary for the confirmation from a related inline finisher via an internal signal line. According to the embodiment, the control unit 205 can confirm a change of the status of the movable unit of an inline finisher by this method.

The above-described popup window is closed when canceling the print-inhibited state of a job. Then, guidance information to close a movable unit which influences the process of the job is erased from the window. Instead of the popup window, the control unit 205 causes the display unit 401 to popup-display a job process status window capable of notifying the operator in real time of the progress of a job for which inhibition of printing is canceled. The control unit 205 executes this display control for the display unit 401.

For example, when the operator closes the front door, the control unit 205 causes the printing device 100 to start the print process of the job. At the same time, the control unit 205 controls the display unit 401 to close the popup window of the window 2304 and automatically display the popup window of a window 2306.

Upon completion of executing all the processes of the job by the system 1000, the control unit 205 changes the display contents of the display unit 401 from the window 2306 to a window 2308. That is, the control unit 205 sets the same standby state as the display state of the window 2301, and allows acceptance of the process execution request of another job.

An example of the control executed by the control unit 205 in the embodiment including a series of display control operations: window 2303→window 2304→window 2306→window 2308 has been described.

The control unit 205 executes this control when confirming that the movable unit of an inline finisher necessary for the post-process of a target job is open before the start of the print process of the job.

This control is also a control example executed by the control unit 205 when the status of the movable unit of an inline finisher necessary for the post-process of a target job changes from the closed status to the open one while the printer unit 203 prints the job. This point is common to all control examples to be illustrated in FIGS. 24-1 to 24-8 and 25-1 to 25-6. This will be illustrated in FIGS. 23-1 to 23-7.

Assume that at least two movable units, i.e., the movable units of the printing device 100 and large-volume stacker are in the closed status. In this situation, assume that the operator uses the key 503 to input the print execution request of a job requiring a post-process by the large-volume stacker. Then, the control unit 205 causes the printer unit 203 to start the print process of the job. Also, assume that printing of the job is in progress. At this time, the control unit 205 causes the display unit 401 to display a popup window (e.g., the popup window of the window 2202 in FIG. 22-2) representing the progress of the print process of the job.

Assume that the operator opens the movable unit of the large-volume stacker serving as the inline finisher necessary for the post-process of the job while the printer unit 203 executes the print process of the job. This means that the status of the movable unit of the large-volume stacker changes from the open status to the closed one while the printer unit 203 executes the print process of the job though the movable unit of the printing device 100 remains in the closed status.

When confirming this situation, the control unit 205 controls the printer unit 203 to immediately interrupt the print process of the job in progress by the printer unit 203. After the interruption of printing, the control unit 205 makes the job wait for printing. The control unit 205 also performs display control in synchronism with job execution control. For example, if the control unit 205 confirms this situation, it controls the display unit 401 to immediately end the display of the popup window of the window 2202 representing progress information of the print process of the job. Instead, the control unit 205 controls the display unit 401 to immediately display the popup window of the window 2304 capable of notifying the operator of guidance information to close the movable unit of the large-volume stacker which influences the process of the job.

Control after the display of the window 2304 is the same as the above-described one except for the following operation, and a detailed description thereof will be omitted.

For example, the control unit 205 causes the printer unit 203 to resume the print process of the interrupted job in response to a change of the status of the movable unit of the large-volume stacker from the open status to the closed one.

In this case, the print process progresses immediately before printing of the job is interrupted. In resuming the process of the job, the control unit 205 causes the printer unit 203 to resume the print process from part of the job that has not been processed immediately before the interruption of the job.

The control executed by the control unit 205 in response to a change of the status of the movable unit of an inline finisher necessary for the post-process of a target job from the closed status to the open one is also applied before the start of printing the job or during printing of the job. This point is also common to control examples to be described below.

The above-described control including a series of display control operations: window 2301→window 2303→window 2304→window 2306→window 2308 falls within an example of a configuration in which the control unit 205 executes control of the following constituent feature (A) in the embodiment.

(A) When a job to be processed requires a post-process by an inline finisher having an open movable unit, it is inhibited to execute the print process of the job without notifying the operator via the UI unit of guidance information to close the movable unit.

In control of constituent feature (A), the print process of the job is executed on the condition that the operator is notified of the guidance information and closes the movable unit (the status of the movable unit changes from the open status to the closed one).

According to the embodiment, the control unit 205 executes not only control of constituent feature (A) but also control of the following constituent feature (B).

(B) When a job to be processed does not require any post-process by an inline finisher having an open movable unit, it is permitted to execute the print process of the job without notifying the operator via the UI unit of guidance information to close the movable unit.

In control of constituent feature (B), it is permitted to start the print process of the job requiring no post-process by the inline finisher even while the movable unit remains open in the system 1000.

Regardless of which of (B) and (A) is executed, the control unit 205 allows the UI unit to notify the operator of status information that a movable unit is open.

A control example in a case that the control unit 205 inhibits a change from the window 2303 to the window 2304, but changes the window 2303 to a window 2305 will be explained as a control example contained in control of constituent feature (B).

When the window 2303 is displayed, the control unit 205 permits acceptance of a new job though the movable unit of the large-volume stacker is open. The type of job for which execution of the print process is permitted in response to a print execution request input by the operator via the window 2303 is a job requiring no post-process by the large-volume stacker.

Assume that the operator uses the operation unit 204 to input the print execution request of a job requiring the delivery destination of the saddle stitching device as a printed material delivery destination while the control unit 205 causes the display unit 401 to display the window 2303. This corresponds to a case in which the operator sets a post-process by the saddle stitching device for a job to be processed via a window 700 in FIG. 7, and presses the key 503. In this way, assume that the operator inputs a new job for which the saddle stitching device (described as a finisher in FIGS. 23-1 to 23-7) is designated as a printed material delivery destination by an operator setting while the movable unit of the large-volume stacker is open.

In this case, the control unit 205 permits the printing device 100 to execute the print process of a job requiring the delivery destination of the saddle stitching device even while the movable unit of the large-volume stacker is open. When the operator inputs the print execution request of the job via the display of the window 2303, the control unit 205 causes the printer unit 203 to start the print process of the job. In synchronism with this, the control unit 205 changes the display contents of the display unit 401 from those of the window 2303 to those of the window 2305.

In the display of the window 2305, the control unit 205 controls the display unit to popup-display a job process status window capable of notifying the operator in real time of the process status of the job for which execution of printing is permitted. In addition, the control unit 205 displays status information on the status line of the window 2305 to represent that the movable unit of the large-volume stacker is open, while continuing to notify the operator of the process status of the job in the popup window in real time.

In the display example of the window 2305, the control unit 205 controls the display unit 401 to display a message on the status line to represent that the front cover of the large-volume stacker is open, while continuing to notify the operator of the process status of the job in the popup window.

In response to the end of all the processes of the job by the system 1000, the control unit 205 controls the display unit 401 to end the popup display of the job process status window and return the display contents of the display unit 401 to the display in the standby state. In this example, the movable unit of the large-volume stacker remains open. Thus, the control unit 205 controls the display unit 401 to change its display contents to those of the window 2307 in the same state as the window 2303. Further, the control unit 205 controls the operation unit 204 to accept the print process condition settings and print execution request of a new job from the operator via the window 2307.

The control unit 205 controls the display unit 401 to erase information displayed on the status line of the window 2307 from the window on the condition that the operator closes the movable unit of the large-volume stacker in the system 1000.

In a series of control operations: window 2303→window 2305→window 2307, the control unit 205 controls the system 1000 to execute the print process of the job without causing the display unit 401 to display guidance information to prompt the operator to close the front cover of the large-volume stacker.

For example, in this case, the control unit 205 controls the display unit 401 to inhibit display of the popup window of the window 2304 which is displayed in control of a job requiring the delivery destination of the large-volume stacker.

The system 1000 can run as continuously as possible without stopping the operation in an environment where even unnecessarily notification to the operator of guidance information to prompt him to close the cover of the stacker though he does not want to be notified is suppressed.

As described above, the configuration enables the system 1000 to run as continuously as possible even while a movable unit is open. The configuration can also keep status information displayed on the status line to represent that the movable unit is open.

As a result, the system 1000 can implement both high productivity and high operability without any new problems which influence operability by giving priority to control that is capable of processing a plurality of jobs at high productivity.

An application of a control example contained in the control example of constituent feature (B) will be explained with reference to FIGS. 24-1 to 24-8.

Figures 1, 24:
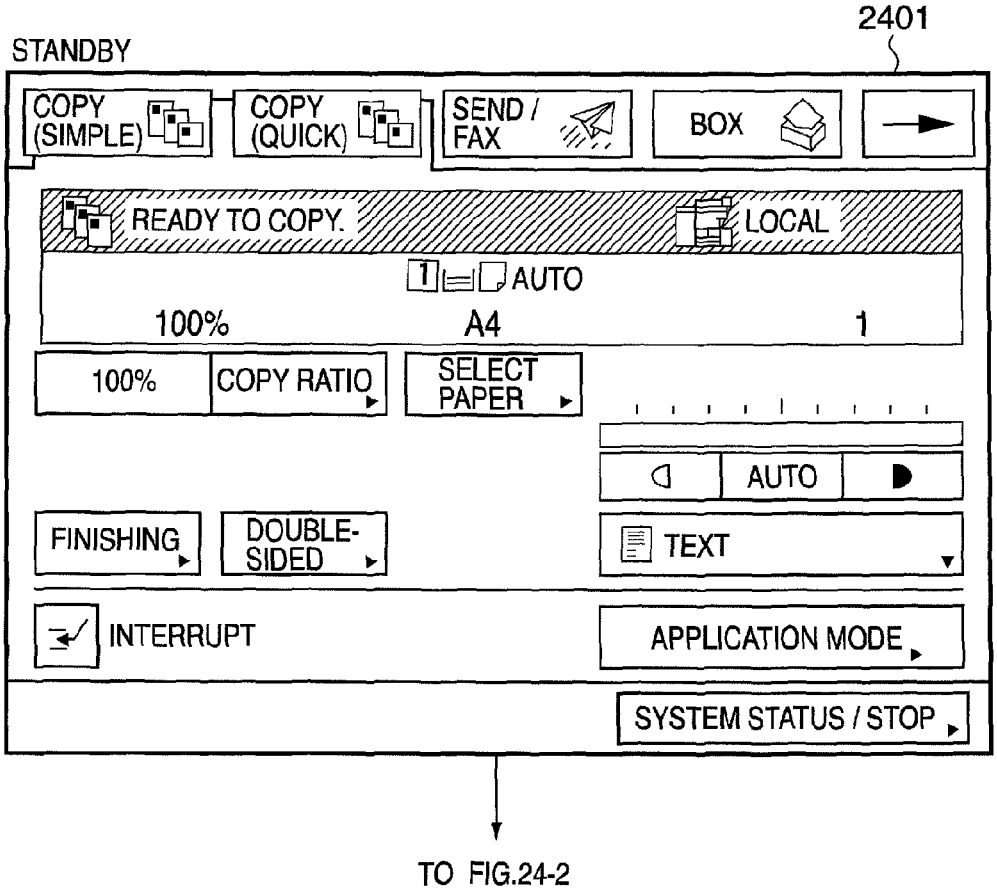
Figures 2, 24:
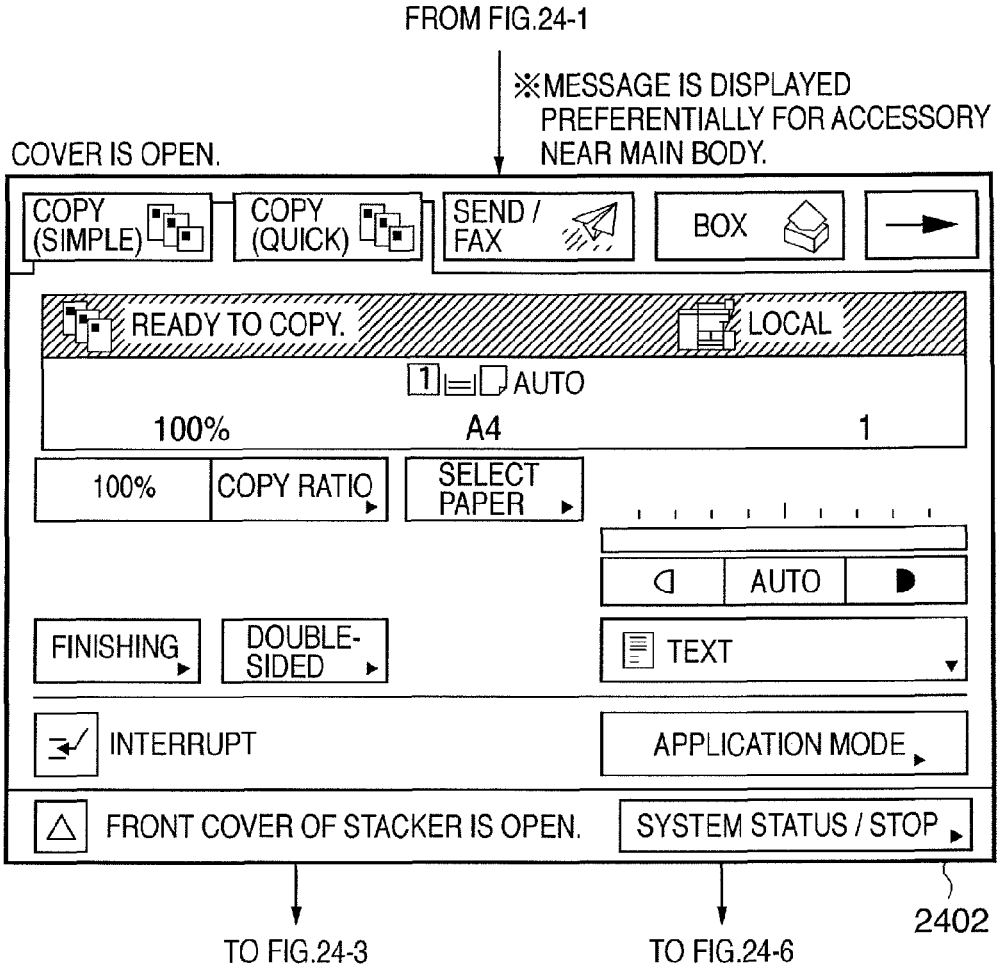
Figures 3, 24:
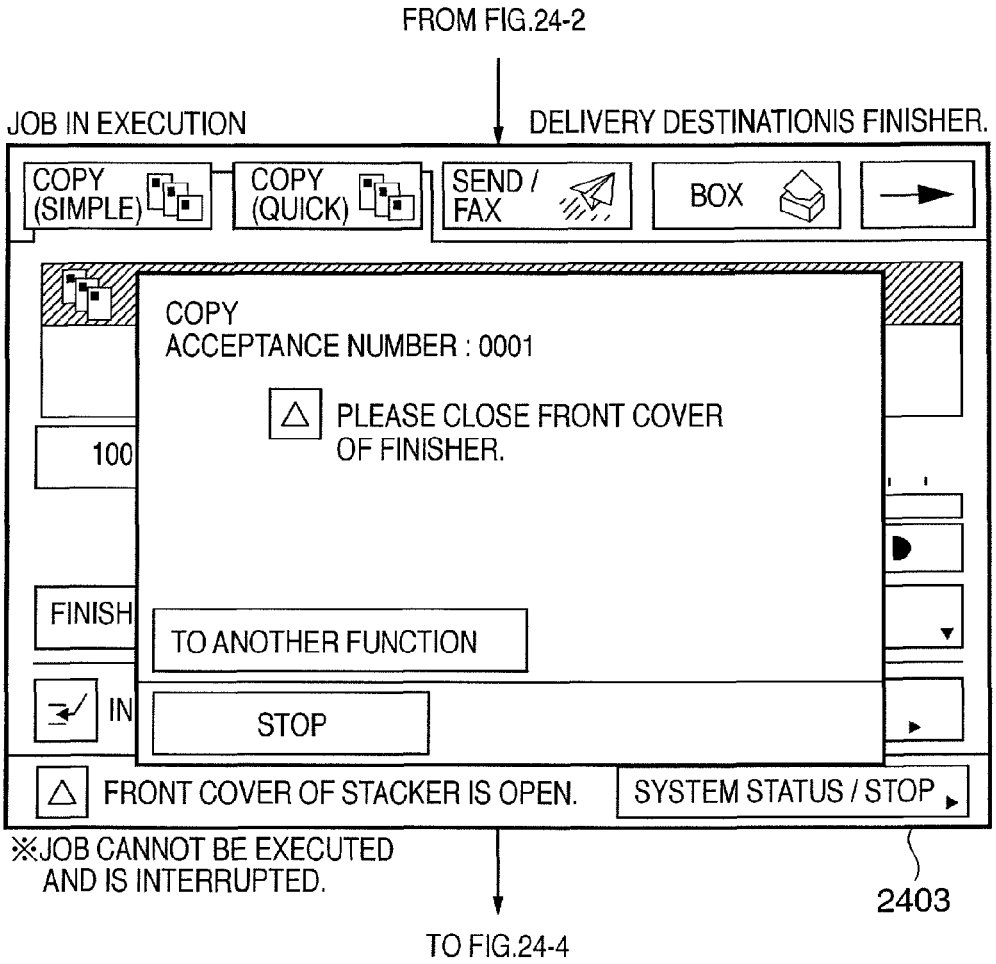
Figures 4, 24:
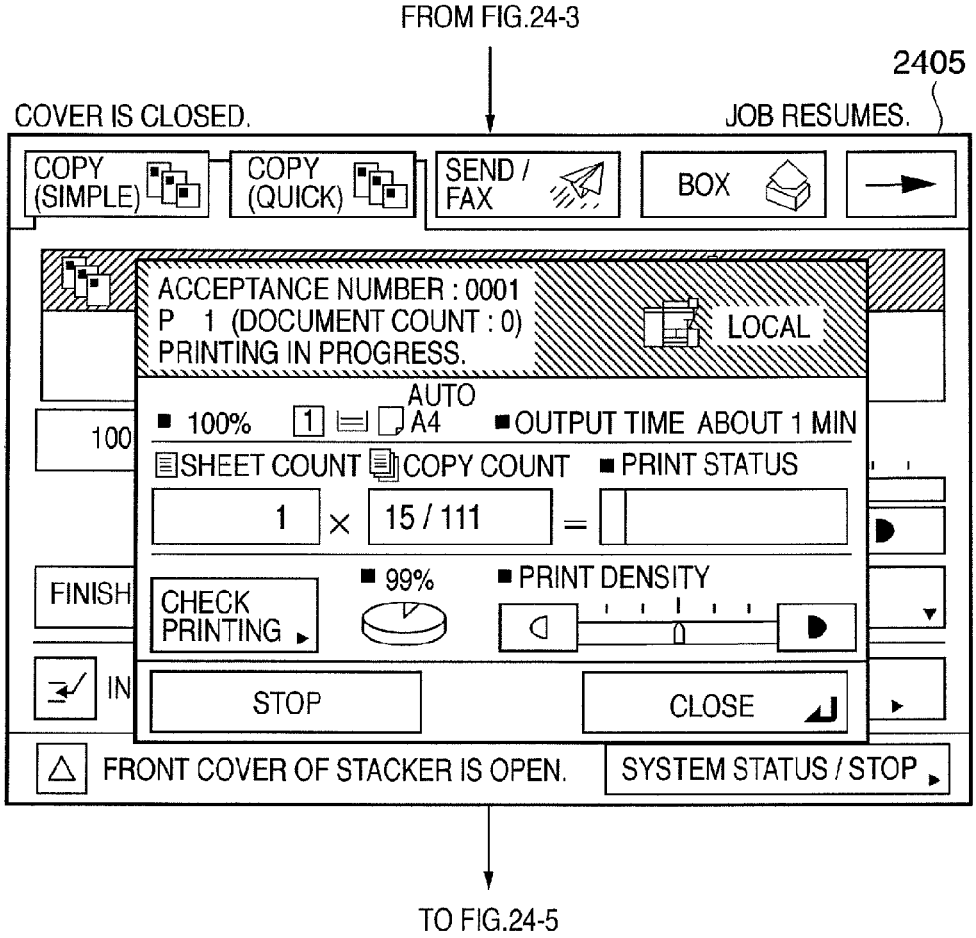
Figures 5, 24:
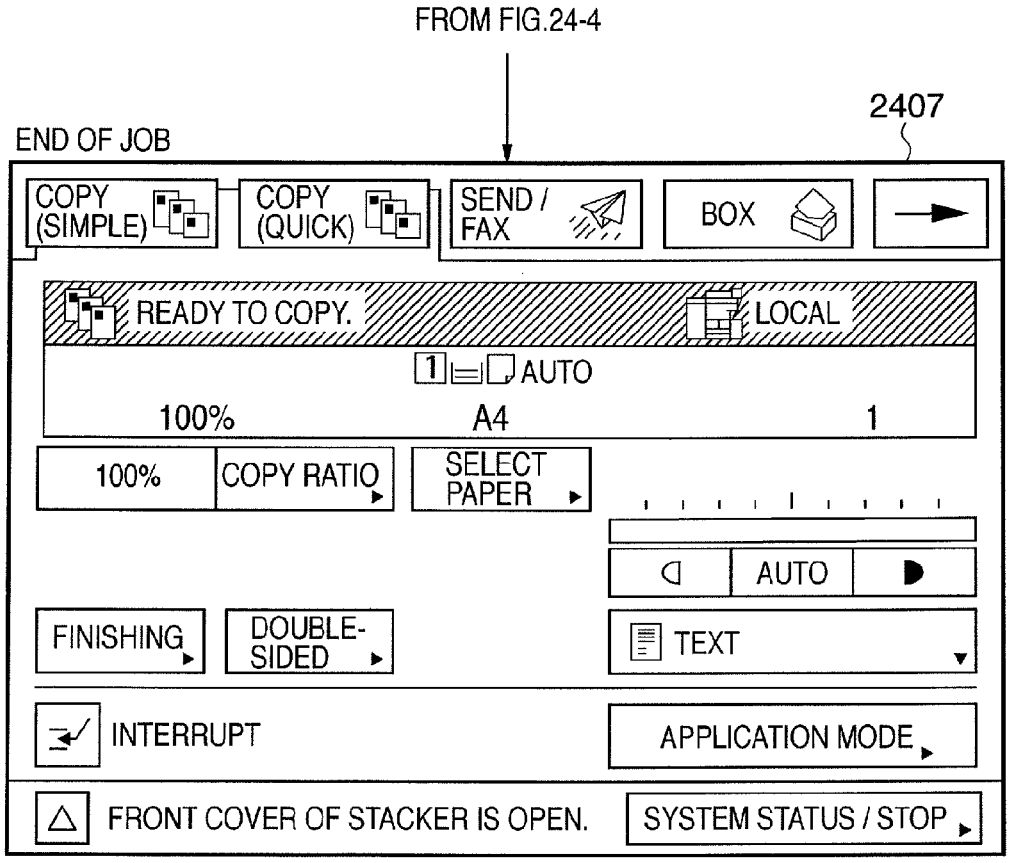
Figures 6, 24:
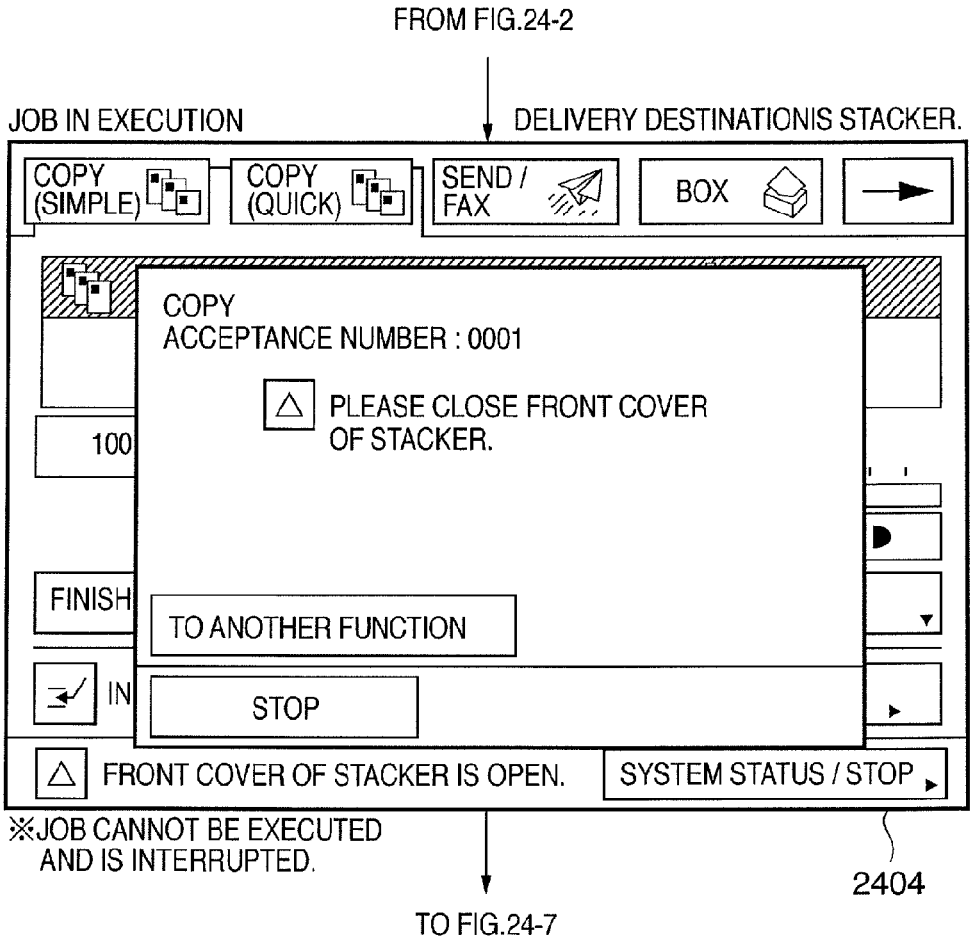
Figures 7, 24:
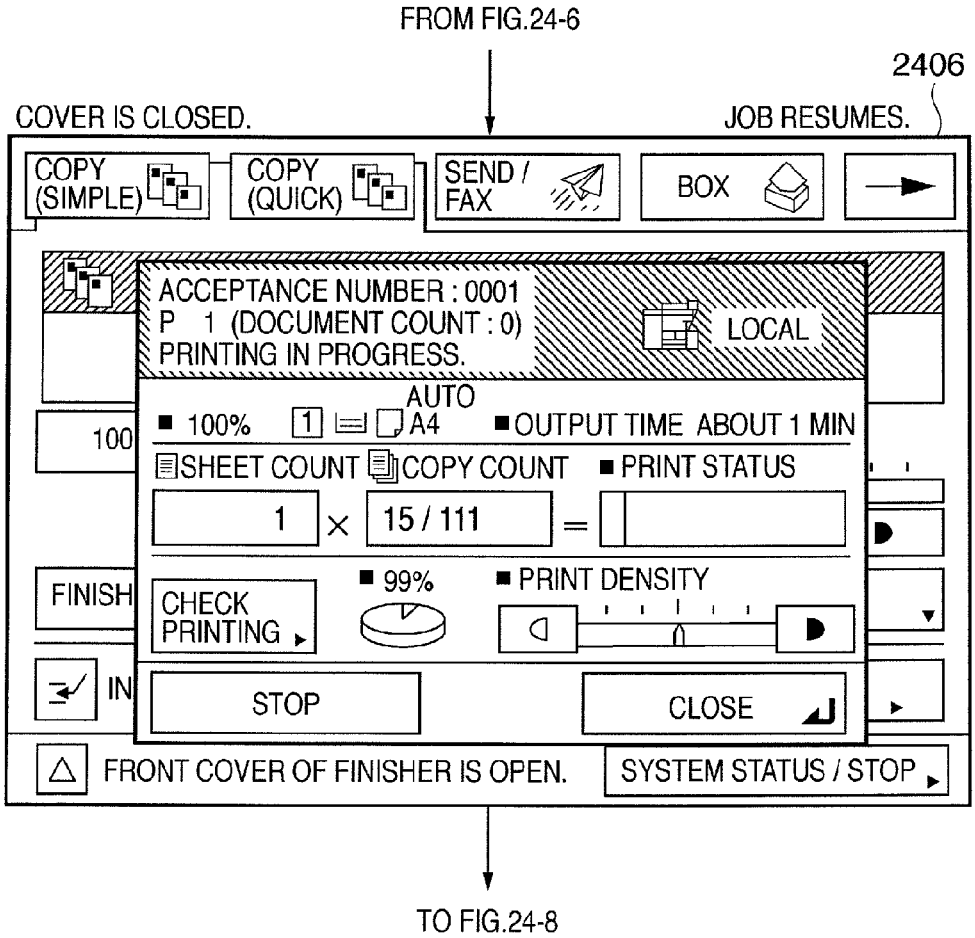
Figures 8, 24:
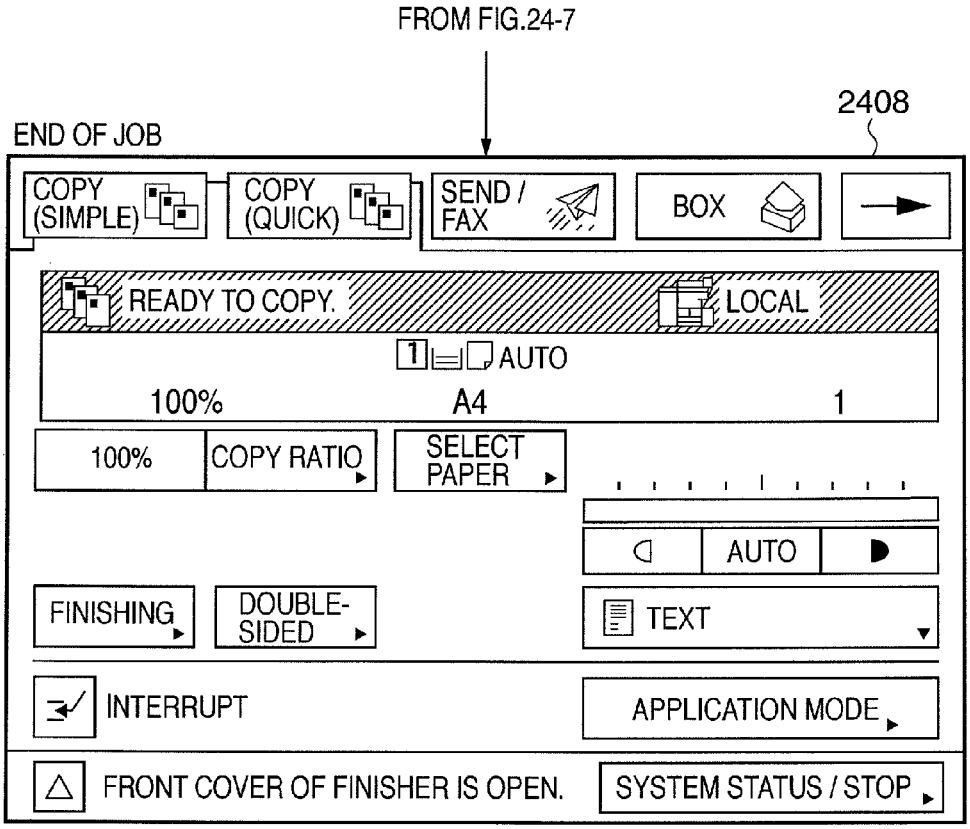

FIGS. 24-1 to 24-8 show control examples executed by the control unit 205 in a case that a plurality of movable units in a plurality of inline finishers in the system 1000 are open.

The control unit 205 causes the display unit 401 to display a window 2401 on the condition that no door is open and the system 1000 stands by. The control unit 205 permits the operator to input a new job while notifying him of information representing the standby state via the window 2401.

Assume that the operator opens the front covers of the large-volume stacker and saddle stitching device in the system 1000 while the window 2401 is displayed. That is, the statuses of these two movable units change from the closed status to the open one. In response to this, the control unit 205 controls the display unit 401 to display, on the status line, status information capable of notifying the operator that these movable units are open. In this example, these pieces of information are not displayed at once on the status line. First, the control unit 205 controls the display unit 401 to display a window 2402. The control unit 205 causes the display unit 401 to display a message on the status line of the window 2402 to represent that the front cover of the large-volume stacker is open. This is an example of a configuration in which the control unit 205 causes the display unit 401 to display pieces of status information representing the open status of the movable units in a priority order determined based on system configuration information of the system 1000 that is registered in the HD 209.

Assume that the system 1000 has the system configuration in FIG. 8A. In this system configuration, not the saddle stitching device (finisher) but the large-volume stacker is close to the printing device 100. Based on this system configuration information, the control unit 205 causes the display unit 401 to display status information of the large-volume stacker preferentially to that of the movable unit of the saddle stitching device. When displaying the window 2402, the control unit 205 changes the display contents of the display unit 401 to those of the window 2402 though both the two movable units are open. That is, the control unit 205 causes the display unit 401 to display a message representing the open status of the front cover of the stacker on the status line. A configuration is also possible in which the control unit 205 controls to toggle-display two pieces of status information representing the open status of the two movable units at predetermined intervals.

As described above, assume that the two movable units of the large-volume stacker and saddle stitching device are open in the system 1000, and the display unit 401 displays the window 2402. In this situation, the control unit 205 waits for input of a new job to be printed (input of a print execution request) via the window 2402.

Assume that a job for which the operator sets print process conditions via the window 2402 and inputs a print execution request by pressing the start key 503 requires discharge of a printed material to the delivery destination of the large-volume stacker. This job will be referred to as a job 24A. When the control unit 205 makes a determination corresponding to this case, it interrupts execution of the job 24A in the system 1000, and inhibits the printer unit 203 from executing the print process of the job 24A. Also in this case, the control unit 205 causes the display unit 401 to display guidance information to close the movable unit of an inline finisher necessary for the job 24A. In this example, the control unit 205 controls the display unit 401 to change its display contents from those of the window 2402 to those of a window 2404. The window 2402 displays a job execution interrupt popup window ("please close the front cover of the stacker.") because the delivery destination of the job 24A coincides with the position of the open cover.

Assume that the control unit 205 confirms that the operator has closed the front cover of the large-volume stacker necessary for the interrupted (print-inhibited) job 24A in the system 1000 while the display unit 401 displays the window 2404. Also, assume that the movable unit of the saddle stitching device is not closed but remains open.

This case also corresponds to a case in which the status of the movable unit of the large-volume stacker necessary for the job 24A changes from the open status to the closed one.

Hence, when confirming a change of the status of the movable unit of the stacker, the control unit 205 permits the printing device 100 to start the print process of the job 24A even while the movable unit of the saddle stitching device remains open. Then, the control unit 205 causes the system 1000 to resume the job 24A, and allows the printer unit 203 to execute the print process of the job 24A. At the same time, the control unit 205 causes the display unit 401 to end the display of the guidance information to close the movable unit of the large-volume stacker, and instead to display the progress of the job 24A. In this example, the control unit 205 controls the display unit 401 to change its display contents from those of the window 2404 to those of a window 2406.

The display of the window 2406 does not show a popup window (popup window displayed in the window 2404) containing guidance information to prompt the operator to close the movable unit of the large-volume stacker. Instead, the control unit 205 causes the display unit 401 to popup-display a job process status window capable of notifying the operator in real time of the progress of the job 24A in the system 1000 for which the control unit 205 cancels inhibition of printing.

The control unit 205 has already confirmed that the movable unit of the large-volume stacker has been closed at this time. Thus, the control unit 205 causes the display unit 401 to erase status information of the movable unit from the status line in the display of the window 2406.

Even at this time, however, the control unit 205 has not confirmed a change of the status of the movable unit of the saddle stitching device not necessary for the process of the job 24A. That is, the movable unit of the saddle stitching device is still open at this time.

For this reason, while the display of the window 2406 keeps notifying the operator of the progress of the job 24A in real time (the job process progress window remains valid), status information of the movable unit of the saddle stitching device not necessary for the job is displayed on the status line. The control unit 205 causes the display unit 401 to display a message on the status line of the window 2406 to represent that the front cover of the saddle stitching device (described as a finisher in FIG. 24-7) is open.

In response to the end of executing all processes for the job 24A in the system 1000 while the window 2406 is displayed, the control unit 205 controls the system 1000 to return to the standby state. In response to the end of the job 24A, the control unit 205 also changes the display contents of the display unit 401 from the window 2406 to a window 2408.

The system 1000 returns to the standby state at the end of the process of the job 24A, but the movable unit of the saddle stitching device remains open. Hence, the control unit 205 allows acceptance of the print process condition settings and print execution request of a new job other than the job 24A via the display of the window 2408. Also, the control unit 205 causes the display unit 401 to display status information on the status line to represent that the movable unit of the saddle stitching device is open. The message "the front cover of the finisher is open." on the status line of the window 2408 means that the movable unit of the saddle stitching device is open. The control unit 205 controls the display unit 401 to erase information displayed on the status line of the window 2408 from the window on the condition that the operator closes the movable unit of the saddle stitching device.

A control example executed by the control unit 205 in a case that the operator designates the saddle stitching device (finisher) as a delivery destination and inputs a job while the window 2402 is displayed will be explained.

Assume that a job newly input by an operator via the window 2402 while the two movable units are open requires an inline finisher different from that of the job 24A. For example, this job requires discharge of a printed material to the delivery destination of the saddle stitching device. This job will be referred to as a job 24B.

Also when the control unit 205 makes a determination corresponding to this case, it interrupts execution of the job 24B in the system 1000, and inhibits the printer unit 203 from executing the print process of the job 24B. Also in this case, the control unit 205 causes the display unit 401 to display guidance information to close the movable unit of an inline finisher necessary for the job 248.

Also in this case, both the movable units of the large-volume stacker and saddle stitching device are open. In other words, the situation upon accepting the print execution request of the job 24B is the same as that upon accepting the print execution request of the job 24A. However, the job 24B to be processed in this case utilizes the delivery destination of not the large-volume stacker but the saddle stitching device.

When the control unit 205 makes a determination corresponding to this case, it inhibits a change of the display contents of the display unit 401 from the window 2402 to the window 2404, but changes the window 2402 to the window 2403. In the display of the window 2403, guidance information to prompt the operator to close the movable unit of the saddle stitching device necessary for the post-process of the job 24B is popup-displayed as job information of the job 24B.

Status information to notify the operator that the movable unit of the large-volume stacker not used for the post-process of the job 24B is open is displayed as the status of the system 1000 on the status line in the display of the window 2403. That is, status information representing the open status of the movable unit of the large-volume stacker is displayed on the status line preferentially to status information representing the open status of the movable unit of the saddle stitching device.

This is display control executed by the control unit 205 on the condition that the system 1000 has the system configuration shown in FIG. 8A and a device closer to the printing device 100 among the two inline finishers is not the saddle stitching device but the large-volume stacker.

In the case that the job to be processed that is accepted while the two movable units are open is not the job 24A but the job 24B, the control unit 205 causes the display unit 401 to display the window 2403 under the above display control.

In the display example of the window 2403, a message that the front cover of the stacker is open is displayed on the status line. To the contrary, a message ("please close the front cover of the finishing." in FIG. 24-3) to prompt the operator to close the front cover of the saddle stitching device serving as the delivery destination of the job 24B is displayed in the popup window representing the interrupt of the job 24B in the window 2403. In this fashion, the control unit 205 independently controls the display of movable unit information serving as status information of the system 1000, and the display of movable unit information serving as guidance information on a job.

Referring back to the description of the control example of the job 24B, assume that the control unit 205 confirms that the operator has closed the front cover of the saddle stitching device necessary for the interrupted (print-inhibited) job 24B in the system 1000 while the display unit 401 displays the window 2403. Also, assume that the movable unit of the large-volume stacker is not closed but remains open.

This case also corresponds to a case in which the status of the movable unit of the saddle stitching device necessary for the job 24B changes from the open status to the closed one.

Hence, when confirming a change of the status of the movable unit of the saddle stitching device, the control unit 205 permits the printing device 100 to start the print process of the job 24B even while the movable unit of the large-volume stacker remains open. Then, the control unit 205 causes the system 1000 to resume the job 24B, and allows the printer unit 203 to execute the print process of the job 24B. At the same time, the control unit 205 causes the display unit 401 to end the display of the guidance information to close the movable unit of the saddle stitching device, and instead to display the progress of the job 24B. In this example, the control unit 205 controls the display unit 401 to change its display contents from those of the window 2403 to those of a window 2405.

The display of the window 2405 does not show a popup window (popup window displayed in the window 2403) containing guidance information to prompt the operator to close the movable unit of the saddle stitching device. Instead, the control unit 205 causes the display unit 401 to popup-display a job process status window capable of notifying the operator in real time of the progress of the job 24B in the system 1000 for which the control unit 205 cancels inhibition of printing.

Even at this time, the control unit 205 has not confirmed a change of the status of the movable unit of the large-volume stacker not necessary for the process of the job 24B. That is, the movable unit of the large-volume stacker is still open at this time.

For this reason, while the display of the window 2405 keeps notifying the operator of the progress of the job 24B in real time (the job process progress window remains valid), status information of the movable unit of the large-volume stacker not necessary for the job is displayed on the status line. The control unit 205 causes the display unit 401 to display a message on the status line of the window 2405 to represent that the front cover of the large-volume stacker is open.

In response to the end of executing all processes for the job 24B in the system 1000 while the window 2405 is displayed, the control unit 205 controls the system 1000 to return to the standby state. In response to the end of the job 24B, the control unit 205 also changes the display contents of the display unit 401 from the window 2405 to a window 2407.

The system 1000 returns to the standby state at the end of the process of the job 24B, but the movable unit of the large-volume stacker remains open. Hence, the control unit 205 allows acceptance of the print process condition settings and print execution request of a new job other than the job 24B via the display of the window 2407. Also, the control unit 205 causes the display unit 401 to display status information on the status line to represent that the movable unit of the large-volume stacker is open. The control unit 205 controls the display unit 401 to erase information displayed on the status line of the window 2407 from the window on the condition that the operator closes the movable unit of the large-volume stacker.

Cover-open display control and job interrupt/resume control executed by the control unit 205 when a job is input while the covers of two sheet processing devices are open in the system 1000 have been described.

An example of display control and an example of job control which are executed by the control unit 205 when the covers of the three sheet processing devices, i.e., large-volume stacker, glue binding device, and saddle stitching device (finisher) are open will be described with reference to FIGS. 25-1 to 25-6. The "case binding device" shown in FIGS. 25-1 to 25-6 corresponds to the glue binding device in FIG. 8A. Both the control examples illustrated in FIGS. 24-1 to 24-8 and 25-1 to 25-6 are executed on the premise that the control unit 205 confirms that the system 1000 has the system configuration shown in FIGS. 8A and 8B.

Figures 1, 25:
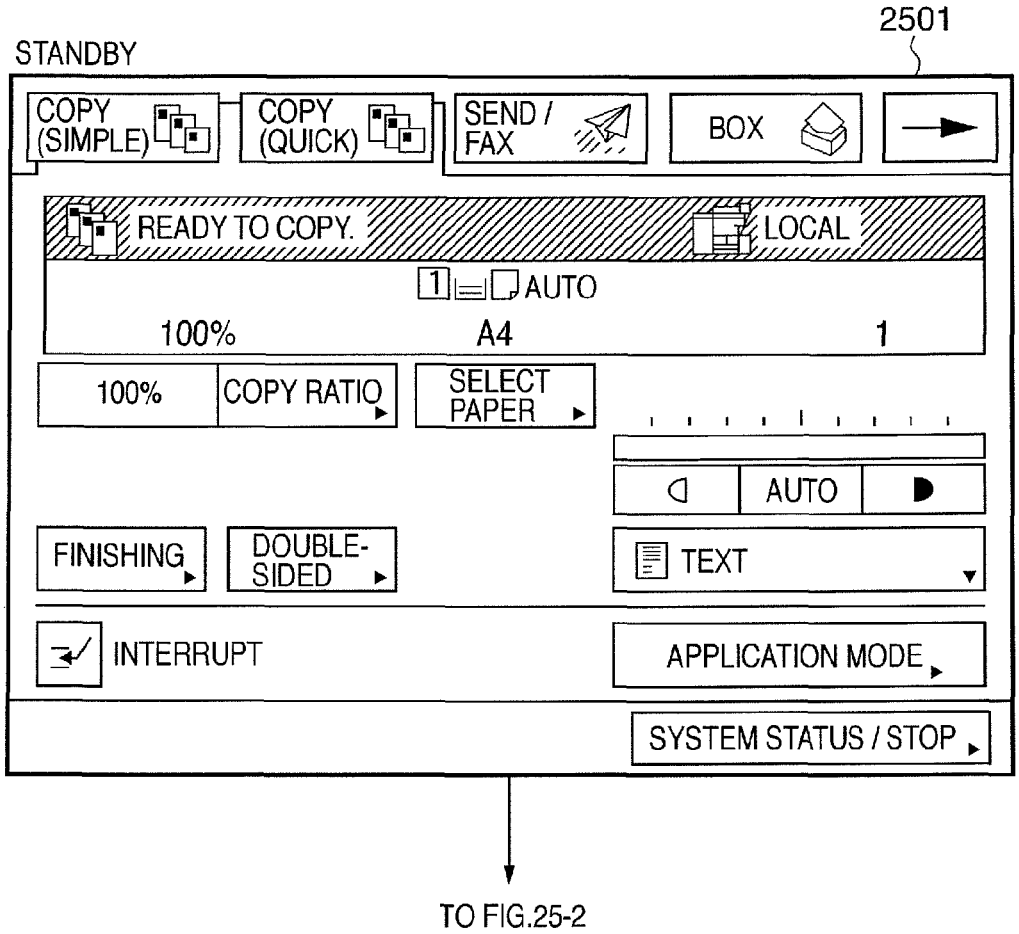
Figures 2, 25:
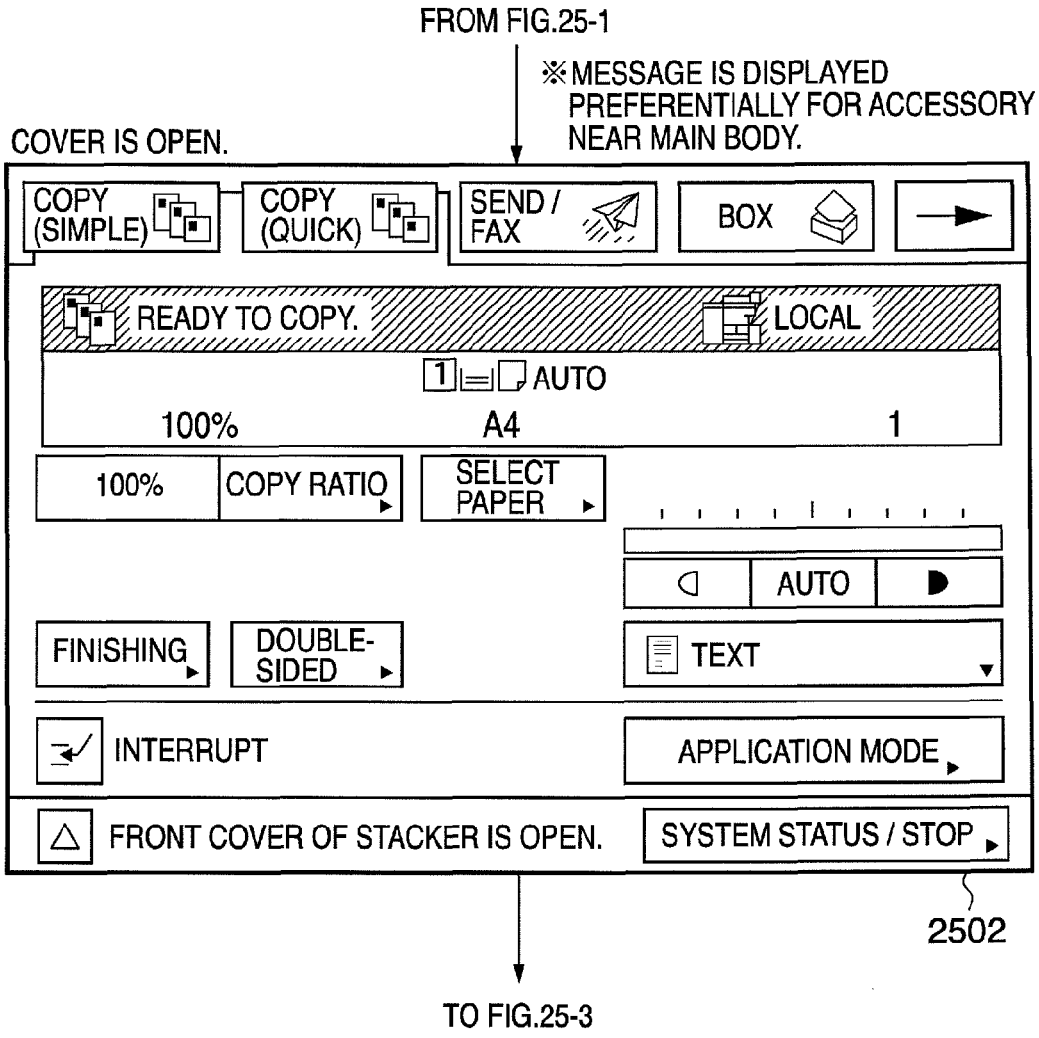
Figures 3, 25:
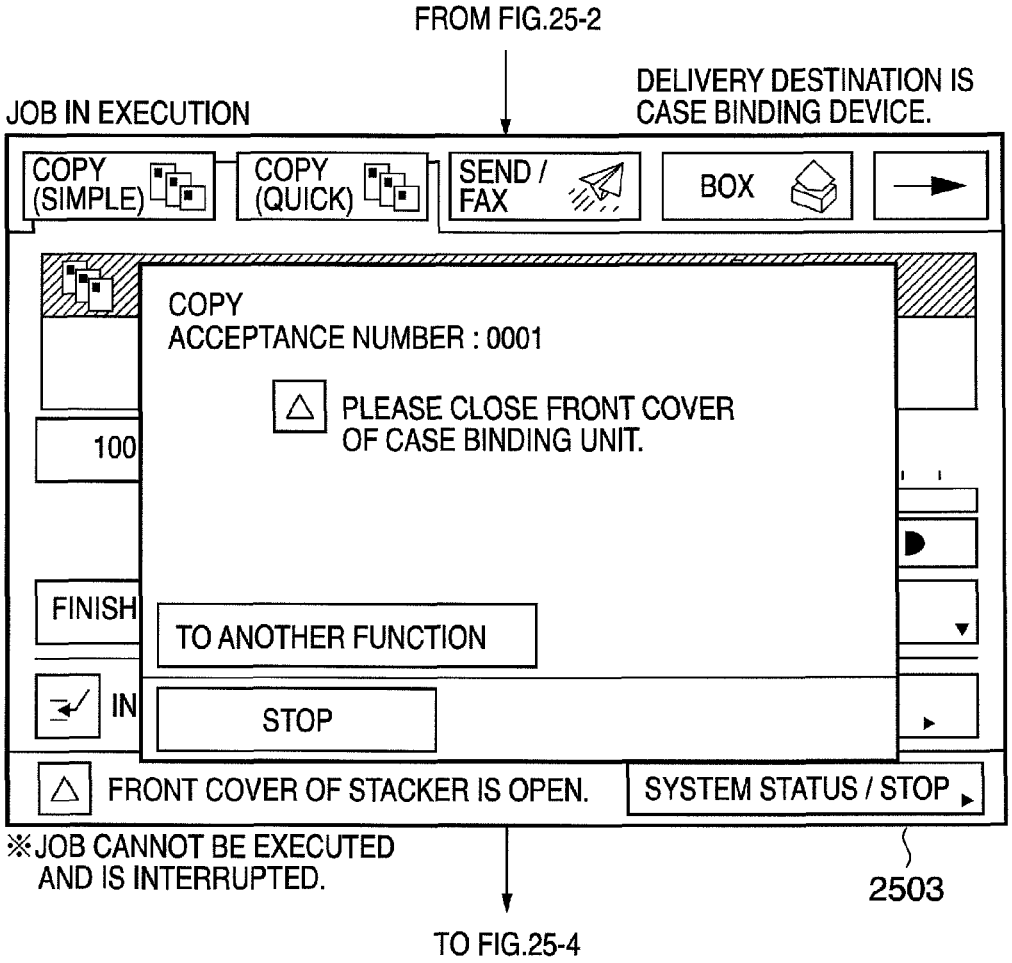
Figures 4, 25:
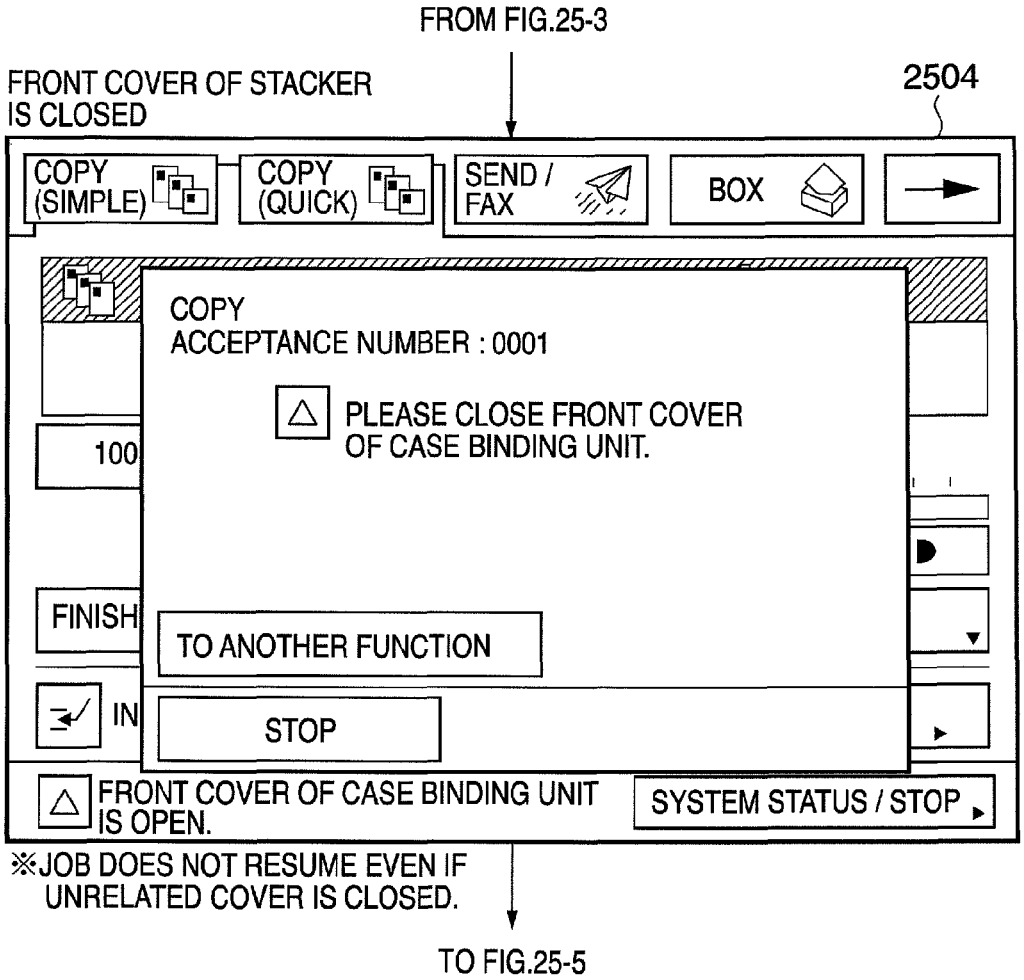
Figures 5, 25:
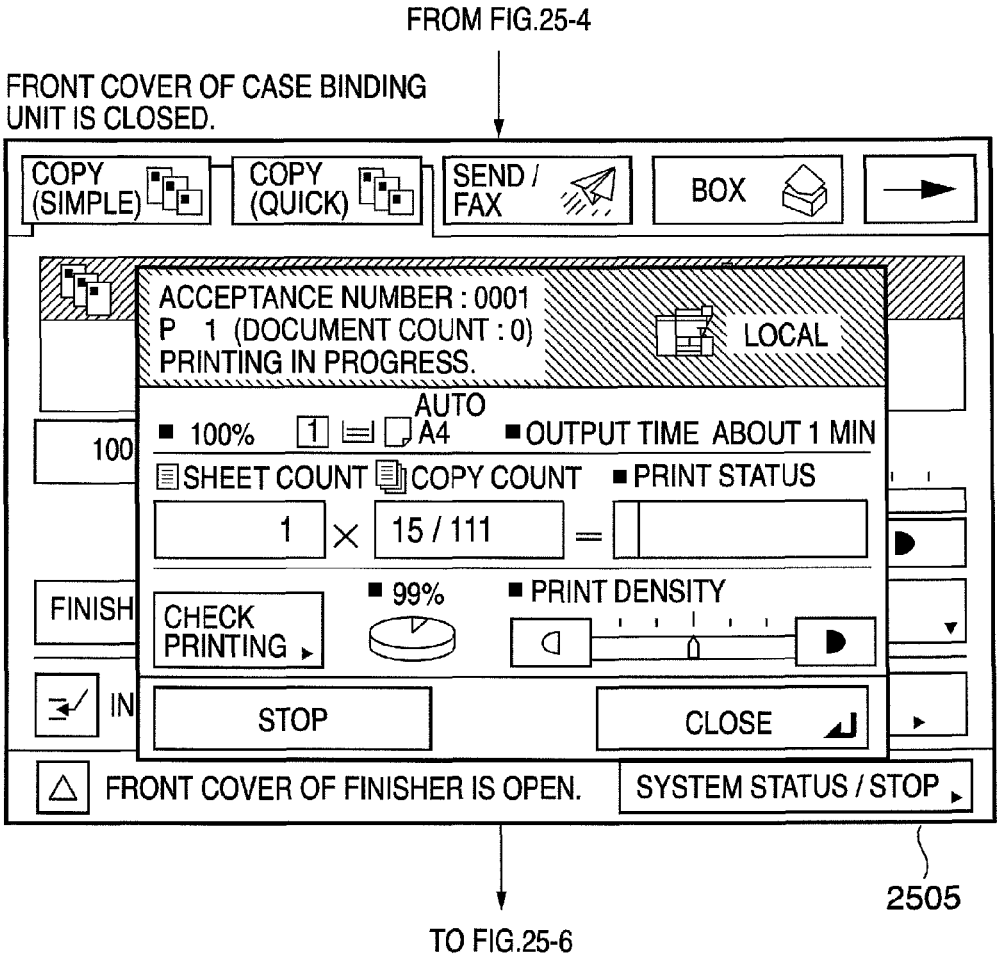
Figures 6, 25:
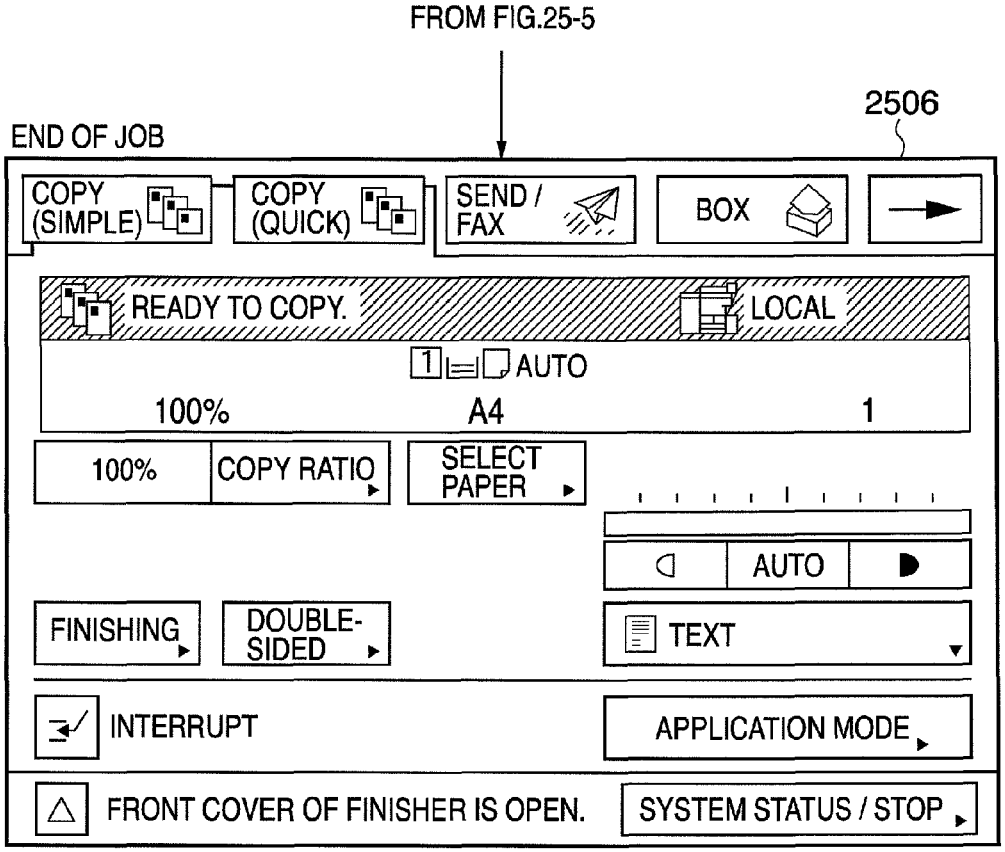

Referring back to the description of FIGS. 25-1 to 25-6, when the control unit 205 confirms that the system 1000 stands by and no cover is open, it causes the display unit 401 to display a window 2501. In the display of the window 2501, the control unit 205 displays a message "ready to copy." as information which notifies the operator of the standby state, and waits for input of a new job.

Assume that the operator opens a total of three movable units, i.e., the front covers of the large-volume stacker, saddle stitching device (finisher), and glue binding device in the system 1000 while the window 2501 is displayed. That is, the statuses of all the three movable units change from the closed status to the open one in the absence of any job to be processed. When confirming that the statuses of these movable units have changed, the control unit 205 changes the display contents of the display unit 401 from the window 2501 to a window 2502.

In the display of the window 2502, the control unit 205 displays a message that the cover of the large-volume stacker is open, on the status line preferentially to pieces of status information that the two remaining movable units are open. This is display control of status information of the movable unit based on a priority order determined from the positional relationship between the open movable units and the printing device 100. A description of this display control will be omitted.

Assume that a job newly input by an operator via the operation unit 204 while the display unit 401 displays the window 2502 requires the delivery destination of the glue binding device. This job will be referred to as a job 25A. In this situation, the job 25A whose print execution request is accepted by the control unit 205 while all the three movable units are open is a job requiring a post-process by the glue binding device in FIG. 8A.

When the control unit 205 makes a determination corresponding to this case, it interrupts execution of the job 25A in the system 1000, and inhibits the printer unit 203 from executing the print process of the job 25A. Also in this case, the control unit 205 causes the display unit 401 to display guidance information to close the movable unit of an inline finisher necessary for the job 25A. For example, the control unit 205 changes the display contents of the display unit 401 from the window 2502 to the window 2503.

In this case, all the three movable units of the large-volume stacker, glue binding device, and saddle stitching device are open in the system 1000. Also in this case, the status information that the movable unit of the large-volume stacker is open is preferentially displayed.

Hence, the control unit 205 causes the display unit 401 to display status information of the large-volume stacker on the status line in the display of the window 2503 while displaying a popup window containing guidance information to close the movable unit of the glue binding device necessary as the delivery destination of the job 25A.

Assume that the operator closes a movable unit unrelated to the job 25A while the window 2503 is displayed. This corresponds to a case in which the operator closes the front cover of the large-volume stacker not necessary for the post-process of the job 25A during the display of the window 2503.

In this case, the status of the movable unit of the large-volume stacker changes from the open status to the closed one. However, the status of the movable unit of the glue binding device related to the job 25A does not change and remains open.

Even when the status of the large-volume stacker changes, the control unit 205 causes the system 1000 to maintain the interrupted (print-inhibited) state of the job 25A. That is, even if the operator closes the open movable unit of the large-volume stacker, the control unit 205 inhibits execution of the print process of the job 25A. In addition, the control unit 205 controls the display unit 401 to keep displaying the guidance information to close the movable unit of the glue binding device necessary for the job 25A.

However, in response to a change of the status of the large-volume stacker, the control unit 205 controls the display unit 401 to switch status information displayed on the status line. In this example, the control unit 205 changes the display contents of the display unit 401 from the window 2503 to a window 2504.

This control is executed when the control unit 205 confirms that status information displayed on the status line in the display of the window 2503 is that of the large-volume stacker and the operator has closed the movable unit of the large-volume stacker.

While maintaining the popup display of the job 25A on the display of the window 2504, the control unit 205 causes the display unit 401 to display status information on the status line of the window 2504 to notify the operator that the movable unit of the glue binding device is open.

Candidates to be displayed as status information at this time are status information notifying the operator that the movable unit of the glue binding device is open, and status information notifying the operator that the movable unit of the saddle stitching device is open. However, status information of the highest priority second to the status information of the movable unit of the large-volume stacker is not status information of the movable unit of the saddle stitching device but that of the movable unit of the glue binding device. This also complies with the priority-based display control.

The control unit 205 causes the display unit 401 to display status information of the movable unit of the glue binding device of the second highest priority on the status line in the display of the window 2504.

In this manner, even while guidance information to resume the job 25A is kept displayed, the control unit 205 controls to switch the message displayed on the status line to information on the front cover of the glue binding device (described as a case binding unit in FIGS. 25-1 to 25-6) of the second highest priority.

Referring back to the description of the job 25A, assume that the operator closes the movable unit (described as the front cover of the case binding unit in FIGS. 25-1 to 25-6) of the glue binding device in accordance with guidance information in the popup window of the window 2504 while the display unit 401 displays the window 2504. Also, assume that the movable unit of the saddle stitching device is not closed but remains open.

This case also corresponds to a case in which the status of the movable unit of the glue binding device necessary for the job 25A changes from the open status to the closed one.

Hence, when confirming a change of the status of the movable unit of the glue binding device, the control unit 205 permits the printing device 100 to start the print process of the job 25A even while the movable unit of the saddle stitching device remains open. Then, the control unit 205 causes the system 1000 to resume the job 25A, and allows the printer unit 203 to execute the print process of the job 25A. At the same time, the control unit 205 causes the display unit 401 to end the display of the guidance information to close the movable unit of the glue binding device, and instead to display the progress of the job 25A. In this example, the control unit 205 controls the display unit 401 to change its display contents from those of the window 2504 to those of a window 2505.

The display of the window 2505 does not show a popup window (popup window displayed in the window 2503 or 2504) containing guidance information to prompt the operator to close the movable unit of the glue binding device. Instead, the control unit 205 causes the display unit 401 to popup-display a job process status window capable of notifying the operator in real time of the progress of the job 25A in the system 1000 for which the control unit 205 cancels inhibition of printing.

The control unit 205 has already confirmed that the movable unit of the glue binding device has been closed at this time. Thus, status information of the movable unit is erased from the status line in the display of the window 2505.

Even at this time, however, the control unit 205 has not confirmed a change of the status of the movable unit of the saddle stitching device not necessary for the process of the job 25A. That is, the movable unit of the saddle stitching device is still open at this time.

For this reason, while the display of the window 2505 keeps notifying the operator of the progress of the job 25A in real time (the job process progress window remains valid), status information of the movable unit of the saddle stitching device not necessary for the job is displayed on the status line. The control unit 205 causes the display unit 401 to display a message on the status line of the window 2505 to represent that the front cover of the saddle stitching device (described as a finisher in FIG. 25-5) is open.

In response to the end of executing all processes for the job 25A in the system 1000 while the window 2505 is displayed, the control unit 205 controls the system 1000 to return to the standby state. In response to the end of the job 25A, the control unit 205 also changes the display contents of the display unit 401 from the window 2505 to a window 2506.

The system 1000 returns to the standby state at the end of the process of the job 25A, but the movable unit of the saddle stitching device remains open. Hence, the control unit 205 allows acceptance of the print process condition settings and print execution request of a new job other than the job 25A via the display of the window 2506. Also, the control unit 205 causes the display unit 401 to display status information on the status line to represent that the movable unit of the saddle stitching device is open. The message "the front cover of the finisher is open." on the status line of the window 2506 means that the movable unit of the saddle stitching device is open. The control unit 205 controls the display unit 401 to erase information displayed on the status line of the window 2506 from the window on the condition that the operator closes the movable unit of the saddle stitching device.

An example of job control in the system 1000 that is executed by the control unit 205 when the operator opens all three movable units, and an example of display control for the operation unit 204 in synchronism with the job control have been described.

Figure 26A:
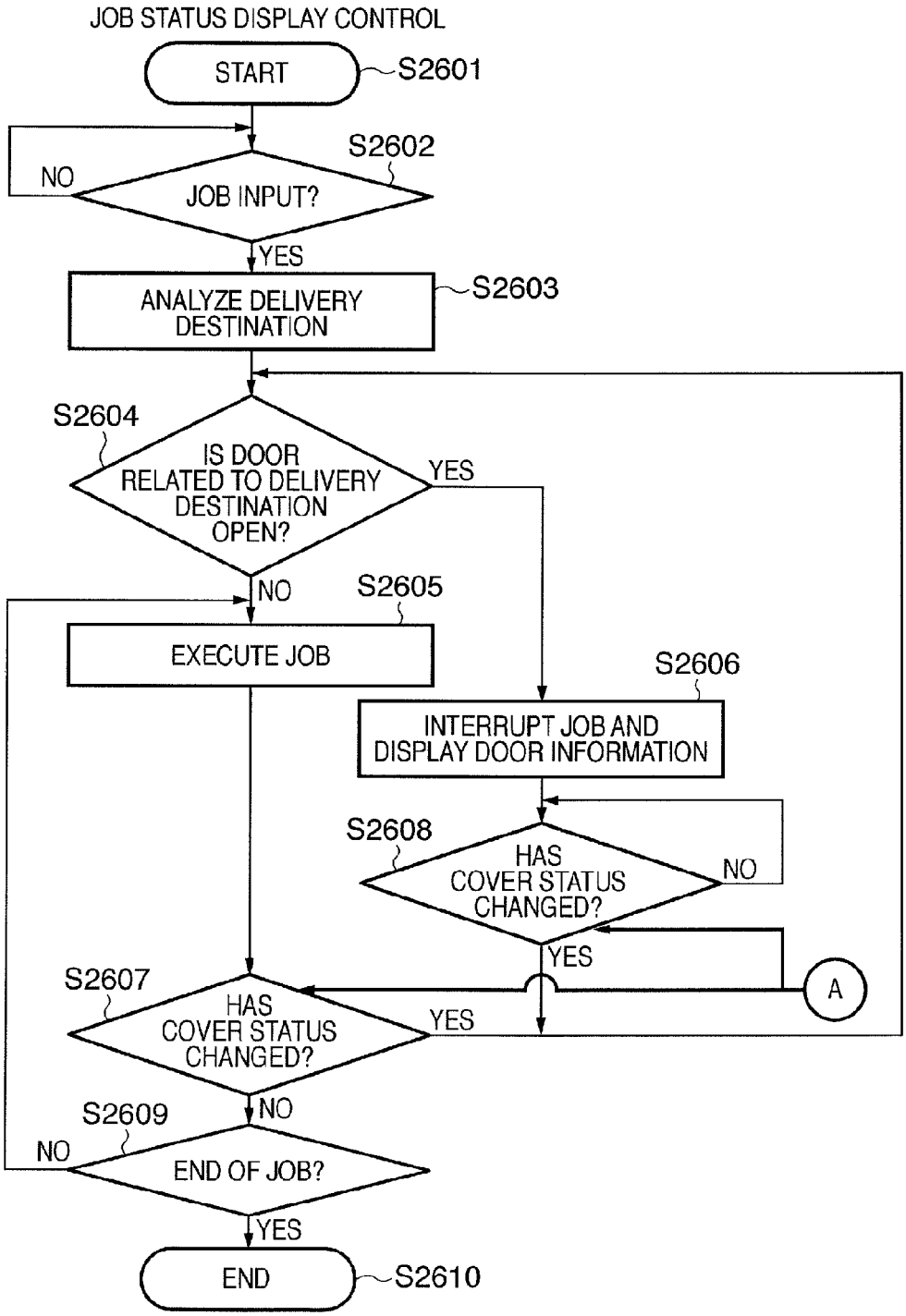
FIGS. 26A and 26B are flowcharts for explaining a control example associated with the continuous-run operation to be controlled in the embodiment.
Figure 26B:
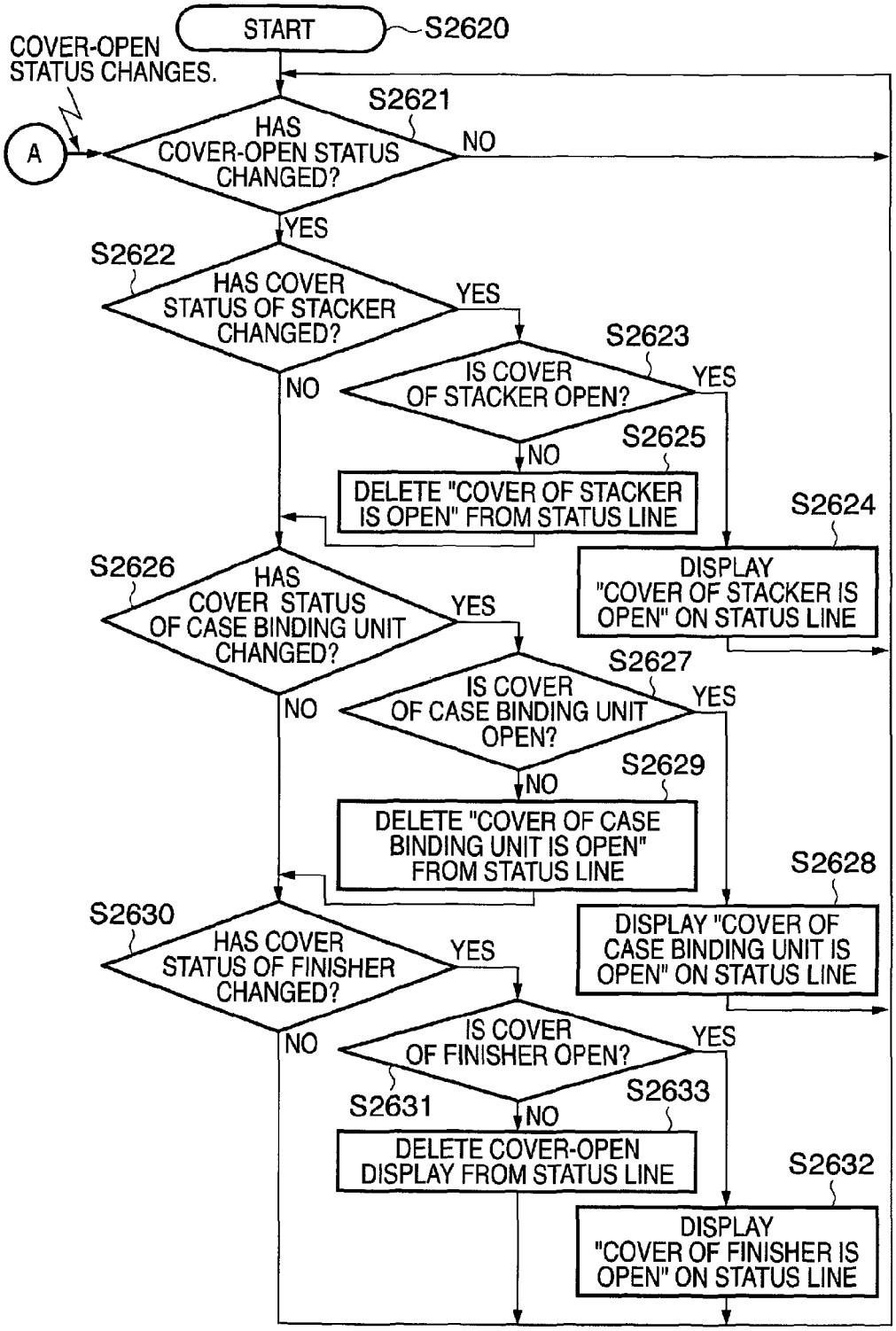

The sequence of the control will be described with reference to the flowcharts of FIGS. 26A and 26B. FIG. 26A shows the flowchart of a process to determine the status display and interrupt/resume of a job. FIG. 26B shows the flowchart of a process to control the device status display of the overall printing system. The flowchart in FIG. 26A mainly concerns a display status when the job is interrupted or executed. The flowchart in FIG. 26B mainly concerns control of the cover-open status displayed on the status line.

The job status display control process starts from step S2601, and it is determined in step S2602 whether a job has been input. In other words, for example, the control unit 205 determines in S2602 whether the operator has input the execution request of a job requiring the print process via the UI unit of the embodiment. If it is determined that no job has been input, the process returns to step S2602. If it is determined that a job has been input, the process advances to step S2603.

In step S2603, information which designates the delivery destination of the input job is analyzed. In step S2604, it is determined whether a cover related to the delivery destination specified by the analysis is open. If it is determined that no related cover is open, the process advances to step S2605 to execute the job. Then, the process advances to step S2607 to determine whether even one of the covers of inline finishes in the system 1000 has changed in the open/closed status. If the result is YES in S2607, the process returns from step S2607 to step S2604. If the result is NO in S2607, the process advances from step S2607 to step S2609. In step S2609, it is determined whether the job has ended. If it is determined that no job has ended, the process returns to step S2605. If it is determined that the job has ended, the process according to the flowchart ends.

If the related cover is open, the process advances to step S2606 to interrupt the job and display door information (corresponding to guidance information in the above example) on the display unit 401. The display has already been described. In step S2608, it is determined whether the open/closed status of the cover has changed. If it is determined that the open/closed status of the cover has changed, the process returns to step S2604. If it is determined that the open/closed status of the cover has not changed, the process returns to step S2608, i.e., the process waits until the cover status changes.

The job status display control has been described.

The process in steps S2603 to S2610 of A means that the embodiment discloses a configuration in which the control unit 205 performs the following process.

After confirming in S2602 that a new job has been accepted, the control unit 205 makes the following (confirmation 1).

(Confirmation 1) The control unit 205 confirms whether the target job, which is confirmed in S2602 to exist and for which a print execution request is issued, requires a post-process by an inline finisher having an open movable unit in the system 1000.

If the result is YES in (confirmation 1), the control unit 205 advances the process from S2604 to S2606.

In S2606, the control unit 205 interrupts the job determined in (confirmation 1) in the system 1000, and inhibits at least execution of the print process of the job. At the same time, the control unit 205 causes the UI unit of the embodiment to notify the operator of guidance information to prompt him to close the movable unit of the inline finisher necessary for the process of the job. The control in S2606 is included in control "to inhibit the printing device 100 from executing the print process of a job without notifying the operator via the UI unit of the embodiment of guidance information to prompt him to close an open movable unit". After the process in S2606, the process advances to S2608.

If the result is NO in (confirmation 1), the control unit 205 advances the process from S2604 to S2605.

In S2605, the control unit 205 permits execution of the print process of the job even if a movable unit which does not influence the process of the job determined in (confirmation 1) is open in the system 1000. Also in S2605, the control unit 205 allows the printing device 100 to execute the print process of the job without notifying the operator via the UI unit of the embodiment of guidance information to close the movable unit which does not influence the process of the job. The control in S2605 is included in control "to permit the printing device 100 to execute the print process of a job without notifying the operator via the UI unit of the embodiment of guidance information to prompt him to close an open movable unit". After the process in S2605, the process advances to S2607.

In other words, the process in S2607 means that the control unit 205 makes the following (confirmation 2).

(Confirmation 2) The control unit 205 confirms whether even one of movable units in the system 1000 has changed the status from the closed status to the open one.

If the result is YES in (confirmation 2), the control unit 205 returns the process from S2607 to S2604. If the result is NO in (confirmation 2), the control unit 205 advances the process from S2607 to S2609.

In other words, the process in S2609 means that the control unit 205 makes the following (confirmation 3).

(Confirmation 3) The control unit 205 confirms whether all the processes of the job, for which execution of printing is permitted in S2605, end in the system 1000.

If the result is YES in (confirmation 3), the control unit 205 advances the process from S2609 to S2610, ending the process of the job. In practice, the process returns to S2602 and restarts from confirmation of the presence of a new job. If the result is NO in (confirmation 3), the control unit 205 returns the process from S2609 to S2605. In S2605, the control unit 205 causes the system 1000 to continue the process of the job in order to complete the process of the job whose printing is permitted in S2605.

In other words, the process in S2608 means that the control unit 205 makes the following (confirmation 4).

(Confirmation 4) The control unit 205 confirms whether even one of movable units in the system 1000 has changed the status from the open status to the closed one.

If the result is YES in (confirmation 4), the control unit 205 returns the process from S2608 to S2604.

If the result is NO in (confirmation 4), the control unit 205 inhibits the shift from S2608 to S2604. That is, the control unit 205 causes the system 1000 to maintain the interrupted (print-inhibited) state of the job that has been set by the process in S2606, and also to keep notifying the operator of the guidance information via the UI unit of the embodiment.

As is apparent from the above description which rephrases the flowchart of FIGS. 26A and 26B, the process of FIGS. 26A and 26B and the description of this process show a more concrete control example subordinate to the control executed by the control unit 205 in the embodiment. For example, both the left and right flowcharts in FIGS. 26A and 26B belong to a control example subordinate to the control executed by the control unit 205. This is also apparent from a comparison from various control examples which are executed by the control unit 205 in the embodiment and have been described in detail with reference to FIGS. 20-1 to 25-6 prior to the description of FIGS. 26A and 26B.

Referring back to the description of FIGS. 26A and 26B, device status display control will be explained with reference to the flowchart of FIG. 26B. This flowchart will be described as an example of preferentially displaying a message about a sheet processing device near the printing device main body on the status line of the device status in the whole printing system.

The process starts from step S2620, and it is determined in step S2621 whether the cover status has changed. If it is determined that no cover status has changed, the process returns to step S2620. If it is determined that the cover status has changed, the process advances to step S2622. In step S2622, it is determined whether the cover status of the large-volume stacker has changed. If it is determined that the cover status of the large-volume stacker has not changed, the process advances to step S2626. If it is determined that the cover status of the large-volume stacker has changed, the process advances to step S2623.

In step S2623, it is determined whether the cover of the large-volume stacker has changed to be open. If it is determined that the cover has changed to be open, the process advances to step S2624 to cause the display unit 401 to display a message such as "the cover of the stacker is open." Then, the process returns to step S2621.

If it is determined in step S2623 that the cover of the large-volume stacker has changed to be closed, the process advances to step S2625 to erase the message such as "the cover of the stacker is open." from the window, and advances to step S2626.

In step S2626, it is determined whether the cover status of the case binding device serving as the next sheet processing device has changed. If it is determined that the cover status of the case binding device has changed, the process advances to step S2627 to determine whether the cover has changed to be open or closed.

If it is determined that the cover has changed to be open, the process advances to step S2628 to cause the display unit 401 to display a message such as "the cover of the case binding unit is open." Then, the process returns to step S2621.

If it is determined in step S2627 that the cover has changed to be closed, the process advances to step S2629 to erase the message such as "the cover of the case binding unit is open." from the window, and advances to step S2630.

In step S2630, it is determined whether the cover status of the saddle stitching device (finisher) serving as the next sheet processing device has changed. If it is determined that the cover status of the finisher has changed, the process advances to step S2631 to determine whether the cover has changed to be open or closed. If it is determined that the cover has changed to be open, the process advances to step S2632 to cause the display unit 401 to display a message such as "the cover of the finisher is open." If it is determined in step S2631 that the cover has changed to be closed, the process advances to step S2633 to erase the message such as "the cover of the finisher is open." from the window, and returns to step S2621.

According to the detailed description of the embodiment, a printing system capable of selectively supplying a sheet of a job having undergone a print process by a printing means from the printing means of a printing device having the printing means capable of executing the print process of data in a storage means capable of storing data of a plurality of jobs to a plurality of sheet processing devices capable of executing a sheet process for a sheet of a job printed by the printing means comprises a cover status detecting means for detecting the cover statuses of the printing device and sheet processing devices, and a display means for displaying the cover statuses. The printing system also comprises a first cover-open display control means for, when the detecting means detects the cover-open status, controlling the display means to display the cover-open status of the overall printing system including the printing device and the plurality of sheet processing devices, and a second cover-open display control means for controlling the display means to display only the cover-open status of a sheet processing device used for the job among the plurality of sheet processing devices. The cover-open status of the overall system job and that of each job are independently displayed. Only the second cover-open display control means determines whether the job is executable. Under this control, when the cover is opened, an optimal message is displayed to an operator, efficiently executing a plurality of jobs without posing any extra work on the operator. The embodiment can provide this mechanism.

[Other Mechanisms]

A host computer (e.g., the PC 103 or 104) may use an externally installed program to achieve the functions shown in the drawings in the embodiment. For example, a computer-readable computer program for causing a computer to execute control corresponding to control which is disclosed in the embodiment, has been described with reference to FIGS. 20-1 to 26B, and is executed by the control unit 205 is externally downloaded to a host computer via a Web. Based on this program, the same control as the control which is disclosed in the embodiment, has been described with reference to FIGS. 20-1 to 26B, and is executed by the control unit 205 can be implemented using the system 1000. This configuration is also possible. In this configuration, however, at least all display windows which are displayed on the display unit 401 of the operation unit 204 in the embodiment as shown in FIGS. 20-1 to 25-6 are desirably displayed on the display unit of the host computer. This can further enhance the effects disclosed in the embodiment. In this case, data for displaying the same operation windows as those described in the embodiment including operation windows are externally installed to provide various user interface windows on the display unit of the host computer. This process is described with reference to the configuration based on the UI windows of FIGS. 17A and 17B. In this configuration, the present invention is also applicable to a case in which an output device receives a set of information including a program from a storage medium such as a CD-ROM, flash memory, or FD, or from an external storage medium via a network.

As described above, the object of the present invention is also achieved by supplying a storage medium which records software program codes for implementing the functions of the above-described embodiment to a system or apparatus, and reading out and executing the program codes stored in the storage medium by the computer (CPU or MPU) of the system or apparatus.

In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD.

In this case, the program code read out from the storage medium implements the functions of the above-described embodiment, and the storage medium which stores the program codes constitutes the present invention.

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes based on the instructions of the program codes.

The functions of the above-described embodiment are also implemented when the program codes read out from the storage medium are written in the memory of a function expansion board inserted into the computer or the memory of a function expansion unit connected to the computer, and the CPU of the function expansion board or function expansion unit performs some or all of actual processes based on the instructions of the program codes.

The present invention may be applied to a system including a plurality of apparatuses or an apparatus formed by a single device. The present invention is also applicable to a case of achieving the effects of the present invention by supplying a program to the system or apparatus. In this case, the system or apparatus can obtain the effects of the present invention by providing, to the system or apparatus, a storage medium which stores a program represented by software for achieving the present invention.

The present invention is not limited to the above embodiment, and various modifications (including organic combinations of embodiments) can be made without departing from the scope of the invention, and are not excluded from the scope of the invention. For example, the control unit 205 in the printing device 100 mainly performs various control operations, but the external controller of a housing different from the printing device 100 may execute one or all of various control operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-079590 filed Mar. 22, 2006 and No. 2007-042680 filed Feb. 22, 2007, which are hereby incorporated by reference herein in their entirety.

What is claimed is:

1. A printing system [adapted to be able to perform] *suitable for* a [processing concerning a job to be processed by a post-processing device, the post-processing device having a movable component openable by an operator, the system comprising: a controller that enables the] printing device to execute [the] *a* print process of a job [to be processed even while the movable component remains open in a case that the job does not require the], *and for a first post-processing device or a second post-processing device to execute a* post-process [by the] *of the job, the first post-processing device having a first cover, and the second post-processing device having a second cover, the system comprising:*

*a controller that controls, in a case that a job requires a post-process by the second* post-processing device [having the open movable component, the controller inhibiting the printing device from executing the print process of a job to be processed without notifying an operator via a user interface unit of information on the open movable component in a case that the job requires the] *and does not require a* post-process by the *first* post-processing device [having the open movable component], *the printing device to execute a print process of the job even while the first cover remains open,*

*wherein the controller inhibits the printing device from executing the print process of the job in a case that both the first cover and the second cover are open and then the second cover remains open even after the first cover is closed, and permits the printing device to execute the print process of the job in a case that both the first cover and the second cover are open and then the second cover is closed.*

2. The system according to claim 1, in a case that the job [to be processed] requires the post-process by the *first* post-processing device [having the open movable component], the controller [causes] *controls* the printing device to execute the print process of the job after [the user interface unit notifies the operator of guidance information to close the open movable component by an operator operation, and] a status of the [movable component] *cover* changes from an open status to a closed status.

3. The system according to claim 1, in a case that the job [to be processed] requires the post-process by the *first* post-processing device [having the open movable component], the controller [makes] *controls the printing device to make* the print process of the job stand by until the [movable component] *cover* is closed [by an operator operation].

4. The system according to claim 1, in a case that the job [to be processed] does not require the post-process by the *first* post-processing device [having the open movable component], the controller [permits] *controls* the printing device to execute the print process of the job without notifying [the] *an* operator via [the] *a* user interface unit of [guidance] information [to close] *on* the open [movable component by an operator operation] *cover* even while the [movable component] *cover* remains open.

5. The system according to claim 1, *wherein* the controller causes [the] *a* user interface unit to notify the operator of status information that the [movable component] *cover* is open, prior to the print process by the printing device regardless of whether the job to be processed requires the post-process by the *first* post-processing device [having the open movable component] or does not require the post-process by the *first* post-processing device [having the open movable component].

6. The system according to claim 1, *wherein* the controller permits acceptance of a print [execution-request] *execution request* of a new job via [the] *a* user interface unit even in a case that a status of the [movable component] *cover* of the *first* post-processing device changes from an open status to a closed status.

7. The system according to claim 1, *wherein* the controller inhibits acceptance of a print execution request of a new job via [the] *a* user interface unit even in a case that a status of a [movable component] *cover* of the printing device changes from an open status to a closed status.

[8. The system according to claim 1, the controller inhibits the printing device from executing the print process of the job to be processed in a case that both a first movable component of a first post-processing device necessary for the post-process of the job and a second movable component of a second post-processing device not necessary for the post-process of the job are open, and the first movable component remains open even after the second movable component is closed, and in a case that both the first movable component and the second movable component are open and the first movable component is closed, the controller permits the printing device to execute the print process of the job even while the second movable component remains open.]

9. [The system according to claim 1,] *A printing system suitable for a printing device to execute a print process of a job, and for a first post-processing device or a second post-processing device to execute a post-process of the job, the first post-processing device having a cover, the system comprising:*

*a controller that controls, in a case that a job requires a post-process by the second post-processing device and does not require a post-process by the first post-processing device, the printing device to execute a print process of the job even while the cover remains open,*

*wherein* the post-process includes at least one of*:* a stapling process for a printed material supplied from the printing device, a punching process for the printed material supplied from the printing device, a shift delivery process for the printed material supplied from the printing device, a saddle stitching process for the printed material supplied from the printing device, a glue binding process for the printed material supplied from the printing device, a stacking process for the printed material supplied from the printing device, and a trimming process for the printed material supplied from the printing device.

10. The system according to claim 1, [the] *further comprising a* user interface unit [includes at least either of] *including* a user interface unit of the printing device, [and] a user interface unit of a computer which transmits print data of a job to be processed to the printing device*, or both the user interface unit of the printing device and the user interface unit of the computer.*

[11. A job processing method for a printing system adapted to be able to perform a processing concerning a job to be processed by a post-processing device, the post-processing device having a movable component openable by an operator, comprising:

enabling the printing device to execute the print process of a job to be processed even while the movable component remains open in a case that the job does not require the post-process by the post-processing device having the open movable component; and inhibiting the printing device from executing the print process of a job to be processed without notifying an operator via a user interface unit of information on the open movable component in a case that the job requires the post-process by the post-processing device having the open movable component.]

[12. The method according to claim 11, further comprising, in a case that the job to be processed requires the post-process by the post-processing device having the open movable component, causing the printing device to execute the print process of the job after the user interface unit notifies the operator of guidance information to close the open movable component by an operator operation, and a status of the movable component changes from an open status to a closed status.]

[13. The method according to claim 11, further comprising, in a case that the job to be processed requires the post-process by the post-processing device having the open movable component, making the print process of the job stand by until the movable component is closed by an operator operation.]

[14. The method according to claims 11, further comprising, in a case that the job to be processed does not require the post-process by the post-processing device having the open movable component, permitting the printing device to execute the print process of the job without notifying the operator via the user interface unit of guidance information to close the open movable component by an operator operation even while the movable component remains open.]

[15. The method according to claim 11, further comprising causing the user interface unit to notify the operator of status information that the movable component is open, prior to the print process by the printing device regardless of whether the job to be processed requires the post-process by the post-processing device having the open movable component or does not require the post-process by the post-processing device having the open movable component.]

[16. The method according to claim 11, further comprising permitting acceptance of a print execution request of a new job via the user interface unit even in a case that a status of the movable component of the post-processing device changes from an open status to a closed status.]

[17. The method according to claims 11, further comprising inhibiting acceptance of a print execution request of a new job via the user interface unit even in a case that a status of a movable component of the printing device changes from an open status to a closed status.]

[18. The method according to claim 11, further comprising inhibiting the printing device from executing the print process of the job to be processed in a case that both a first movable component of a first post-processing device necessary for the post-process of the job and a second movable component of a second post-processing device not necessary for the post-process of the job are open, and the first movable component remains open even after the second movable component is closed, and in a case that both the first movable component and the second movable component are open and the first movable component is closed, permitting the printing device to execute the print process of the job even while the second movable component remains open.]

[19. The method according to claim 11, the post-process includes at least one of a stapling process for a printed material supplied from the printing device, a punching process for the printed material supplied from the printing device, a shift delivery process for the printed material supplied from the printing device, a saddle stitching process for the printed material supplied from the printing device, a glue binding process for the printed material supplied from the printing device, a stacking process for the printed material supplied from the printing device, and a trimming process for the printed material supplied from the printing device.]

[20. The method according to claims 11, the user interface unit includes at least either of a user interface unit of the printing device, and a user interface unit of a computer which transmits print data of a job to be processed to the printing device.]

[21. A printing device for executing a job processing method defined in claim 11.]

[22. A computer-readable storage medium storing a program for executing a job processing method in claim 11.]

*23. The system according to claim 1, in a case that the job requires the post-process by the first post-processing device, the controller controls the printing device to execute the print process of the job after notifying an operator via a user interface unit of information on the open cover.*

*24. The system according to claim 1, wherein the first post-processing device is located upstream of the second post-processing device.*

*25. A job processing method for a printing system suitable for a printing device to execute a print process of a job, and for a first post-processing device or a second post-processing device to execute a post-process of the job, the first post-processing device having a first cover, and the second post-processing device having a second cover, the method comprising the step of:*

*controlling, in case that a job requires a post-process by the second post-processing device and does not require a post-process by the first post-processing device, the printing device to execute a print process of the job even while the first cover remains open,*

*wherein the controlling step includes inhibiting the printing device from executing the print process of the job in a case that both the first cover and the second cover are open and then the second cover remains open even after the first cover is closed, and permitting the printing device to execute the print process of the job in a case that both the first cover and the second cover are open and then the second cover is closed.*

*26. A non-transitory computer-readable storage medium storing a program executable at least by a computer in a printing system for executing a job processing method defined in claim 25.*

* * * * *